US011333748B2

(12) United States Patent
Shepard et al.

(10) Patent No.: US 11,333,748 B2
(45) Date of Patent: May 17, 2022

(54) ARRAY OF LIGHT DETECTORS WITH CORRESPONDING ARRAY OF OPTICAL ELEMENTS

(71) Applicant: Waymo LLC, Mountain View, CA (US)

(72) Inventors: Ralph H. Shepard, Menlo Park, CA (US); Pierre-Yves Droz, Los Altos, CA (US); David Schleuning, Piedmont, CA (US); Mark Shand, Palo Alto, CA (US); Luke Wachter, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 875 days.

(21) Appl. No.: 16/133,231

(22) Filed: Sep. 17, 2018

(65) Prior Publication Data

US 2020/0088859 A1   Mar. 19, 2020

(51) Int. Cl.
*G01S 7/499*   (2006.01)
*G01S 17/89*   (2020.01)
(Continued)

(52) U.S. Cl.
CPC ............. *G01S 7/499* (2013.01); *G01S 7/4811* (2013.01); *G01S 7/4865* (2013.01); *G01S 17/89* (2013.01); *G02B 5/20* (2013.01); *G02B 27/288* (2013.01)

(58) Field of Classification Search
None
See application file for complete search history.

(56) References Cited

U.S. PATENT DOCUMENTS 4,425,501 A   1/1984   Stauffer
5,032,023 A   7/1991   Schneiter
(Continued)

FOREIGN PATENT DOCUMENTS

JP   2018-119986 A   8/2018
KR   10-2010-0136163 A   12/2010

OTHER PUBLICATIONS

International Search Report and Written Opinion from International Application No. PCT/US2019/049417, dated Dec. 20, 2019.
(Continued)

*Primary Examiner* — Yuqing Xiao
*Assistant Examiner* — Amir J Askarian
(74) *Attorney, Agent, or Firm* — McDonnell Boehnen Hulbert & Berghoff LLP

(57) ABSTRACT

Example embodiments relate to arrays of light detectors with a corresponding array of optical elements. An example embodiment includes a light detection and ranging (LIDAR) system. The LIDAR system includes an array of light detectors. The LIDAR system also includes a shared imaging optic. Further, the LIDAR system includes an array of optical elements positioned between the shared imaging optic and the array of light detectors. Each light detector in the array of light detectors is configured to detect a respective light signal from a respective region of a scene. Each respective light signal is transmitted via the shared imaging optic and modified by a respective optical element in the array of optical elements based on at least one aspect of the scene.

31 Claims, 32 Drawing Sheets

(51) Int. Cl.
*G02B 5/20* (2006.01)
*G01S 7/4865* (2020.01)
*G02B 27/28* (2006.01)
*G01S 7/481* (2006.01)

(56) References Cited

U.S. PATENT DOCUMENTS

| | | | |
|---|---|---|---|
| 5,061,062 A | 10/1991 | Schneiter | |
| 5,696,371 A | 12/1997 | Meyers | |
| 5,751,492 A | 5/1998 | Meyers | |
| 5,814,803 A | 9/1998 | Olmstead et al. | |
| 6,137,535 A | 10/2000 | Meyers | |
| 6,556,349 B2 | 4/2003 | Cox et al. | |
| 6,686,582 B1 | 2/2004 | Völcker et al. | |
| 6,950,570 B1 | 9/2005 | Novotny | |
| 7,049,597 B2 | 5/2006 | Bodkin | |
| 7,187,452 B2 | 3/2007 | Jupp et al. | |
| 7,580,127 B1 | 8/2009 | Mayor et al. | |
| 7,796,081 B2 | 9/2010 | Breed | |
| 8,194,306 B2 | 6/2012 | Turner et al. | |
| 9,157,801 B2 | 10/2015 | Dottery et al. | |
| 9,575,164 B2 | 2/2017 | Kim | |
| 9,810,786 B1 | 11/2017 | Welford et al. | |
| 10,018,726 B2 | 7/2018 | Hall et al. | |
| 10,436,907 B1* | 10/2019 | Murray | G01N 15/06 |
| 10,460,429 B1* | 10/2019 | Pinkus | G06T 5/20 |
| 2003/0222198 A1 | 12/2003 | Olszak et al. | |
| 2004/0130702 A1 | 7/2004 | Jupp et al. | |
| 2005/0057741 A1 | 3/2005 | Anderson et al. | |
| 2007/0109438 A1 | 5/2007 | Duparre et al. | |
| 2009/0147239 A1 | 6/2009 | Zhu et al. | |
| 2009/0200623 A1 | 8/2009 | Qian et al. | |
| 2012/0138121 A1* | 6/2012 | Izadian | H01L 31/0543 136/246 |
| 2013/0148846 A1* | 6/2013 | Maeda | G06K 9/00791 382/103 |
| 2014/0376001 A1* | 12/2014 | Swanson | G01N 21/39 356/479 |
| 2015/0260830 A1 | 9/2015 | Ghosh et al. | |
| 2016/0200161 A1* | 7/2016 | Van Den Bossche | G01S 17/93 701/28 |
| 2016/0245919 A1 | 8/2016 | Kalscheur et al. | |
| 2017/0293198 A1* | 10/2017 | Kim | B60R 1/00 |
| 2017/0307736 A1 | 10/2017 | Donovan et al. | |
| 2018/0088323 A1* | 3/2018 | Bao | G02B 27/0093 |
| 2018/0106900 A1 | 4/2018 | Droz et al. | |
| 2018/0107221 A1 | 4/2018 | Droz et al. | |
| 2018/0128903 A1* | 5/2018 | Chang | G01S 17/10 |
| 2018/0180718 A1* | 6/2018 | Lin | G01S 7/4813 |
| 2018/0329065 A1* | 11/2018 | Pacala | H04B 10/503 |
| 2019/0107765 A1* | 4/2019 | Whitehead | G02F 1/167 |
| 2019/0281202 A1* | 9/2019 | Chen | G03B 11/00 |

OTHER PUBLICATIONS

"Characterization and Helicopter Flight Test of 3-D Imaging Flash LIDAR Technology for Safe, Autonomous, and Precise Planetary Landing"; Vincent Eric Roback; Virginia Polytechnic Institute and State University Master Thesis; Aug. 13, 2012.

"Wide-angle Nonmechanical Beam Steering Using Liquid Lenses"; Mo Zohrabi, et al.; Optics Express, vol. 24, No. 21, pp. 23798-23809; Oct. 4, 2016.

* cited by examiner

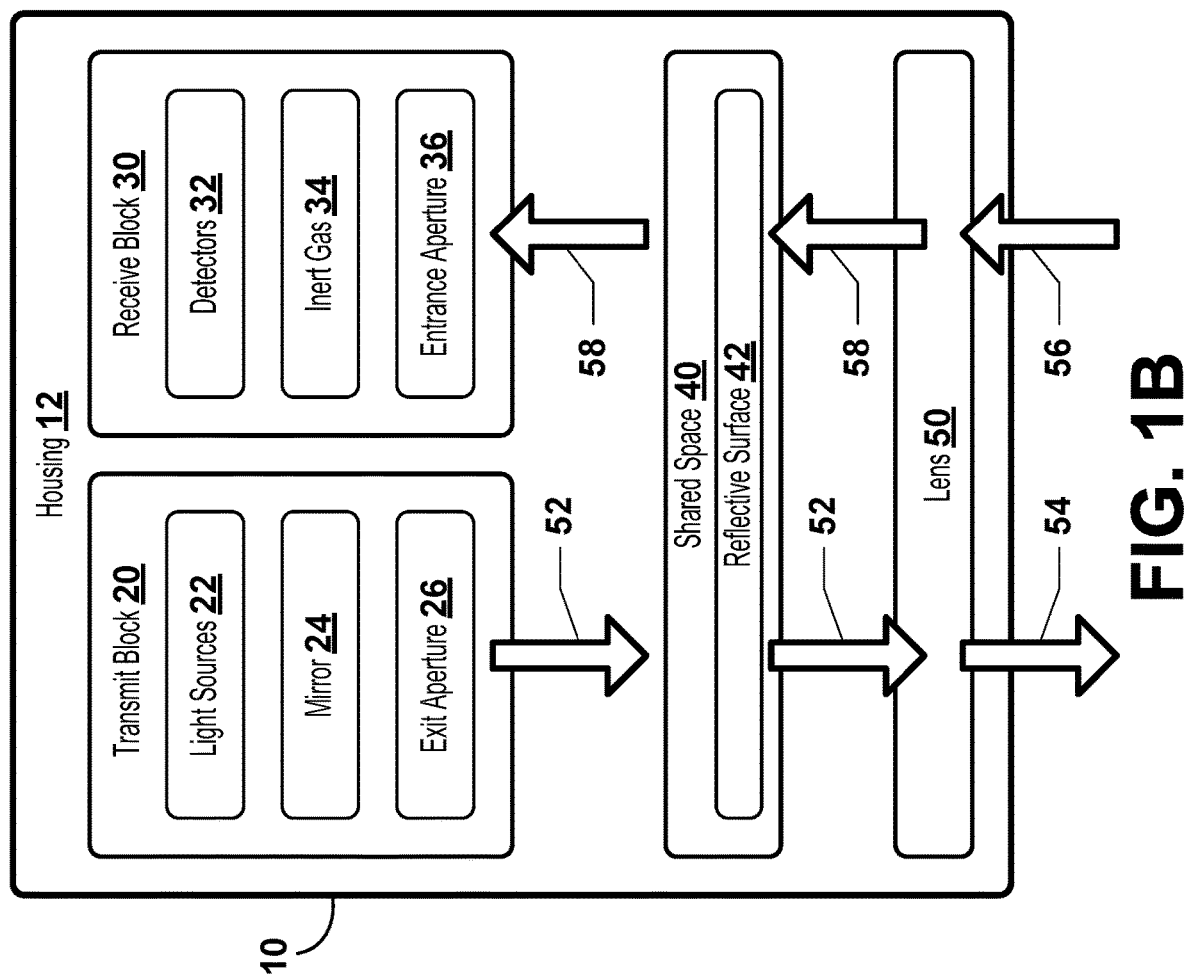

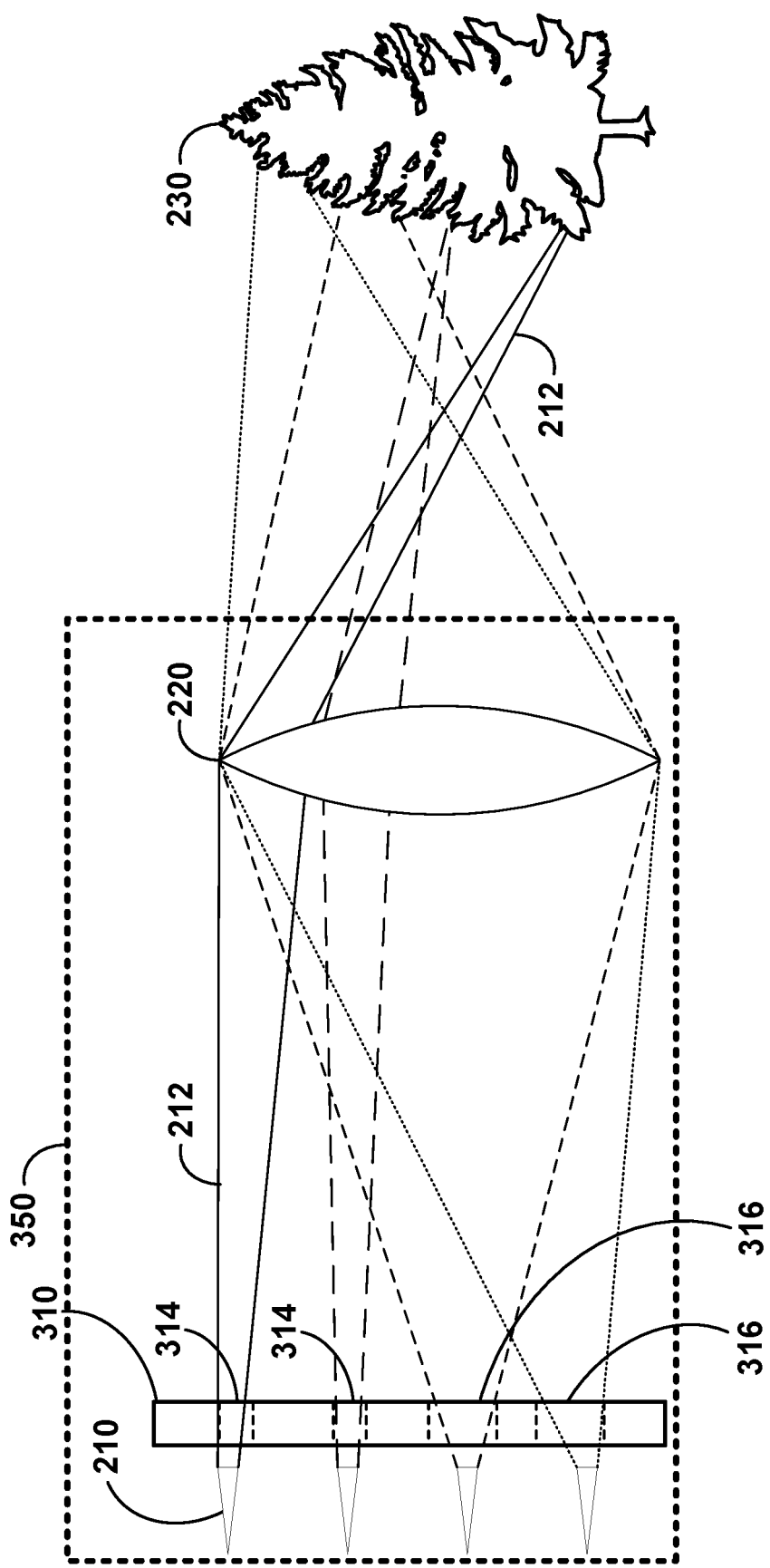

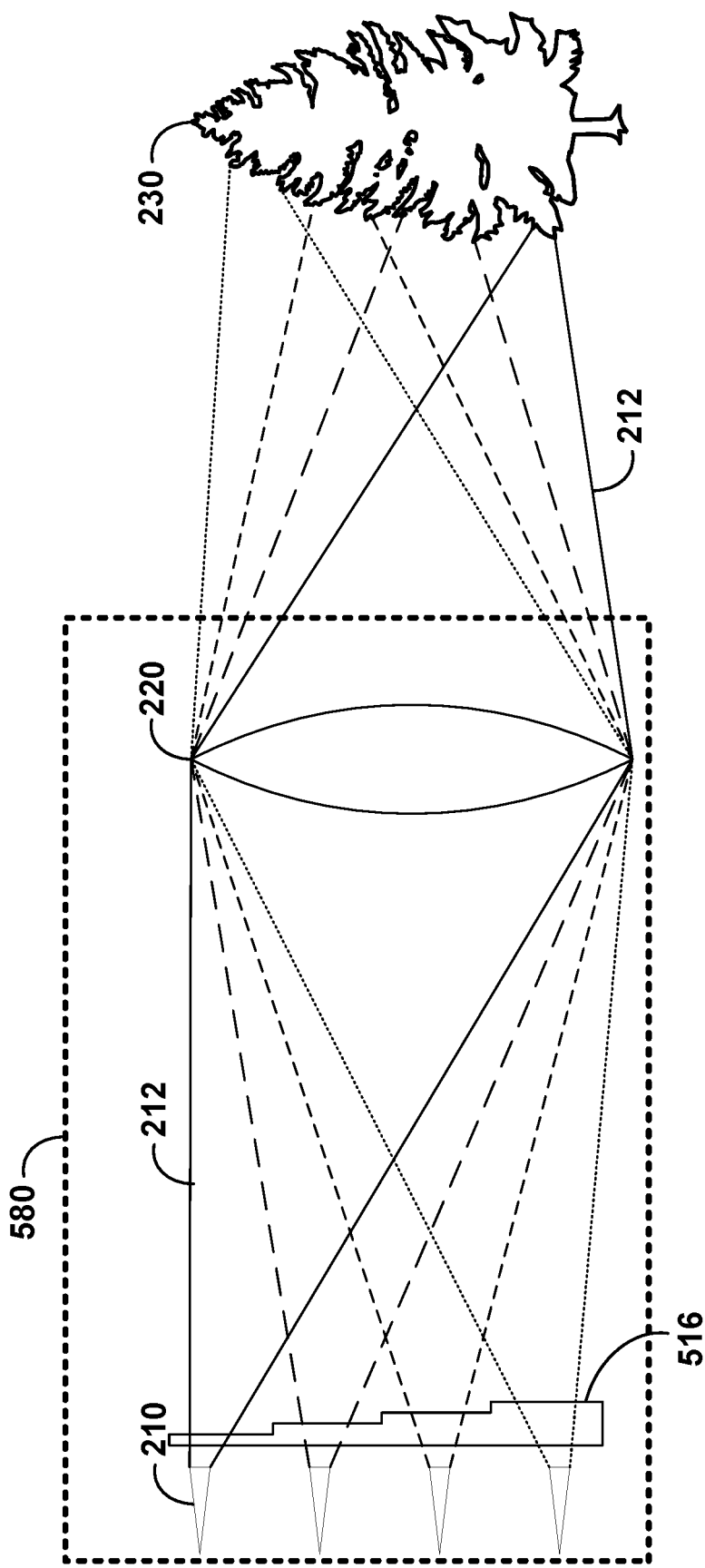

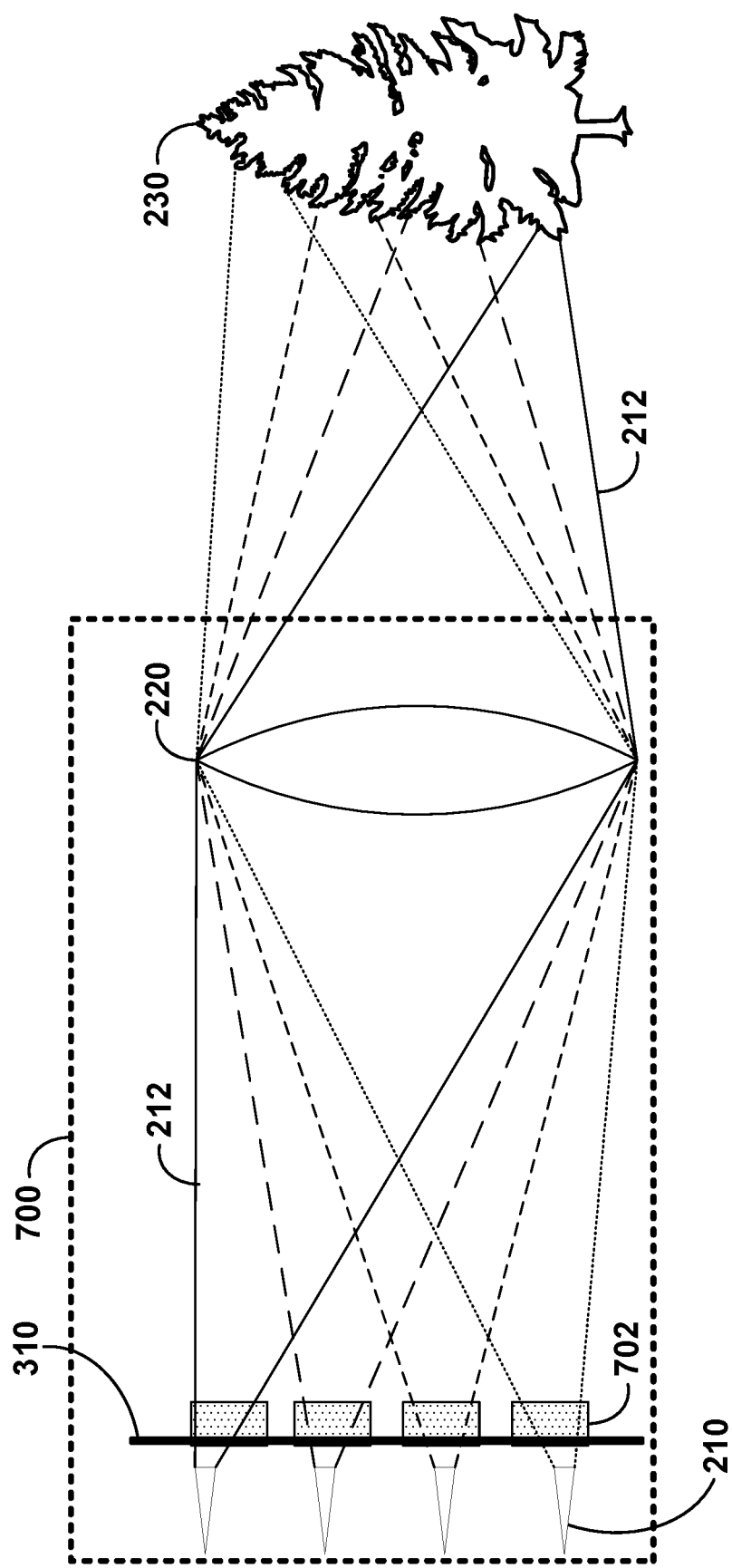

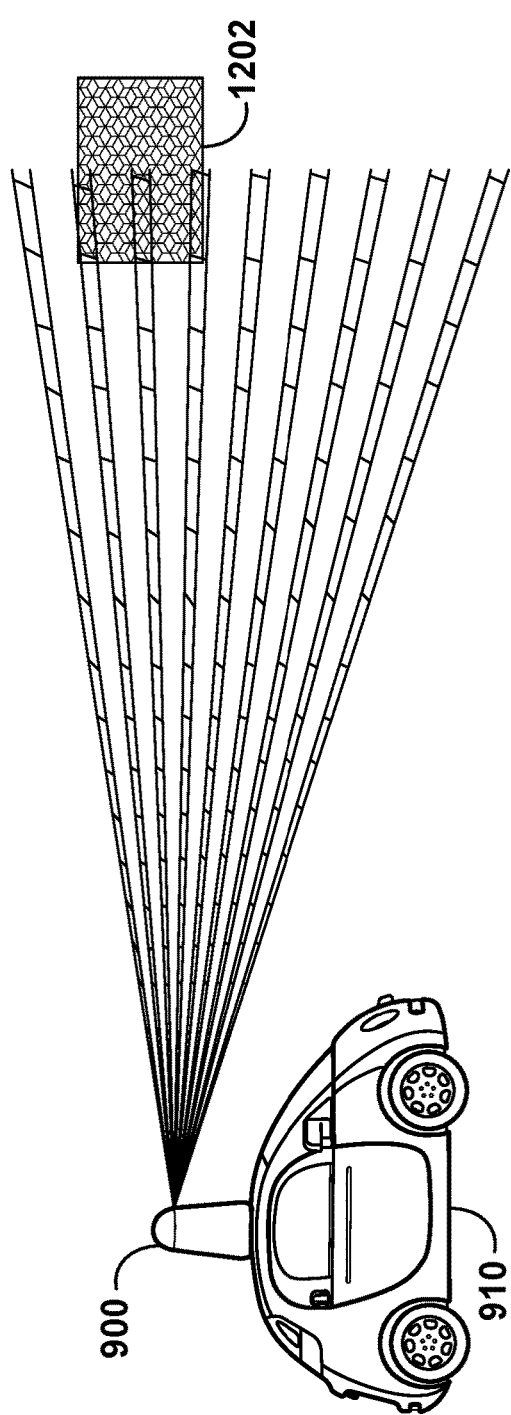
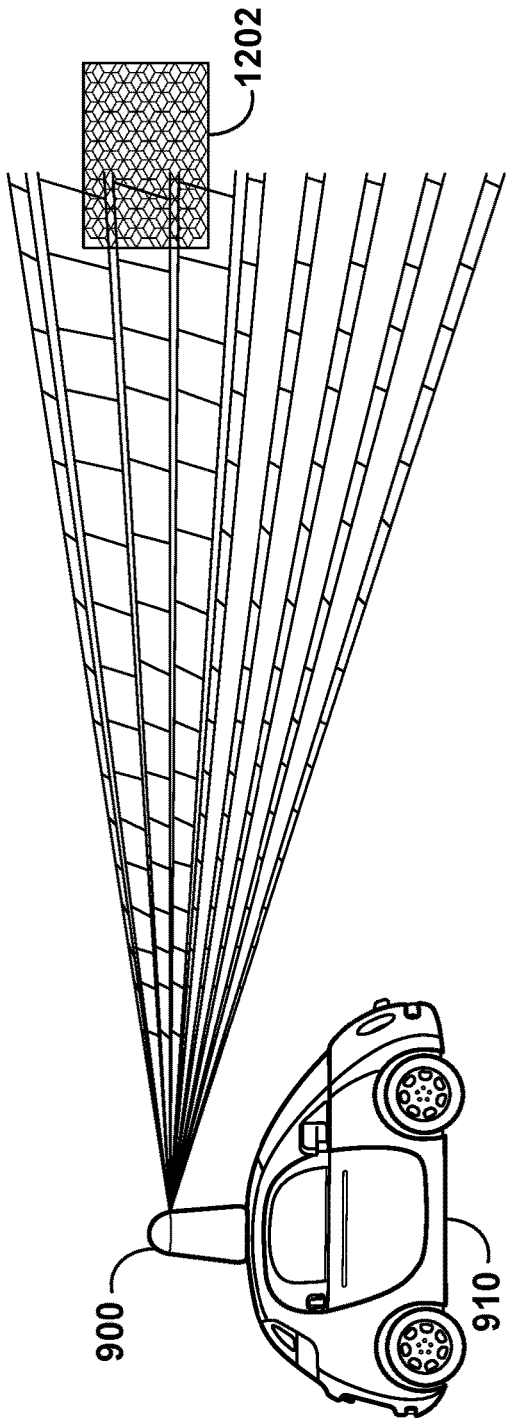

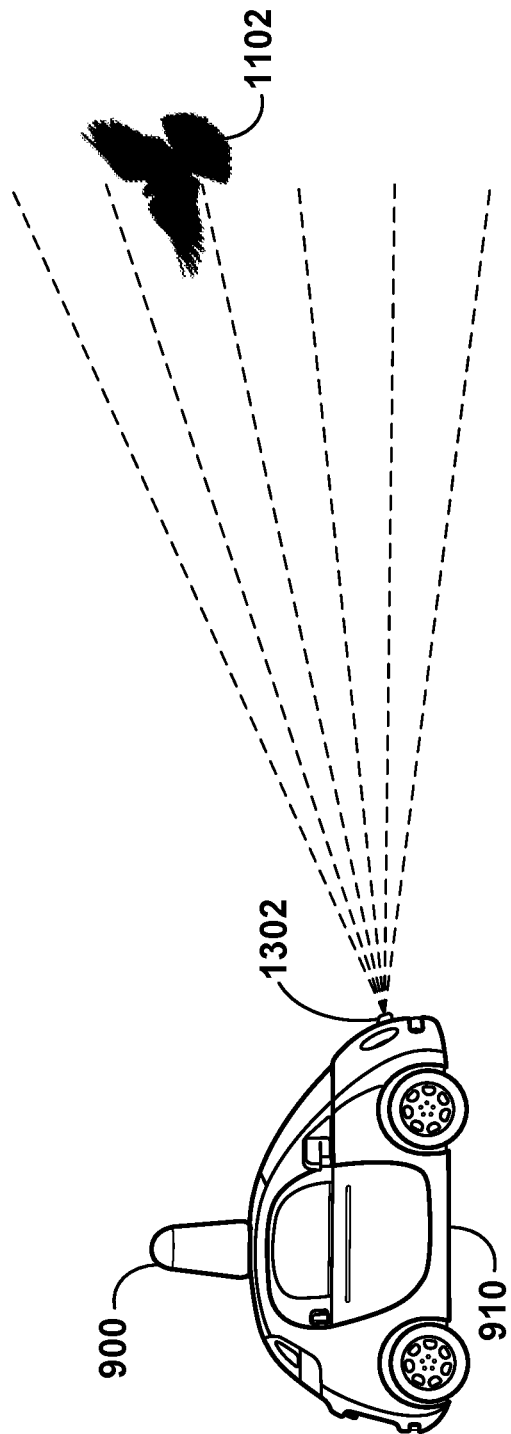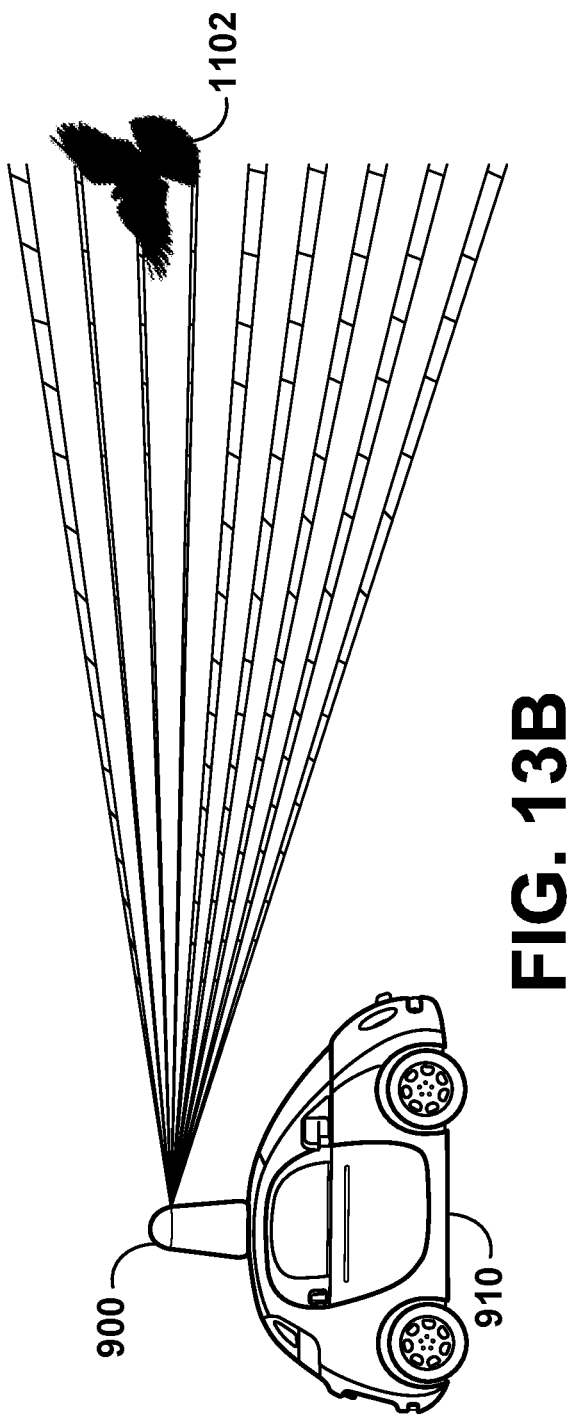

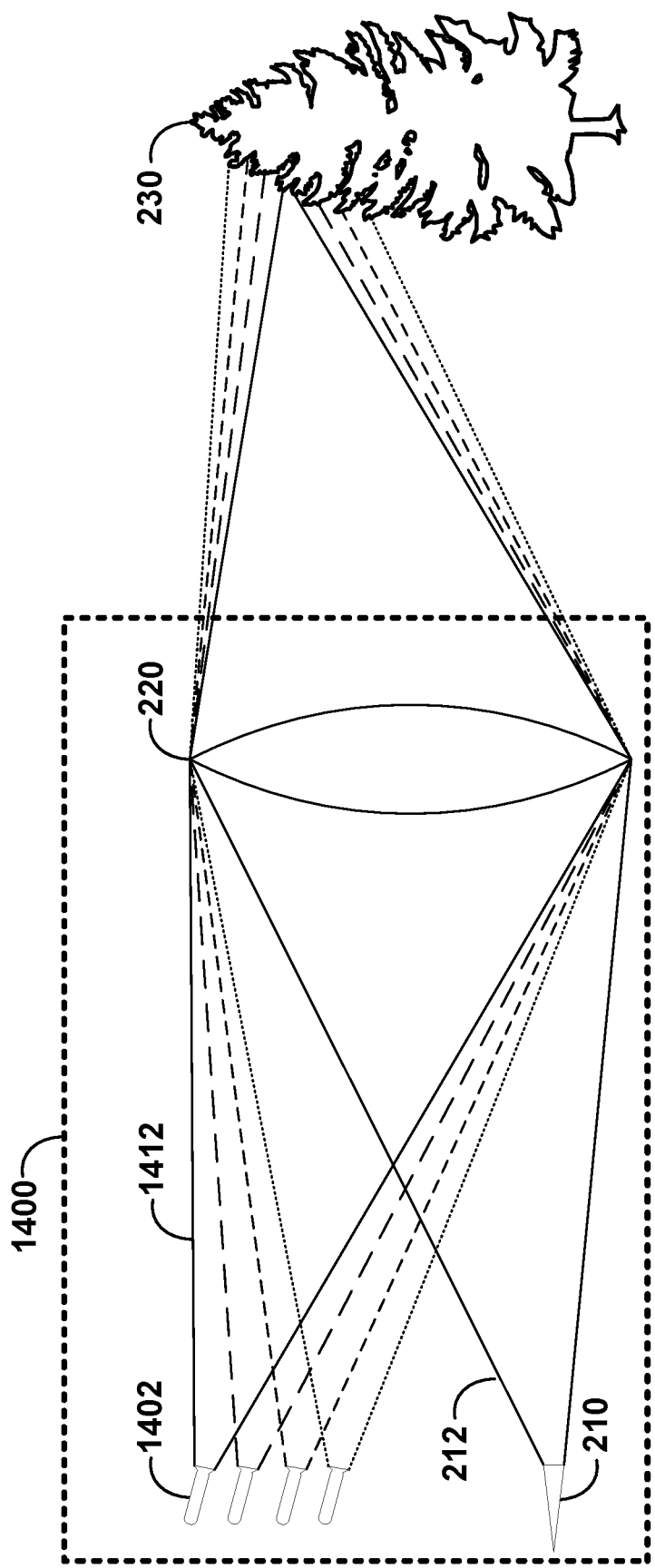

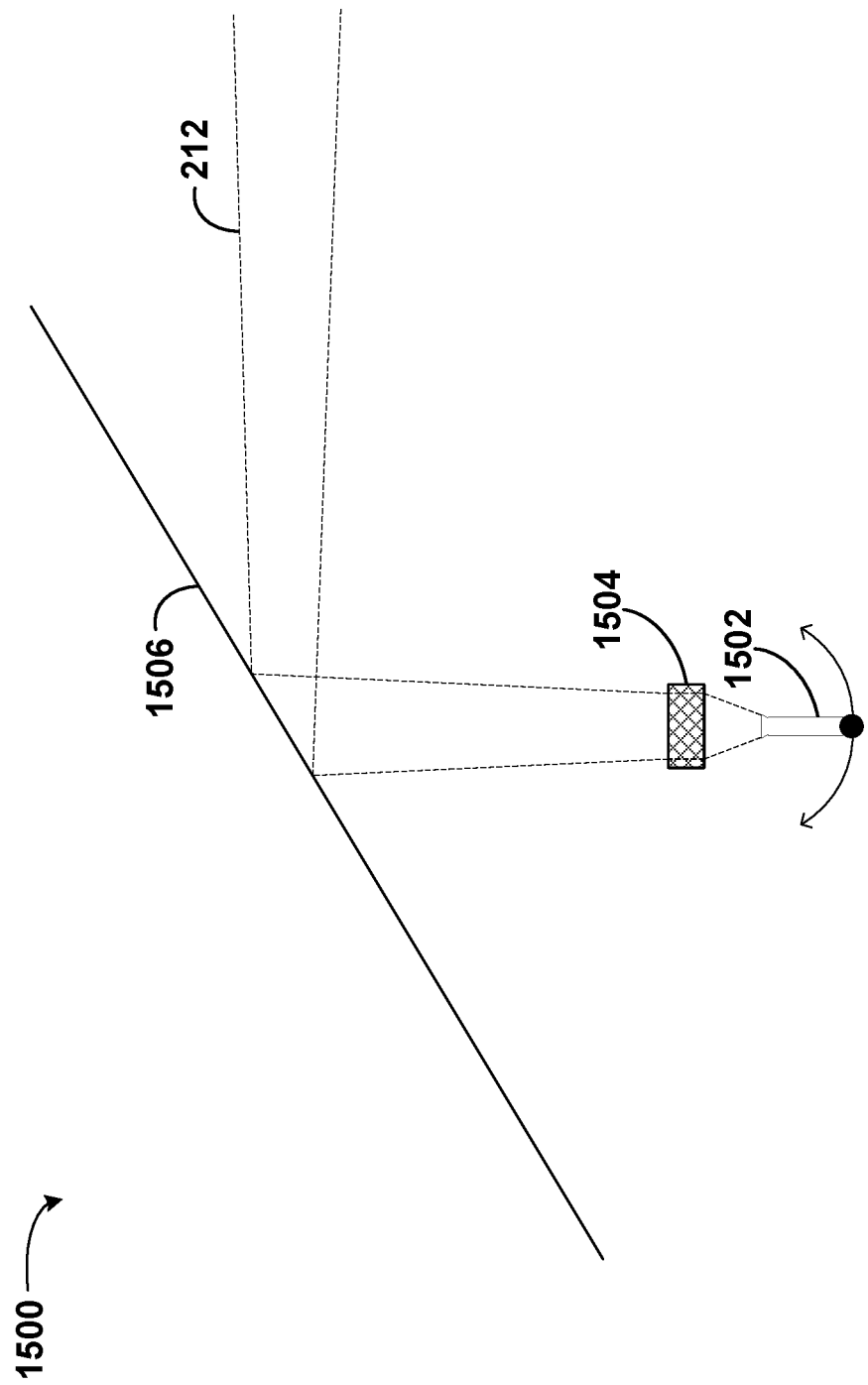

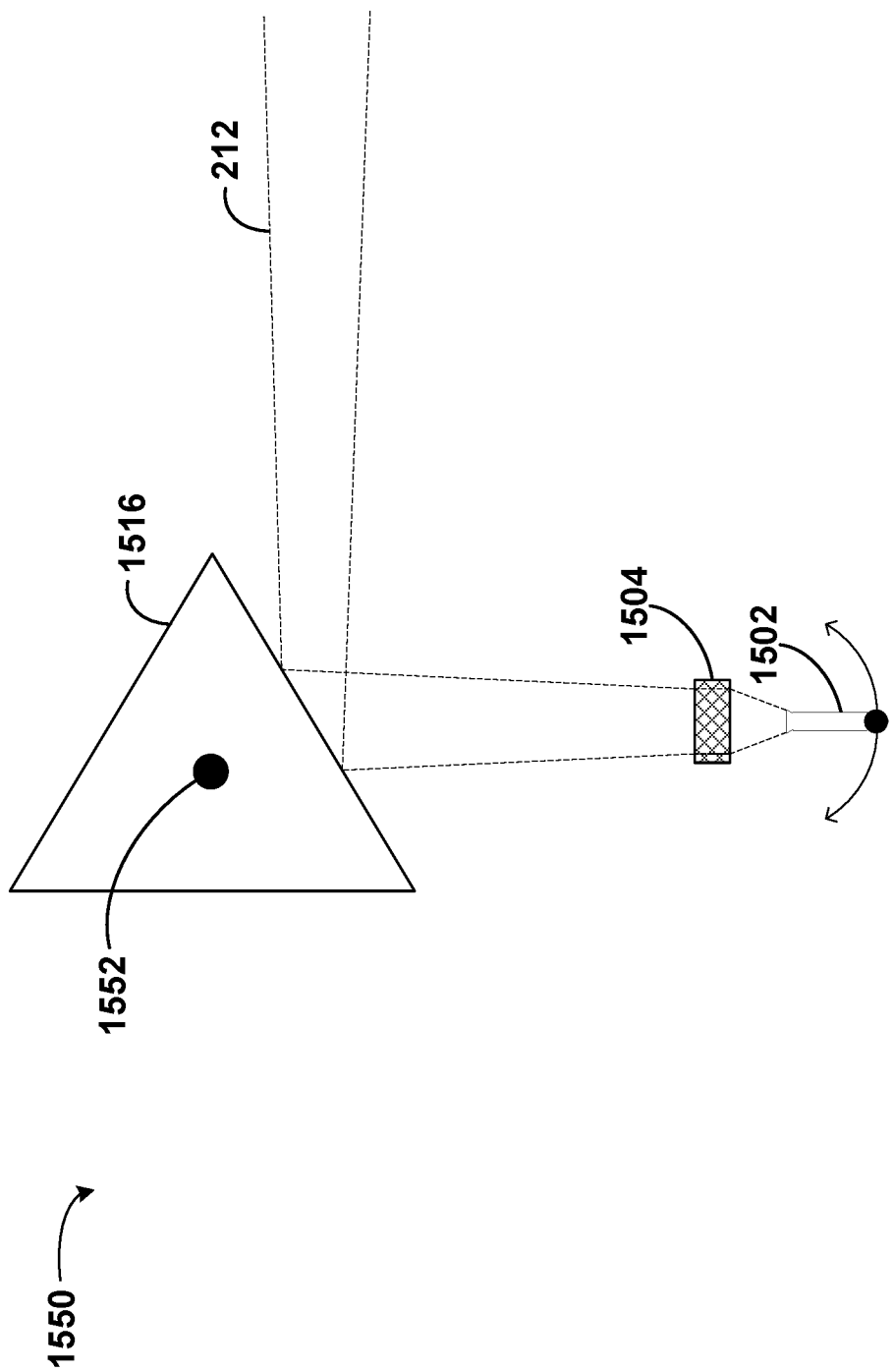

ARRAY OF LIGHT DETECTORS WITH CORRESPONDING ARRAY OF OPTICAL ELEMENTS

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates.

Light detection and ranging (LIDAR) devices may estimate distances to objects in a given environment. For example, an emitter subsystem of a LIDAR system may emit near-infrared light pulses, which may interact with objects in the LIDAR system's environment. At least a portion of the light pulses may be redirected back toward the LIDAR (e.g., due to reflection or scattering) and detected by a receiver subsystem. Conventional receiver subsystems may include a plurality of detectors and a corresponding controller configured to determine an arrival time of the respective light pulses with high temporal resolution (e.g., ~400 ps). The distance between the LIDAR system and a given object may be determined based on a time of flight of the corresponding light pulses that interact with the given object.

SUMMARY

The disclosure relates to an array of light detectors with a corresponding array of optical elements. In some embodiments, the array of light detectors and the corresponding array of optical elements may be components within a LIDAR system (e.g., used for object detection and avoidance within a computer vision system). Such a LIDAR system may include a shared lens, for example, where light signals directed toward light detectors in the array of light detectors first passes through the shared lens. The array of optical elements may alter (e.g., using a filter, a lens, a mirror, an aperture, etc.) individual light signal paths behind the shared lens such that only a single light path corresponding to a single light detector in the array of light detectors is altered. Using such a technique, the light path for each light detector in the array of light detectors can be individually and/or uniquely altered. Such alterations can be based on respective regions within a scene of the LIDAR system. For example, individual light signals may be modified to have different divergences, polarizations, intensities, etc. based on a region of the scene from which a respective light detector receives reflections (e.g., based on a distance between the respective region of the scene and the respective light detector).

In one aspect, a LIDAR system is provided. The LIDAR system includes an array of light detectors. The LIDAR system also includes a shared imaging optic. Further, the LIDAR system includes an array of optical elements positioned between the shared imaging optic and the array of light detectors. Each light detector in the array of light detectors is configured to detect a respective light signal from a respective region of a scene. Each respective light signal is transmitted via the shared imaging optic and modified by a respective optical element in the array of optical elements based on at least one aspect of the scene.

In another aspect, a method is provided. The method includes receiving, at a shared imaging optic of a LIDAR system, a light signal from a respective region of a scene. The method also includes transmitting, by the shared imaging optic, the light signal to an optical element of an array of optical elements of the LIDAR system. Further, the method includes modifying, by the optical element of the array of optical elements, the light signal based on at least one aspect of the scene. In addition, the method includes detecting, by a light detector of an array of light detectors of the LIDAR system, the modified light signal.

In an additional aspect, a LIDAR system is provided. The LIDAR system includes a light emitter configured to emit a light signal. The LIDAR system also includes a mirror. The mirror is configured to direct the emitted light signal toward a scene in a direction that is dependent upon an orientation of the mirror. The orientation of the mirror is adjustable. In addition, the LIDAR system includes an optical element configured to modify the emitted light signal based on at least one aspect of the scene.

In yet another aspect, a system is provided. The system includes a means for receiving, at a shared imaging optic of a LIDAR system, a light signal from a respective region of a scene. The system also includes a means for transmitting, by the shared imaging optic, the light signal to an optical element of an array of optical elements of the LIDAR system. Further, the system also includes a means for modifying, by the optical element of the array of optical elements, the light signal based on at least one aspect of the scene. In addition, the system also includes a means for detecting, by a light detector of an array of light detectors of the LIDAR system, the modified light signal.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 1B is an illustration of a sensing system, according to example embodiments.

FIG. 3B is an illustration of a LIDAR system, according to example embodiments.

FIG. 5C is an illustration of a LIDAR system, according to example embodiments.

FIG. 7A is an illustration of a LIDAR system, according to example embodiments.

FIG. 12A is an illustration of a vehicle equipped with a LIDAR system, according to example embodiments.

FIG. 12B is an illustration of a vehicle equipped with a LIDAR system, according to example embodiments.

FIG. 13A is an illustration of a vehicle equipped with a LIDAR system, according to example embodiments.

FIG. 13B is an illustration of a vehicle equipped with a LIDAR system, according to example embodiments.

FIG. 14 is an illustration of a LIDAR system, according to example embodiments.

FIG. 15A is an illustration of a LIDAR system, according to example embodiments.

FIG. 15B is an illustration of a LIDAR system, according to example embodiments.

DETAILED DESCRIPTION

Figure 1A:
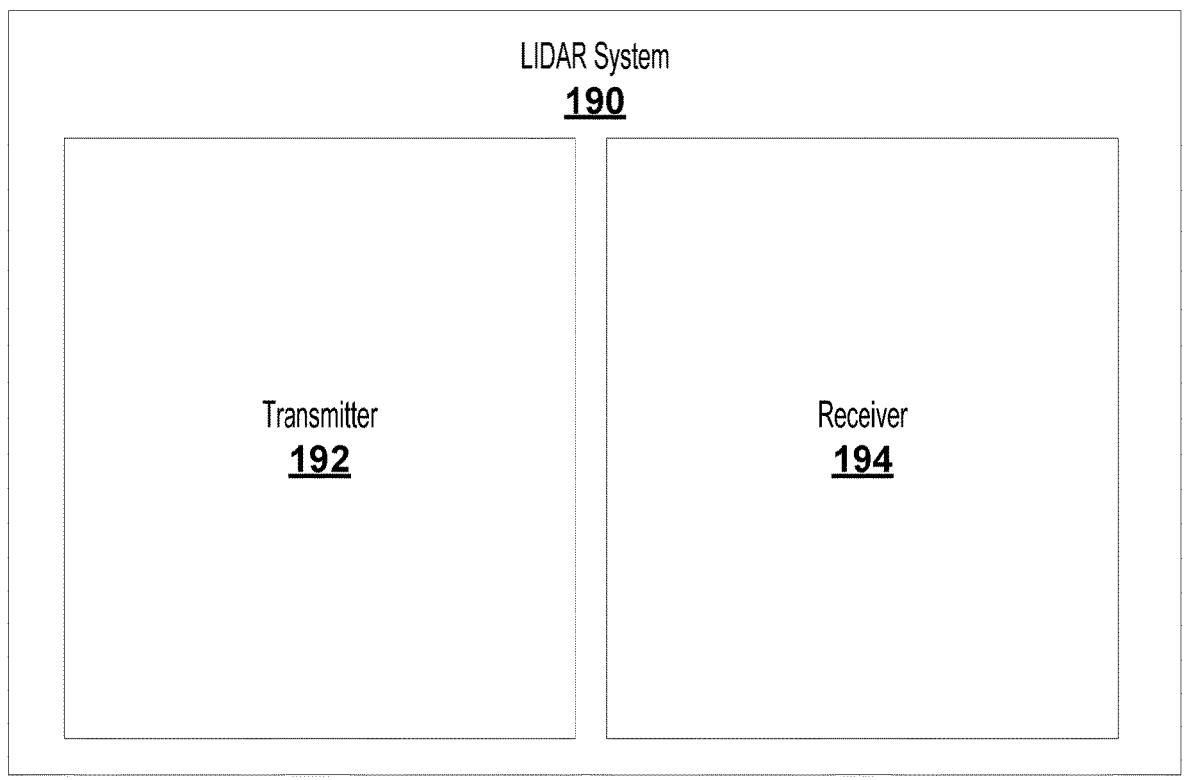
FIG. 1A is an illustration of a LIDAR system, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

A LIDAR system may include an array of light detectors configured to receive light emitted by transmitters in the LIDAR system. Various light detectors in the array of light detectors may detect light reflected from various regions of the scene. In some embodiments, one subset of light detectors may be configured to detect light from objects that are located nearer to the array of light detectors than another subset of light detectors. For example, in a LIDAR system being employed on a vehicle operating in an autonomous mode, some light detectors in the array may be arranged to detect objects that are closer to the vehicle (e.g., on the ground near the tires of the vehicle) and some light detectors in the array may be arranged to detect objects that are further from the vehicle (e.g., signs or pedestrians in front of the vehicle, or trees on the horizon).

Because different light detectors in the array may detect objects at different ranges relative to the detector array, if a shared imaging optic (e.g., shared lens or shared group of lenses) is used to project all light from the scene onto the array of light detectors, some objects may be out of focus. In other words, if a shared imaging optic is used, various objects in the scene (each at respective object planes/ranges) will have various corresponding image planes. If there are various corresponding image planes, and the light detectors in the array are coplanar, each detector will not necessarily be located at the corresponding image plane for the object in the scene that the corresponding detector is attempting to detect.

Embodiments herein describe techniques for including a shared imaging optic in the optical system, while altering the corresponding image planes for objects in the scene such that each corresponding image plane is located at the location of the corresponding detector attempting to detect the corresponding object. Such techniques can also be applied to modify the focus of light detectors in an array of light detectors in the absence of the shared imaging optic.

One such technique includes positioning an array of apertures (e.g., pinhole array) between the array of light detectors and the shared imaging optic. Each light detector may correspond to one or more apertures in the array of apertures. Each of the apertures may alter a depth of focus for the corresponding light detector, thereby adjusting how in-focus a corresponding object within the scene is for a given detector. The apertures may be sized based on the distance of the light detector relative to the object being imaged. For example, smaller apertures may be used for nearer objects in order to sample a smaller portion of a corresponding laser beam used to illuminate the nearer objects, whereas larger apertures may be used for farther objects. In some embodiments, this technique may be used when a shared imaging optic (e.g., lens) is focused to infinity. Additionally, such a technique may improve imaging resolution for nearer objects (where it is potentially more critical), whereas more of the illumination beam may be sampled for farther away objects (where resolution may be less important, but signal decay effects may be more substantial).

In some embodiments, the aperture array may include one or more actively tunable apertures. Such actively tunable apertures could change in size as the range of an object relative to the corresponding light detector is modified. For example, if the orientation of the light detector is modified such that it is receiving light from an object that is farther away than an object from which the light detector was previously receiving light, an iris (e.g., a microelectromechanical systems (MEMS) iris) may expand (e.g., thereby expanding an effective aperture size) to allow more of the reflected light to reach the light detector. Other methods of actively tuning aperture size are also possible (e.g., a rotatable or translatable aperture plate that includes a variety of aperture sizes).

In some regions of the LIDAR system, different light detectors in the array may correspond to individualized detection channels. In other regions of the LIDAR system, a common imaging element may be shared by all detection channels. For example, a common optic (e.g., shared lens or shared group of lenses) may be shared by all detection channels. In the regions of the LIDAR system corresponding to individualized detection channels, each of the individualized detection channels may correspond to a different beam path (e.g., each associated with a respective transmitter, such as a laser, in a transmitter array). Because different light detectors in the array may detect light from different beam paths, individualized optics can be positioned in front of respective detectors in the array in order to individually modify characteristics of light received for a given channel. Such individualized optics, themselves, may be arranged into an array.

In some example embodiments, an array of elements having non-unity indices of refraction may be positioned in between the array of light detectors and the common imaging optic. For example, one or more of the light detectors may be overlaid with a slab of glass (i.e., an optical window). The slab of glass may shift the focal position of the underlying light detector to a different position in object space. This could allow for correction of blurriness within an image by modifying focus. In some embodiments, multiple light detectors in the array may be overlaid with slabs of glass of varying thicknesses. In such embodiments, the shift in focal position could be uniquely tailored for each light detector, thereby individually correcting focal position across all light detectors.

In some embodiments, a single slab of glass of variable thickness could be positioned in front of the entire array of light detectors. For example, if the array of light detectors is arranged such that a first region of the array includes light detectors that detect light from shorter ranges and a second region of the array includes light detectors that detect light from longer ranges, the slab of glass could be shaped as a staircase or a wedge, in terms of thickness. In addition to or instead of glass, the optical window could be fabricated from plastic (e.g., molded plastic that conforms to a predefined shape based on a desired set of focal position corrections). In alternative embodiments, discrete optical windows could cover only a subset of the light detectors in the array (e.g., rather than a glass slab covering the entire array of light detectors).

Additionally or alternatively, other optical components (e.g., arranged in an array) could overlay the light detectors in the array. Such optical components could modify one or more of the following optical qualities of the light detector: aperture, focus, aberration, astigmatism, exposure time, phase, chromaticity, polarization, or telecentricity. For example, MEMS shutters, chromatic filters (e.g., band-pass filters or band-reject filters), polarization filters, neutral-density filters, electrowetting lenses, microlenses, liquid-crystal lenses, or a combination thereof could be positioned in an optical array in front of the array of light detectors. In some embodiments, one or more of the optical components may be defined lithographically. Further, one or more of the optical components may be actively tunable. Such actively tunable components could be tuned based on desired detection characteristics (e.g., the focal length could be tuned actively based on a desired detection range). In addition, the active tuning could be determined based on environmental factors within a corresponding scene being observed (e.g., when a LIDAR system detects stray light representing noise within a given wavelength range, a chromatic filter could be actively tuned to reject light having wavelengths in the given wavelength range).

II. Example Systems

The following description and accompanying drawings will elucidate features of various example embodiments. The embodiments provided are by way of example, and are not intended to be limiting. As such, the dimensions of the drawings are not necessarily to scale.

FIG. 1A is a block diagram illustration of a LIDAR system 190, according to example embodiments. The LIDAR system 190 includes a transmitter 192 and a receiver 194. The LIDAR system 190 may be used for navigation and/or object detection and avoidance within an autonomous vehicle (e.g., a self-driving car, an autonomous drone, an autonomous truck, an autonomous boat, an autonomous submarine, an autonomous helicopter, etc.) or a vehicle operating in an autonomous mode or a semi-autonomous mode, for example. In an example embodiment, the LIDAR system 190 could provide point cloud information, object information, mapping information, or other information to the vehicle. Alternatively, the LIDAR system 190 may be used for other computer vision purposes.

The transmitter 192 may be configured to emit light. For example, the transmitter 192 may include a laser or a light-emitting diode (LED) or an array of lasers or LEDs. The light emitted by the transmitter 192 may be modulated at a predetermined frequency, in some embodiments. Further, the light emitted by the transmitter 192 may correspond (e.g., in wavelength or polarization) to a sensitivity of the receiver 194. For example, if the receiver 194 includes a bandpass chromatic filter, the transmitter 192 may emit light of a wavelength such that the light can pass through the bandpass chromatic filter of the receiver 194.

The receiver 194 may be configured to detect light (e.g., to detect light emitted from the transmitter 192). In some embodiments, the receiver 194 may include one or more photodetectors (e.g., avalanche photodiodes (APDs) or silicon photomultipliers (SiPMs)). The receiver 194 may include components in addition to the photodetectors, such as lenses, stages, filters, a computing device, etc. As described above, the receiver 194 may be sensitive (e.g., in wavelength or polarization) to light emitted by the transmitter 192. For example, the receiver 194 may include a polarization filter that is configured to block horizontally polarized light, but pass vertically polarized light, where only vertically polarized light is emitted from the transmitter 192. In such a way, the receiver 194 can eliminate noise arising from stray light coming from sources other than the transmitter 192. In some embodiments, the receiver 194 may be configured to detect light modulated at a frequency corresponding to a modulation frequency of the transmitter 192.

In example embodiments, a signal may be emitted from the transmitter 192. The signal may be scattered by objects within a scene and consequently detected by the receiver 194 (e.g., by one or more light detectors within the receiver 194) of the LIDAR system 190 to analyze the scene (e.g., to determine the shape of an object or an object's distance from the LIDAR system 190). The LIDAR system 190 may be configured to provide information (e.g., point cloud data) about one or more objects (e.g., location, shape, etc.) in the external environment to a computer device, for example.

FIG. 1B illustrates a sensing system 10, according to example embodiments. The sensing system 10 may include a housing 12 that houses an arrangement of various components, such as a transmit block 20, a receive block 30, a shared space 40, and shared optical element (e.g., a lens 50). The sensing system 10 may be a light detection and ranging (LIDAR) system (e.g., similar to the LIDAR system 190 illustrated in FIG. 1A). For example, the transmit block 20 may correspond to the transmitter 192 illustrated in FIG. 1A and/or the receive block 30 may correspond to the receiver 194 illustrated in FIG. 1A. The sensing system 10 may also include an arrangement of components configured to provide emitted light beams 52 from the transmit block 20 that are collimated by the lens 50 and transmitted into an environment of the sensing system 10 as collimated light beams 54. Further, the sensing system 10 may include an arrangement of components configured to collect reflected light 56 from one or more objects in the environment of the sensing system 10 by the lens 50 for focusing towards the receive block 30 as focused light 58. The reflected light 56 may include light from the collimated light beams 54 that was reflected by the one or more objects in the environment of the sensing system 10.

The emitted light beams 52 and focused light 58 may traverse the shared space 40 also included in the housing 12. In some embodiments, the emitted light beams 52 propagate along a transmit path through the shared space 40 and the focused light 58 propagates along a receive path through the shared space 40. Further, in some embodiments, such transmit paths and receive paths may be collinear.

The sensing system 10 can determine an aspect of the one or more objects (e.g., location, shape, etc.) in the environment of the sensing system 10 by processing the focused light 58 received by the receive block 30. For example, the sensing system 10 can compare a time when pulses included in the emitted light beams 52 were emitted by the transmit block 20 with a time when corresponding pulses included in the focused light 58 were received by the receive block 30 and determine the distance between the one or more objects and the sensing system 10 based on the comparison.

The housing 12 included in the sensing system 10 can provide a platform for mounting the various components included in the sensing system 10. The housing 12 can be formed from any material capable of supporting the various components of the sensing system 10 included in an interior space of the housing 12. For example, the housing 12 may be formed from a structural material such as plastic or metal.

In some examples, the housing 12 may include optical shielding configured to reduce ambient light and/or unintentional transmission of the emitted light beams 52 from the transmit block 20 to the receive block 30. The optical shielding can be provided by forming and/or coating the outer surface of the housing 12 with a material that blocks the ambient light from the environment. Additionally, inner surfaces of the housing 12 can include and/or be coated with the material described above to optically isolate the transmit block 20 from the receive block 30 to prevent the receive block 30 from receiving the emitted light beams 52 before the emitted light beams 52 reach the lens 50.

In some examples, the housing 12 can be configured for electromagnetic shielding to reduce electromagnetic noise (e.g., radio-frequency (RF) noise, etc.) from ambient environment of the sensing system 10 and/or electromagnetic noise between the transmit block 20 and the receive block 30. Electromagnetic shielding can improve quality of the emitted light beams 52 emitted by the transmit block 20 and reduce noise in signals received and/or provided by the receive block 30. Electromagnetic shielding can be achieved by forming and/or coating the housing 12 with one or more materials such as a metal, metallic ink, metallic foam, carbon foam, or any other material configured to appropriately absorb or reflect electromagnetic radiation. Metals that can be used for the electromagnetic shielding can include for example, copper or nickel.

In some examples, the housing 12 can be configured to have a substantially cylindrical shape and to rotate about an axis of the sensing system 10. For example, the housing 12 can have the substantially cylindrical shape with a diameter of approximately 10 centimeters. In some examples, the axis is substantially vertical. By rotating the housing 12 that includes the various components, in some examples, a three-dimensional map of a 360 degree view of the environment of the sensing system 10 can be determined without frequent recalibration of the arrangement of the various components of the sensing system 10. Additionally or alternatively, the sensing system 10 can be configured to tilt the axis of rotation of the housing 12 to control the field of view of the sensing system 10.

Although not illustrated in FIG. 1B, the sensing system 10 can optionally include a mounting structure for the housing 12. The mounting structure can include a motor or other means for rotating the housing 12 about the axis of the sensing system 10. Alternatively, the mounting structure can be included in a device and/or system other than the sensing system 10.

In some examples, the various components of the sensing system 10 such as the transmit block 20, receive block 30, and the lens 50 can be removably mounted to the housing 12 in predetermined positions to reduce burden of calibrating the arrangement of each component and/or subcomponents included in each component. Thus, the housing 12 may act as the platform for the various components of the sensing system 10 to provide ease of assembly, maintenance, calibration, and manufacture of the sensing system 10.

The transmit block 20 includes a plurality of light sources 22 that can be configured to emit the plurality of emitted light beams 52 via an exit aperture 26. In some examples, each of the plurality of emitted light beams 52 corresponds to one of the plurality of light sources 22. The transmit block 20 can optionally include a mirror 24 along the transmit path of the emitted light beams 52 between the light sources 22 and the exit aperture 26.

The light sources 22 can include laser diodes, light emitting diodes (LED), vertical cavity surface emitting lasers (VCSEL), organic light emitting diodes (OLED), polymer light emitting diodes (PLED), light emitting polymers (LEP), liquid-crystal displays (LCDs), MEMS, or any other device configured to selectively transmit, reflect, and/or emit light to provide the plurality of emitted light beams 52. In some examples, the light sources 22 can be configured to emit the emitted light beams 52 in a wavelength range that can be detected by detectors 32 included in the receive block 30. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately 905 nm. Additionally, the light sources 22 can be configured to emit the emitted light beams 52 in the form of pulses. In some examples, the plurality of light sources 22 can be positioned on one or more substrates (e.g., printed circuit boards (PCB), flexible PCBs, etc.) and arranged to emit the plurality of light beams 52 towards the exit aperture 26.

In some examples, the plurality of light sources 22 can be configured to emit uncollimated light beams included in the emitted light beams 52. For example, the emitted light beams 52 can diverge in one or more directions along the transmit path due to the uncollimated light beams emitted by the plurality of light sources 22. In some examples, vertical and horizontal extents of the emitted light beams 52 at any position along the transmit path can be based on an extent of the divergence of the uncollimated light beams emitted by the plurality of light sources 22.

The exit aperture 26 arranged along the transmit path of the emitted light beams 52 can be configured to accommodate the vertical and horizontal extents of the plurality of light beams 52 emitted by the plurality of light sources 22 at the exit aperture 26. It is noted that the block diagram shown in FIG. 1B is described in connection with functional modules for convenience in description. However, the functional modules in the block diagram of FIG. 1B can be physically implemented in other locations. For example, although illustrated that the exit aperture 26 is included in the transmit block 20, the exit aperture 26 can be physically included in both the transmit block 20 and the shared space 40. For example, the transmit block 20 and the shared space 40 can be separated by a wall that includes the exit aperture 26. In this case, the exit aperture 26 can correspond to a transparent portion of the wall. In one example, the transparent portion can be a hole or cut-away portion of the wall. In another example, the wall can be formed from a transparent substrate (e.g., glass) coated with a non-transparent material, and the exit aperture 26 can be a portion of the substrate that is not coated with the non-transparent material.

In some examples of the sensing system 10, it may be desirable to minimize size of the exit aperture 26 while accommodating the vertical and horizontal extents of the plurality of light beams 52. For example, minimizing the size of the exit aperture 26 can improve the optical shielding of the light sources 22 described above in the functions of the housing 12. Additionally or alternatively, the wall separating the transmit block 20 and the shared space 40 can be arranged along the receive path of the focused light 58, and thus, the exit aperture 26 can be minimized to allow a larger portion of the focused light 58 to reach the wall. For example, the wall can be coated with a reflective material (e.g., reflective surface 42 in shared space 40) and the receive path can include reflecting the focused light 58 by the reflective material towards the receive block 30. In this case, minimizing the size of the exit aperture 26 can allow a larger portion of the focused light 58 to reflect off the reflective material with which the wall is coated.

To minimize the size of the exit aperture 26, in some examples, the divergence of the emitted light beams 52 can be reduced by partially collimating the uncollimated light beams emitted by the light sources 22 to minimize the vertical and horizontal extents of the emitted light beams 52 and thus minimize the size of the exit aperture 26. For example, each light source of the plurality of light sources 22 can include a cylindrical lens arranged adjacent to the light source. The light source may emit a corresponding uncollimated light beam that diverges more in a first direction than in a second direction. The cylindrical lens may pre-collimate the uncollimated light beam in the first direction to provide a partially collimated light beam, thereby reducing the divergence in the first direction. In some examples, the partially collimated light beam diverges less in the first direction than in the second direction. Similarly, uncollimated light beams from other light sources of the plurality of light sources 22 can have a reduced beam width in the first direction and thus the emitted light beams 52 can have a smaller divergence due to the partially collimated light beams. In this example, at least one of the vertical and horizontal extents of the exit aperture 26 can be reduced due to partially collimating the light beams 52.

Additionally or alternatively, to minimize the size of the exit aperture 26, in some examples, the light sources 22 can be arranged along a shaped surface defined by the transmit block 20. In some examples, the shaped surface may be faceted and/or substantially curved. The faceted and/or curved surface can be configured such that the emitted light beams 52 converge towards the exit aperture 26, and thus the vertical and horizontal extents of the emitted light beams 52 at the exit aperture 26 can be reduced due to the arrangement of the light sources 22 along the faceted and/or curved surface of the transmit block 20.

In some examples, a curved surface of the transmit block 20 can include a curvature along the first direction of divergence of the emitted light beams 52 and a curvature along the second direction of divergence of the emitted light beams 52, such that the plurality of light beams 52 converge towards a central area in front of the plurality of light sources 22 along the transmit path.

To facilitate such curved arrangement of the light sources 22, in some examples, the light sources 22 can be positioned on a flexible substrate (e.g., flexible PCB) having a curvature along one or more directions. For example, the curved flexible substrate can be curved along the first direction of divergence of the emitted light beams 52 and the second direction of divergence of the emitted light beams 52. Additionally or alternatively, to facilitate such curved arrangement of the light sources 22, in some examples, the light sources 22 can be positioned on a curved edge of one or more vertically-oriented PCBs, such that the curved edge of the PCB substantially matches the curvature of the first direction (e.g., the vertical plane of the PCB). In this example, the one or more PCBs can be mounted in the transmit block 20 along a horizontal curvature that substantially matches the curvature of the second direction (e.g., the horizontal plane of the one or more PCBs). For example, the transmit block 20 can include four PCBs, with each PCB mounting sixteen light sources, so as to provide 64 light sources along the curved surface of the transmit block 20. In this example, the 64 light sources are arranged in a pattern such that the emitted light beams 52 converge towards the exit aperture 26 of the transmit block 20.

The transmit block 20 can optionally include the mirror 24 along the transmit path of the emitted light beams 52 between the light sources 22 and the exit aperture 26. By including the mirror 24 in the transmit block 20, the transmit path of the emitted light beams 52 can be folded to provide a smaller size of the transmit block 20 and the housing 12 of the sensing system 10 than a size of another transmit block where the transmit path that is not folded.

The receive block 30 includes a plurality of detectors 32 that can be configured to receive the focused light 58 via an entrance aperture 36. In some examples, each of the plurality of detectors 32 is configured and arranged to receive a portion of the focused light 58 corresponding to a light beam emitted by a corresponding light source of the plurality of light sources 22 and reflected of the one or more objects in the environment of the sensing system 10. The receive block 30 can optionally include the detectors 32 in a sealed environment having an inert gas 34.

The detectors 32 may comprise photodiodes, avalanche photodiodes, phototransistors, cameras, active pixel sensors (APS), charge coupled devices (CCD), cryogenic detectors, or any other sensor of light configured to receive focused light 58 having wavelengths in the wavelength range of the emitted light beams 52.

To facilitate receiving, by each of the detectors 32, the portion of the focused light 58 from the corresponding light source of the plurality of light sources 22, the detectors 32 can be positioned on one or more substrates and arranged accordingly. For example, the light sources 22 can be arranged along a curved surface of the transmit block 20. Detectors 32 can be arranged along a curved surface of the receive block 30. In some embodiments, the curved surface of the receive block 30 may include a similar or identical curved surface as that of transmit block 20. Thus, each of the detectors 32 may be configured to receive light that was originally emitted by a corresponding light source of the plurality of light sources 22.

To provide the curved surface of the receive block 30, the detectors 32 can be positioned on the one or more substrates similarly to the light sources 22 positioned in the transmit block 20. For example, the detectors 32 can be positioned on a flexible substrate (e.g., flexible PCB) and arranged along the curved surface of the flexible substrate to each receive focused light originating from a corresponding light source of the light sources 22. In this example, the flexible substrate may be held between two clamping pieces that have surfaces corresponding to the shape of the curved surface of the receive block 30. Thus, in this example, assembly of the receive block 30 can be simplified by sliding the flexible substrate onto the receive block 30 and using the two clamping pieces to hold it at the correct curvature.

The focused light 58 traversing along the receive path can be received by the detectors 32 via the entrance aperture 36. In some examples, the entrance aperture 36 can include a filtering window that passes light having wavelengths within the wavelength range emitted by the plurality of light sources 22 and attenuates light having other wavelengths. In this example, the detectors 32 receive the focused light 58 substantially comprising light having the wavelengths within the wavelength range.

In some examples, the plurality of detectors 32 included in the receive block 30 can include, for example, avalanche photodiodes in a sealed environment that is filled with the inert gas 34. The inert gas 34 may comprise, for example, nitrogen.

The shared space 40 includes the transmit path for the emitted light beams 52 from the transmit block 20 to the lens 50, and includes the receive path for the focused light 58 from the lens 50 to the receive block 30. In some examples, the transmit path at least partially overlaps with the receive path in the shared space 40. By including the transmit path and the receive path in the shared space 40, advantages with respect to size, cost, and/or complexity of assembly, manufacture, and/or maintenance of the sensing system 10 can be provided.

While the exit aperture 26 and the entrance aperture 36 are illustrated as being part of the transmit block 20 and the receive block 30, respectively, it is understood that such apertures may be arranged or placed at other locations. In some embodiments, the function and structure of the exit aperture 26 and the entrance aperture 36 may be combined. For example, the shared space 40 may include a shared entrance/exit aperture. It will be understood that other ways to arrange the optical components of sensing system 10 within housing 12 are possible and contemplated.

In some examples, the shared space 40 can include a reflective surface 42. The reflective surface 42 can be arranged along the receive path and configured to reflect the focused light 58 towards the entrance aperture 36 and onto the detectors 32. The reflective surface 42 may comprise a prism, mirror or any other optical element configured to reflect the focused light 58 towards the entrance aperture 36 in the receive block 30. In some examples, a wall may separate the shared space 40 from the transmit block 20. In these examples, the wall may comprise a transparent substrate (e.g., glass) and the reflective surface 42 may comprise a reflective coating on the wall with an uncoated portion for the exit aperture 26.

In embodiments including the reflective surface 42, the reflective surface 42 can reduce size of the shared space 40 by folding the receive path similarly to the mirror 24 in the transmit block 20. Additionally or alternatively, in some examples, the reflective surface 42 can direct the focused light 58 to the receive block 30 further providing flexibility to the placement of the receive block 30 in the housing 12. For example, varying the tilt of the reflective surface 42 can cause the focused light 58 to be reflected to various portions of the interior space of the housing 12, and thus the receive block 30 can be placed in a corresponding position in the housing 12. Additionally or alternatively, in this example, the sensing system 10 can be calibrated by varying the tilt of the reflective surface 42. In some embodiments (e.g., embodiments where amount of shared space 40 is not of concern), the sensing system 10 may not include the reflective surface 42.

The lens 50 mounted to the housing 12 can have an optical power to both collimate the emitted light beams 52 from the light sources 22 in the transmit block 20, and focus the reflected light 56 from the one or more objects in the environment of the sensing system 10 onto the detectors 32 in the receive block 30. In one example, the lens 50 has a focal length of approximately 120 mm. By using the same lens 50 to perform both of these functions, instead of a transmit lens for collimating and a receive lens for focusing, advantages with respect to size, cost, and/or complexity can be provided. In some examples, collimating the emitted light beams 52 to provide the collimated light beams 54 allows determining the distance travelled by the collimated light beams 54 to the one or more objects in the environment of the sensing system 10.

While, as described herein, lens 50 is utilized as a transmit lens and a receive lens, it will be understood that separate lens and/or other optical elements are contemplated within the scope of the present disclosure. For example, lens 50 could represent distinct lenses or lens sets along discrete optical transmit and receive paths.

In an example scenario, the emitted light beams 52 from the light sources 22 traversing along the transmit path can be collimated by the lens 50 to provide the collimated light beams 54 to the environment of the sensing system 10. The collimated light beams 54 may then reflect off the one or more objects in the environment of the sensing system 10 and return to the lens 50 as the reflected light 56. The lens 50 may then collect and focus the reflected light 56 as the focused light 58 onto the detectors 32 included in the receive block 30. In some examples, aspects of the one or more objects in the environment of the sensing system 10 can be determined by comparing the emitted light beams 52 with the focused light 58. The aspects can include, for example, distance, shape, color, and/or material of the one or more objects. Additionally, in some examples, by rotating the housing 12, a three-dimensional map of the surroundings of the sensing system 10 can be determined.

In some examples where the plurality of light sources 22 are arranged along a curved surface of the transmit block 20, the lens 50 can be configured to have a focal surface corresponding to the curved surface of the transmit block 20. For example, the lens 50 can include an aspheric surface outside the housing 12 and a toroidal surface inside the housing 12 facing the shared space 40. In this example, the shape of the lens 50 allows the lens 50 to both collimate the emitted light beams 52 and focus the reflected light 56. Additionally, in this example, the shape of the lens 50 allows the lens 50 to have the focal surface corresponding to the curved surface of the transmit block 20. In some examples, the focal surface provided by the lens 50 substantially matches the curved shape of the transmit block 20. Additionally, in some examples, the detectors 32 can be arranged similarly in the curved shape of the receive block 30 to receive the focused light 58 along the curved focal surface provided by the lens 50. Thus, in some examples, the curved surface of the receive block 30 may also substantially match the curved focal surface provided by the lens 50.

Figure 1C:
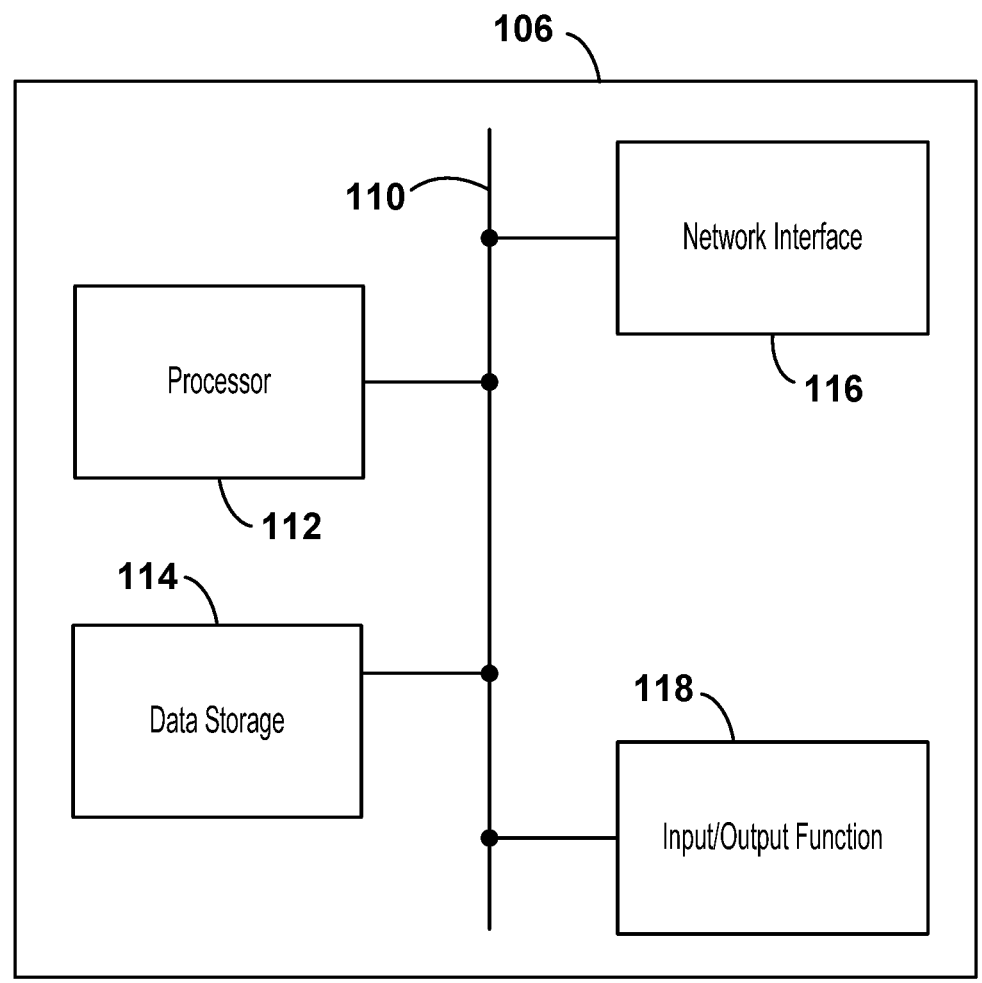
FIG. 1C is an illustration of a computing device, according to example embodiments.

FIG. 1C is an illustration of a computing device 106, according to example embodiments. The computing device 106 may be used to control one or more components described herein. For example, the computing device 106 may be used to control an autonomous vehicle or a vehicle operating in an autonomous or semi-autonomous mode. Additionally or alternatively, the computing device 106 may be used to control one or more components within the LIDAR system 190/the sensing system 10, such as a positioning of one or more light sources 22 or detectors 32.

In order to perform functions as described herein, the computing device 106 may include a variety of components, as illustrated in FIG. 1C. FIG. 1C is a simplified block diagram of a computing device 106, illustrating some of the functional components that could be included in a computing device arranged to operate in accordance with the embodiments contemplated herein. The computing device 106 could be a desktop computing device, laptop computing device, mobile computing device, tablet computing device, server computing device, or some other type of computing device, in various embodiments.

As illustrated in FIG. 1C, the computing device 106 may include a processor 112, a data storage 114, a network interface 116, and an input/output function 118, all of which may be coupled by a system bus 110 or a similar mechanism. The processor 112 may include one or more central processing units (CPUs), such as one or more general purpose processors and/or one or more dedicated processors (e.g., application specific integrated circuits (ASICs), digital signal processors (DSPs), network processors, field-programmable gate arrays (FPGAs), etc.). In some embodiments, the computing device 106 may be located remotely from the camera 102 (e.g., the computing device 106 may be a cloud computing device or a networked computing device).

The data storage 114, in turn, may include volatile memory (e.g., random access memory (RAM)) and/or non-volatile memory (e.g., a hard drive, read-only memory (ROM), programmable read-only memory (PROM), erasable programmable read-only memory (EPROM), electrically erasable programmable read-only memory (EEPROM), non-volatile random-access memory (such as flash memory), a solid state drive (SSD), a hard disk drive (HDD), a compact disc (CD), a digital video disk (DVD), a digital tape, a read/write (RW) CD, an RW DVD, etc.). As such, the data storage 114 may include a non-transitory, computer-readable medium. Further, the data storage 114 may be integrated in whole or in part with processor 112. In some embodiments, the data storage 114 may store program instructions, executable by the processor 112, and data that may be manipulated by these program instructions to carry out the various methods, processes, or operations contemplated herein. Alternatively, these methods, processes, or operations can be defined by hardware, firmware, and/or any combination of hardware, firmware, and software.

The network interface 116 may include one or more wireline connections, such as an Ethernet connection or a universal serial bus (USB) connection. Additionally or alternatively, the network interface 116 may include one or more wireless interfaces, such as Institute of Electrical and Electronics Engineers (IEEE) standard 802.11 (WIFI®), BLUETOOTH®, BLUETOOTH LOW ENERGY (BLE®), cellular technology (e.g., global system for mobile communications (GSM), code-division multiple access (CDMA), universal mobile telecommunications system (UMTS), evolution-data optimized (EV-DO), worldwide interoperability for microwave access (WiMAX), or long-term evolution (LTE®)), dedicated short range communications (DSRC), communication protocols described in IEEE standard 802.15.4 (e.g., ZIGBEE®), or a wide-area wireless connection. Other forms of physical layer connections and other types of standard or proprietary communication protocols may be used over the network interface 116.

The input/output function 118 may facilitate user interaction with the computing device 106. Further, the input/output function 118 may include multiple types of input devices, such as a keyboard, a mouse, a touch screen, etc. Similarly, the input/output function 118 may include multiple types of output devices, such as a screen, monitor, printer, one or more LEDs, etc. Additionally or alternatively, the computing device 106 may support remote access from another device, via the network interface 116 or via another interface (not shown), such as a high-definition multimedia interface (HDMI) port.

In some embodiments, the computing device 106 may include one or more remote computing devices deployed in a networked architecture. The exact physical location, connectivity, and configuration of the remote computing devices may be unknown and/or unimportant. Accordingly, in some embodiments, the computing device 106 may be referred to as a "cloud-based" device that may be housed at various remote locations.

Additionally, in some embodiments, the computing device 106 may be used to tune one or more tunable optical elements (e.g., tunable optical elements within an array of optical elements as described herein). The computing device 106 may receive an input signal from another sensor or device (e.g., from a camera or a distance sensor) that is used by the computing device 106 to determine one or more aspects of a scene or that indicates one or more aspects of the scene (e.g. if the input signal were sent by another device, such as a mobile computing device). Then, based on the input signal, the computing device 106 (e.g., the processor 112 of the computing device 106) may determine a degree to which one or more of the tunable optical elements is to be tuned (e.g., a degree to which an optical filter or an iris is to be tuned). This determination may be stored in the data storage 114, in some embodiments. Then, based on that determination, the computing device 106 may effectuate one or more changes to the tunable optical elements. Effectuating the changes may include transmitting a tuning signal (e.g., via the network interface 116) to one or more of the tunable optical elements (e.g., within the array of optical elements). In some embodiments (e.g., embodiments where the computing device 106 determines and effectuates changes to the tunable optical elements), the computing device 106 may be referred to as a tuning controller.

Figure 2A:
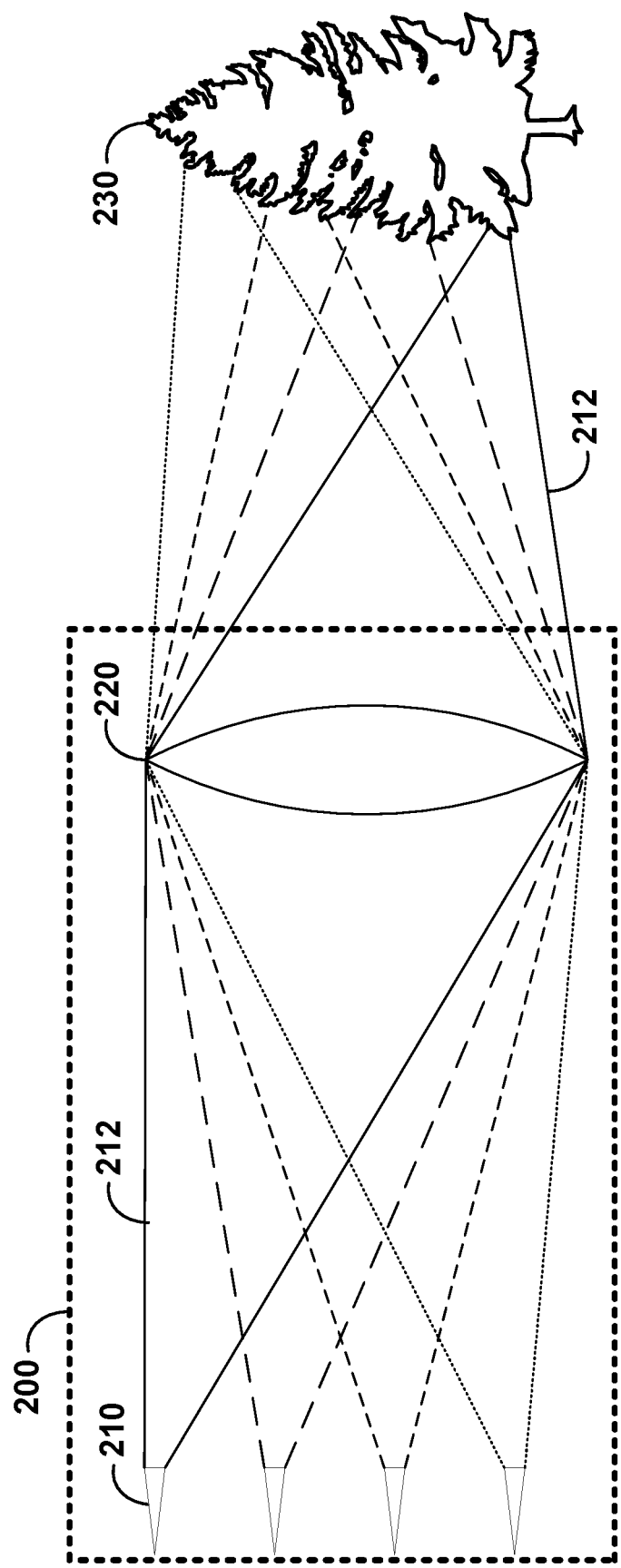
FIG. 2A is an illustration of a LIDAR system, according to example embodiments.

FIG. 2A illustrates a LIDAR system 200, according to example embodiments. The LIDAR system 200 may be similar to the LIDAR system 190 illustrated in FIG. 1A and/or the sensing system 10 illustrated in FIG. 1B. For example, the LIDAR system 200 may include the receiver 194 of the LIDAR system 190, in some embodiments. Additionally, in some embodiments, the LIDAR system 200 may be controlled by and/or provide data to a computing device (e.g., the computing device 106 illustrated in FIG. 1C). Further, the LIDAR system 200 may be a component of an autonomous vehicle or a vehicle operating in an autonomous or semi-autonomous mode. In such embodiments, the LIDAR system 200 may be used for object detection and avoidance, for example.

As illustrated, the LIDAR system 200 may include an array of light detectors 210 and a shared lens 220. Each of the light detectors 210 may receive a respective light signal 212 via the shared lens 220. The respective light signals 212 may each be reflected from a scene 230 (e.g., from various regions of the scene 230). Only a single light detector 210 and a single light signal 212 are labeled in FIG. 2A in order to avoid cluttering the figure.

In some embodiments, the LIDAR system 200 may include one or more light emitters. For example, the LIDAR system 200 may include an array of light emitters with a light emitter corresponding to each of the light detectors 210 in the array of light detectors 210. Such an array of light emitters may share a collinear light path with the array of light detectors 210 (e.g., each light emitter may share an optical fiber with a corresponding light detector 210, and the optical fiber may be used to transmit emitted light and received light to/from the shared lens 220). In various embodiments, arrays (e.g., arrays of light emitters or arrays of optical elements) may include one-dimensional, two-dimensional, or three-dimensional arrays. Further, in various embodiments, arrays may be arranged in collinear, non-collinear, coplanar, and/or non-coplanar arrangements.

In various embodiments, the light detectors 210 may include different types of detectors. For example, the array of light detectors 210 may include one or more photodetectors, APDs, or SiPMs. The light detectors 210 may have a uniform shape and size (e.g., uniform package size), in some embodiments. For example, the light detectors 210 may have detection regions between 0.5 mm and 5.0 mm in diameter (e.g., around 1.0 mm in diameter). In other embodiments, the light detectors 210 may have two or more different shapes and sizes. As illustrated in FIG. 2A, the light detectors 210 may be vertically aligned. It is understood that in other embodiments, the light detectors 210 may be arranged in a different fashion. For example, the light detectors 210 may be horizontally aligned. Alternatively, the light detectors 210 may be arranged into a two-dimensional (2D) array. Further, in some embodiments, the light detectors 210 may not be aligned at all.

Also as illustrated, the LIDAR system 200 may include four light detectors 210. It is understood that in other embodiments there may be greater or fewer than four light detectors 210. For example, in some embodiments, there may be a single light detector 210 corresponding to a single light emitter within the LIDAR system 200. Such a light detector 210 and/or light emitter may be configured to be reoriented relative to the scene 230 based on objects of interest within the scene 230. Further, each of the light detectors 210 may be the same as each other light detector 210, in some embodiments. In other embodiments, one or more of the light detectors 210 may be different from one or more of the other light detectors 210. For example, one of the light detectors 210 may have an increased sensitivity, increased range, or specialized spectral sensitivity.

As illustrated, the shared lens 220 may receive the light signals 212 from the scene 230. Such light signals 212 may have previously been generated by one or more light emitters associated with the LIDAR system 200. As also illustrated, the shared lens 220 may direct the respective light signals 212 to respective light detectors 210. In alternate embodiments, the shared lens 220 may be supplemented or replaced by one or more other shared imaging optics. For example, the LIDAR system 200 may include one or more shared mirrors used to direct the light signals 212 toward the light detectors 210 and/or one or more neutral-density filters used to reduce intensity of the light signals 212. In other embodiments, still other shared optical elements may be used (e.g., one or more prisms, windows, diffusers, apertures, chromatic filters, polarizers, diffraction gratings, beamsplitters, optical fibers, etc.).

In some embodiments, the shared lens 220 may be alternatively referred to as a main lens. The shared lens 220 may itself act as an aperture stop or may include a separate aperture stop for the LIDAR system 200. Hence, the shared lens 220 may inherently provide a specific aperture size and a specific field of view for the light detectors 210 in the array. In some embodiments, the shared lens 220 may be adjustable to modify optical characteristics associated with the shared lens 220, and, consequently, associated with each of the light detectors 210. For example, the shared lens 220 may be deformable to modify the focal length of the shared lens 220. Additionally or alternatively, an aperture associated with the shared lens 220 may be configured to expand and/or contract to modify the aperture size and alter the depth of focus.

As further illustrated in FIG. 2A, the light detectors 210 may be oriented such that they receive light from different regions of the scene 230. In some embodiments, the light detectors 210 in the array may have one of two different orientations (e.g., light detectors 210 in the top half of the array are angularly oriented in one direction, e.g., downward, and light detectors 210 in the bottom half of the array are angularly oriented in a second direction, e.g., upward). In other embodiments, the light detectors 210 may exhibit a discrete range of orientations (e.g., the light detectors 210 in the array range from orientations of +15 degrees to −15 degrees relative to scene 230 and/or shared lens 220, e.g., spaced in intervals of 1 degree). In other embodiments, each of the light detectors 210 in the array may have the same orientation. However, based on physical positions within the array, even if the light detectors 210 have the same orientation as one another, each light detector 210 may have a slightly different perspective relative to the scene 230. In embodiments where the light detectors 210 have multiple different orientations, the light detectors 210 may be receiving light signals 212 from different distances relative to the LIDAR system 200, as shown and described below with reference to FIG. 2B. In such embodiments, individually tailoring one or more aspects of the light signals 212 received by the respective light detectors 210 and/or tailoring light transmitted by associated light emitters could improve the quality of an image/map of the scene 230 generated by the LIDAR system 200.

Figure 2B:
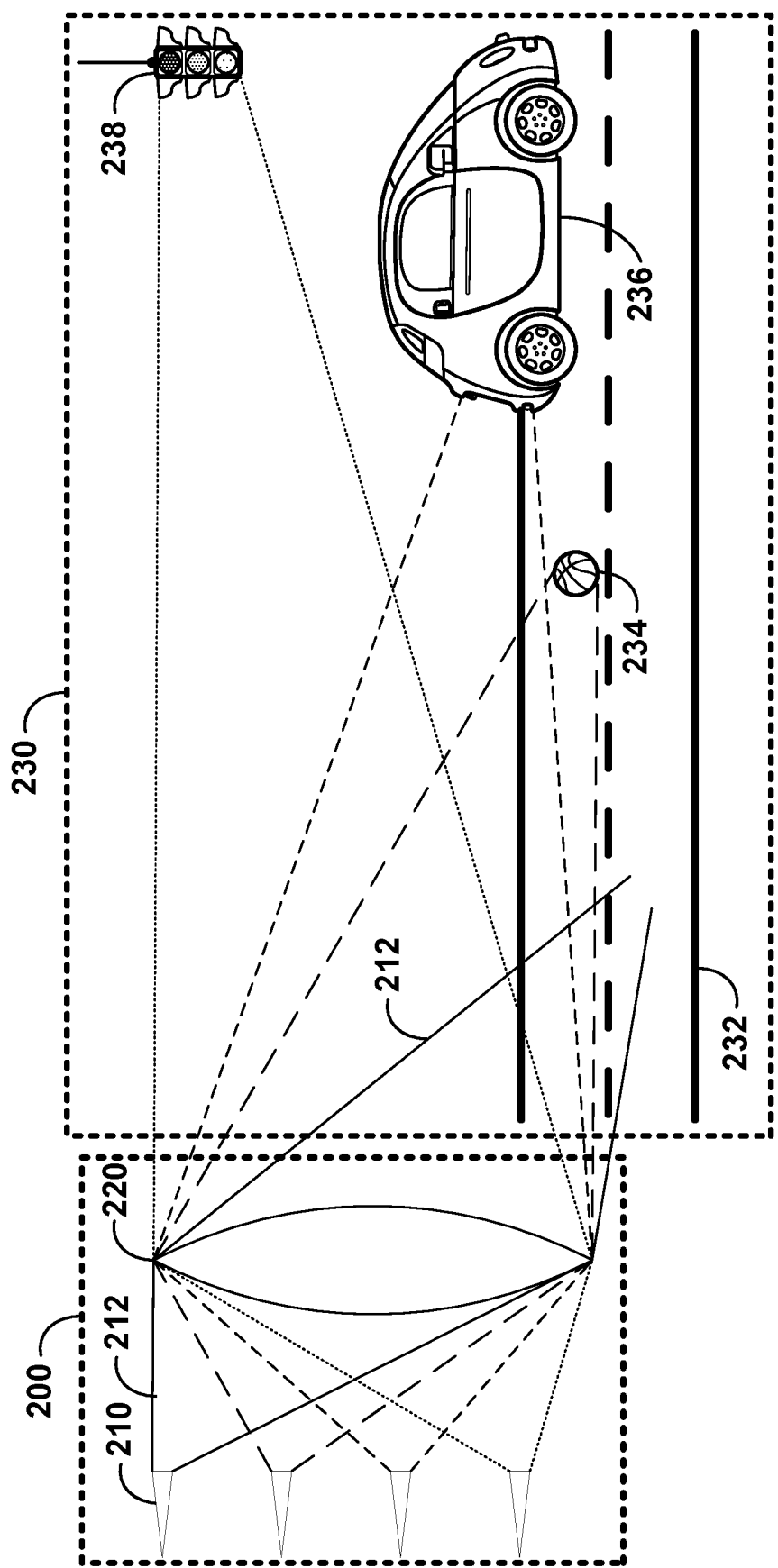
FIG. 2B is an illustration of a LIDAR system, according to example embodiments.

FIG. 2B illustrates the LIDAR system 200, according to example embodiments. The LIDAR system 200 is shown relative to one possible embodiment of the scene 230. The scene 230 may include, for example, a road surface 232, an obstruction 234 on the road surface 232, an automobile 236 on the road surface 232, and a traffic signal 238 above the road surface. As illustrated, the light detectors 210 may be directed toward different regions of the scene 230. For example, the light detectors 210 in the upper-half of the array of light detectors 210 may be directed downward (i.e., have an orientation angle less than 0°) and the light detectors 210 in the lower-half of the array of light detectors 210 may be directed upward (i.e., have an orientation angle greater than 0°). Hence, in FIG. 2B, the topmost light detector 210 is oriented most toward the ground and the bottommost light detector 210 is oriented most toward the sky, with the two middle light detectors 210 somewhere in between (e.g., the light detectors 210 may be oriented at −15°, −5°, +5°, and +15° from top to bottom relative to the scene 230, respectively). As illustrated, this corresponds to the topmost light detector 210 receiving a light signal 212 from the road surface 232, the second highest light detector 210 receiving a light signal 212 from the obstruction 234, the second lowest light detector 210 receiving a light signal 212 from the automobile 236, and the bottommost light detector 210 receiving a light signal 212 from the traffic signal 238. In alternate embodiments, the orientation of the light detectors 210 within the array may be reversed (e.g., the topmost light detectors 210 are oriented at positive angles relative to the scene 230 while the bottommost light detectors 210 are oriented at negative angles relative to the scene 230). In still other embodiments, the orientation of the light detectors 210 within the array may be randomized and/or not organized with respect to physical location within the array.

Because objects are within different respective regions the scene 230, some of the light detectors 210 are receiving light signals 212 from objects that are nearer to the LIDAR system 200 than other light detectors 210. For example, the obstruction 234 is nearer to the LIDAR system 200 than the traffic signal 238. Because of this, the relative sizes of objects within the scene 230 may be different, as well. For example, if two automobiles are present in the scene 230, but one is nearer to the LIDAR system 200 than the other, the nearer automobile may occupy a larger percentage of a field of view of a respective light detector 210 and may therefore appear larger to the respective light detector 210. Both the respective distance of objects and the respect size of objects may be exploited using the systems and methods shown and described herein.

Throughout the disclosure, light detectors 210 within the LIDAR system 200 may be illustrated as all oriented toward the same object within the scene 230 or toward portions of the same object within the scene 230 (e.g., the tree outline used to represent the scene 230 in FIG. 2A). It is understood, however, that these illustrations are used as examples, and the use of a single object to represent the scene 230 is for illustration simplicity. It is further understood that, contemplated throughout the disclosure, respective light detectors 210 may receive light signals 212 from one or more different objects (e.g., at different distances relative to the LIDAR system 230 as illustrated in FIG. 2B) and/or one or more of the same objects within the scene 230.

Figure 3A:
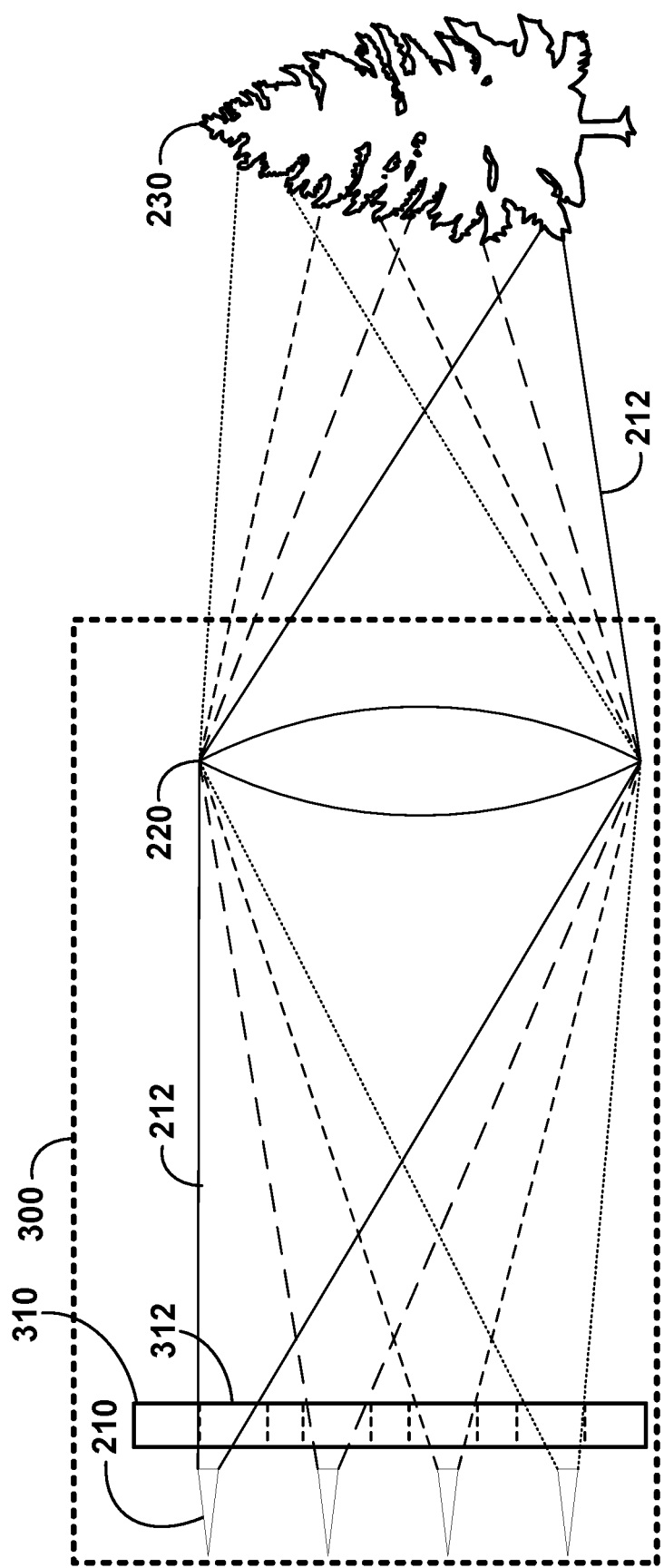
FIG. 3A is an illustration of a LIDAR system, according to example embodiments.

FIG. 3A illustrates a LIDAR system 300, according to example embodiments. As illustrated in FIG. 3A, and unlike in FIGS. 2A and 2B, the LIDAR system 300 includes an array of optical elements 310 positioned between the light detectors 210 and the shared lens 220. The array of optical elements 310 may alter one or more of the light signals 212. As illustrated, the array of optical elements 310 may be positioned in a location that is near enough to the light detectors 210 such that light signals 212 for respective light detectors 210 do not overlap with one another (i.e., the light signals 212 are discretized). Thus, the array of optical elements 310 can individually modify one of the light signals 212 without simultaneously affecting the optical qualities of all of the light signals 212/resulting images of all of the light detectors 210.

The optical elements in the array of optical elements 310 may be apertures 312. Only one aperture 312 in the array of optical elements 310 is labeled in FIG. 3A to avoid cluttering the figure. Each of the apertures 312 in the array of optical elements 310 may have the same cross-sectional area. In such a fashion, each of the apertures 312 would affect a respective light signal 212 in the same way. In various embodiments, the array of optical elements 310 may be fabricated using a variety of techniques. For example, the apertures 312 may be an array of holes within a sheet representing the array of optical elements 310. Such a sheet may be made of metal or another optically non-transmissive material. The location of such holes representing the apertures 312 may correspond to the location of light detectors 210 within the LIDAR system 300.

In addition to being sufficiently close to the light detectors 210 such that the light signals 212 are discretized, the array of optical elements 310 (and, therefore, the apertures 312) may be located sufficiently far from the detection surface of the light detectors 210 such that the light signals 212 are adequately modified before reaching the light detectors 210 (e.g., the apertures 312 may be located between 100 μm and 300 μm from the detection surface of the light detectors 210). For example, if the apertures 312 were positioned precisely at the focal plane of the light detectors 210 and were sized such that the diameters of the apertures 312 were larger than the detection surface of the light detectors 210, the apertures 312 would not alter the field of view of the light detectors 210. However, if positioned sufficiently far from the detection surface of the light detectors 210, the apertures 312 may restrict the angles of incidence of light rays that ultimately reach the detection surface of the light detectors 210, thereby modifying the field of view of the light detectors 210.

In addition to or instead of being used to modify a field of view for one or more of the light detectors 210, the apertures 312 may alter the depth of focus of one or more of the light detectors 210, prevent one or more optical aberrations from being present in a light signal 212 captured by one or more of the light detectors 210, or change the angular resolution for one or more of the light detectors 210 (e.g., increase the angular resolution for nearby targets in the scene 230). Additional or alternative optical modifications may be made to the light signals 212 using the apertures 312.

In some embodiments, the optical modifications to the light signals 212 caused by the array of optical elements 310 may be dependent on one or more aspects of the scene 230. For example, as illustrated in FIG. 3B, the array of optical elements 310 of the LIDAR system 350 may include smaller apertures 314 and larger apertures 316 (e.g., as opposed to apertures 312 all having the same cross-sectional area as in the LIDAR system 300 of FIG. 3A). The smaller apertures 314 may have a smaller cross-sectional area than the larger apertures 316. Because the light detectors 210 might be oriented toward regions of the scene 230 whose distances relative to the LIDAR system 350 are known, the array of optical elements 310 can be used to account for any differences in distances to various regions of the scene 230. In some embodiments, for example, the larger apertures 316 may correspond to light detectors 210 that receive light signals 212 from regions of the scene 230 that are farther away than the light detectors 210 corresponding to the small apertures 314. The smaller apertures 314 may thus modify respective light signals 212 based on a first distance while the larger apertures 316 may modify respective light signals 212 based on a second distance.

Further, because the distribution of distances of objects within the scene 230 relative to the LIDAR systems 300/350 may be known or measurable, the optical elements (e.g., apertures as illustrated in FIGS. 3A and 3B) may be distributed (e.g., within the array of optical elements 310) to correspond to the distribution of distances. For example, the larger the distance from which a light detector 210 receives a light signal 212, the larger the corresponding aperture within the array of optical elements 310 may be. This may additionally correspond to a respective location within the array of light detectors 210. For example, if the light detectors 210 in the array are arranged such that light detectors 210 near the top of the array detect objects nearer to the ground in the scene 230 (and thus closer to the LIDAR system 350) than light detectors 210 near the bottom of the array, the corresponding apertures in the array of optical elements 310 may be smaller near the top of the array of optical elements 310.

In addition to or instead of using an array of optical elements 310 to modify aspects of the light signals 212 reflected from regions of the scene 230, the LIDAR system 350 may use the array of optical elements 310 or a separate array of optical elements to modify aspects of light signals transmitted by one or more light emitters in the LIDAR system 350. Similar to on the receive side, the emitted light signals may be modified based on an aspect of the scene 230. For example, the emitted light signals may be respectively modified by an array of optical elements based on predicted distances of objects within the scene toward which the light signals are emitted.

In some embodiments, the divergence of one or more emitted light beams may be modified (e.g., using slabs of glass of various thicknesses, as described below) such that light beams directed toward regions of the scene 230 that are closer to the LIDAR system 350 have larger beam divergences than regions of the scene 230 that are farther from the LIDAR system 350. The converse may also be performed (i.e., larger beam divergences for farther regions of the scene 230), in some embodiments. One reason to have larger beam divergences for nearer regions of the scene 230 is to use less emitter power. Because nearby regions of the scene 230 contain objects which appear larger to the LIDAR system 350 than more distant regions of the scene 230, lower angular resolutions for nearby regions might be acceptable (i.e., a lower angular resolution for a nearby object can correspond to the same linear resolution as a higher angular resolution for a more distant object). Thus, beam power of an emitter (e.g., an emitting laser or LED) may be spread across a greater angular resolution for objects in the scene 230 that are nearby while still maintaining an acceptable linear resolution. As such, less beam power can be expended for a given angular range to observe nearby objects in the scene 230.

Many different types of optical elements, besides apertures, for inclusion in an array of optical elements 310 are described herein. It is understood, however, that apertures and other types of optical elements described herein are non-limiting examples and that additional or alternative types of optical elements could be included in the array of optical elements 310. Additionally or alternatively, in some embodiments, the LIDAR system 350 may include two or more cascaded arrays of optical elements. Such cascaded arrays of optical elements could modify the light signals in different ways (e.g., one of the arrays could include lenses to modify focal length and a second array could include a filter to filter out select polarizations and/or wavelengths). One or more of the different ways in which cascaded arrays of optical elements modify the light signals may be based on one or multiple aspects within the scene 230 (e.g., distance(s) to certain region(s) in the scene 230, time of day, type(s) of object(s) within the scene 230, reflectivity of region(s) of the scene 230, color(s) of region(s) of the scene 230, polarization(s) typically reflected and/or scattered by region(s) of the scene 230, etc.). Any number of arrays of optical elements that are cascaded within the LIDAR system 350 may be located, sequentially, between the shared lens 220 and the array of light detectors 210.

Figure 4A:
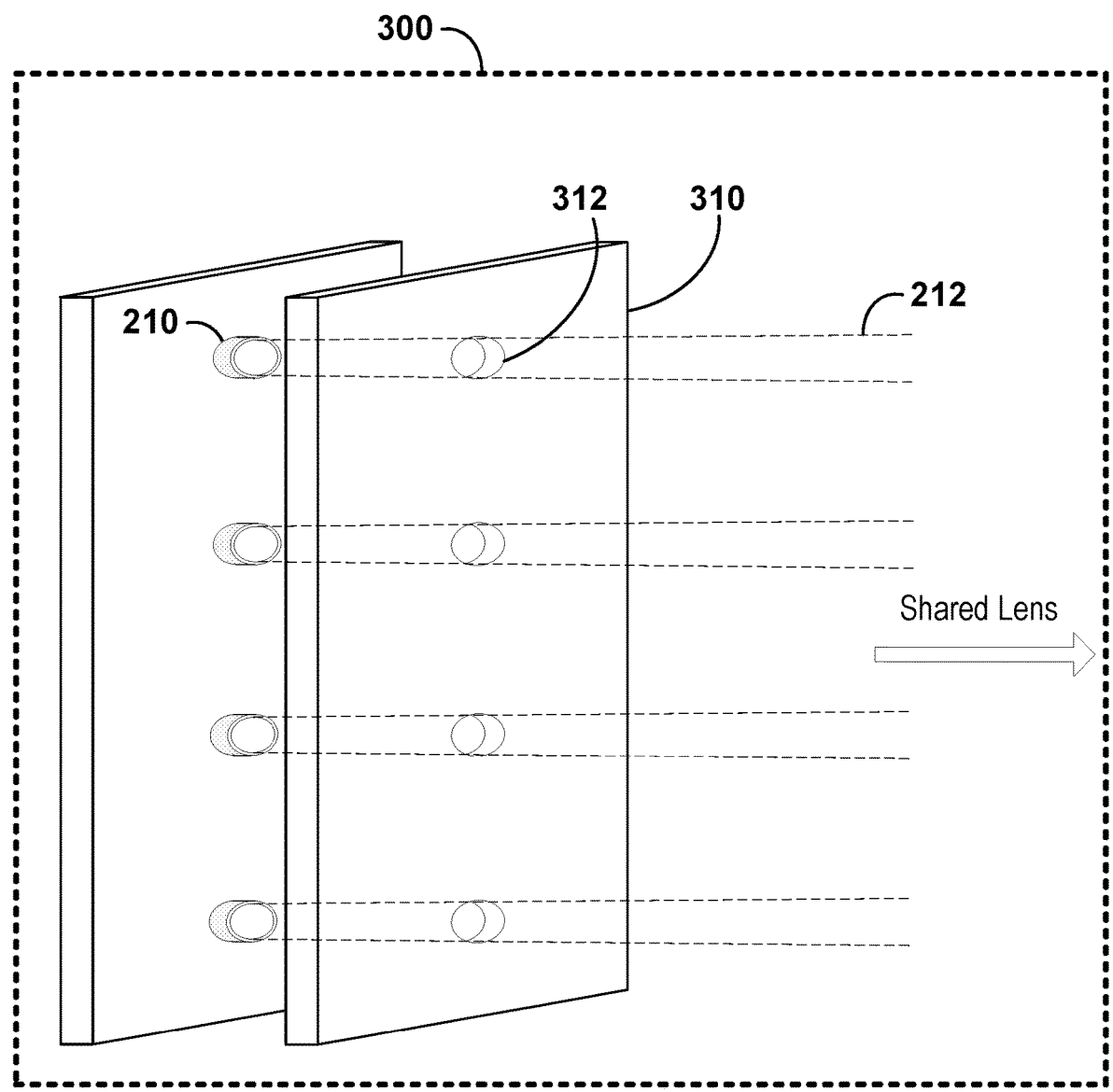
FIG. 4A is an illustration of a LIDAR system, according to example embodiments.

FIG. 4A illustrates a portion of the LIDAR system 300 (the shared lens 220 being omitted), according to example embodiments. The LIDAR system 300 illustrated in FIG. 4A may be a three-dimensional (3D) view of the LIDAR system 300 illustrated in FIG. 3A. As illustrated, the LIDAR system 300 includes an array of light detectors 210 and an array of optical elements 310, the optical elements being apertures 312.

Figure 4B:
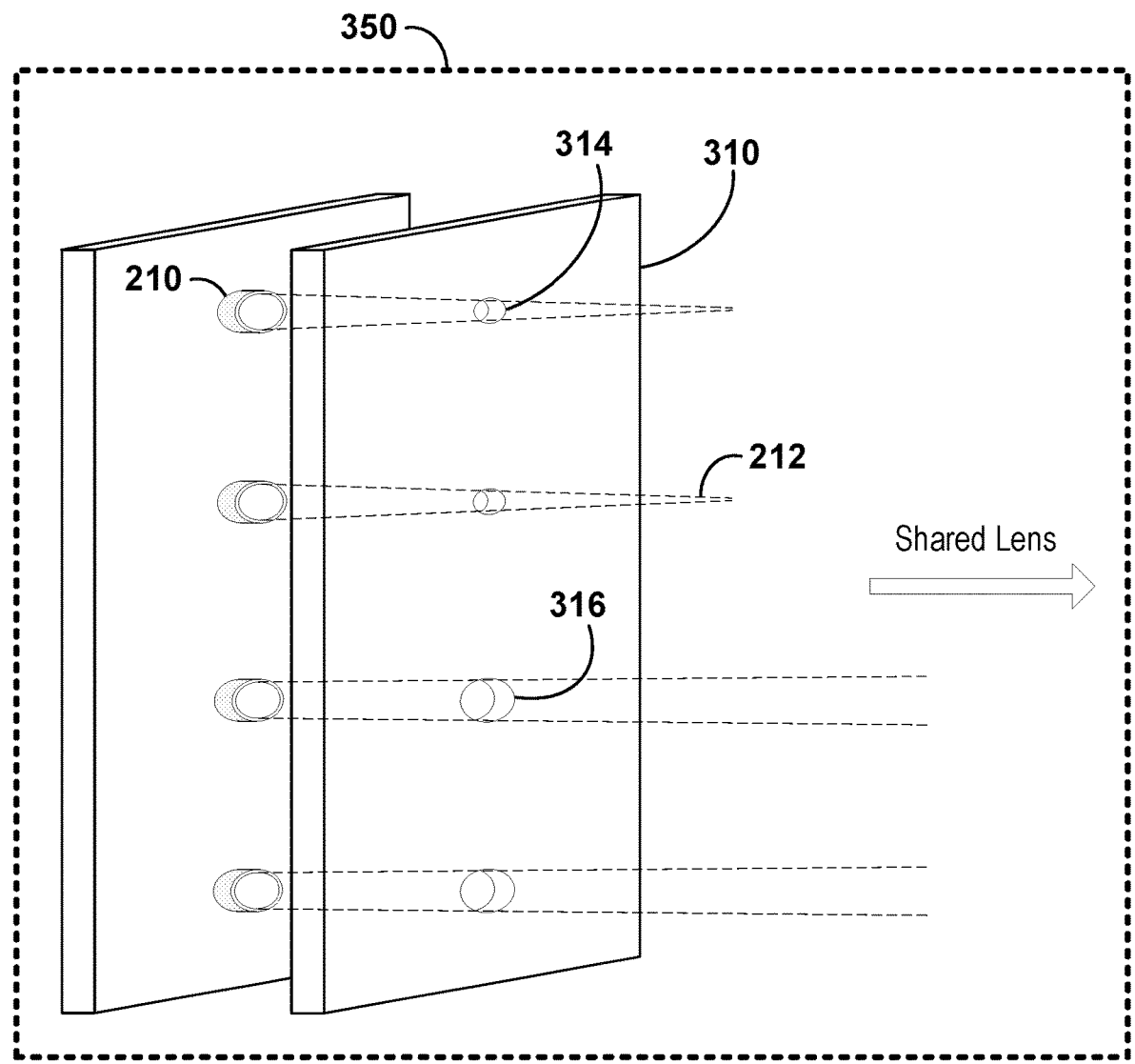
FIG. 4B is an illustration of a LIDAR system, according to example embodiments.

FIG. 4B illustrates a portion of the LIDAR system 350 (the shared lens 220 being omitted), according to example embodiments. The LIDAR system 350 illustrated in FIG. 4B may be a 3D view of the LIDAR system 350 illustrated in FIG. 3B. As illustrated, the LIDAR system 350 includes an array of light detectors 210 and an array of optical elements 310, the optical elements being smaller apertures 314 and larger apertures 316.

Figure 4C:
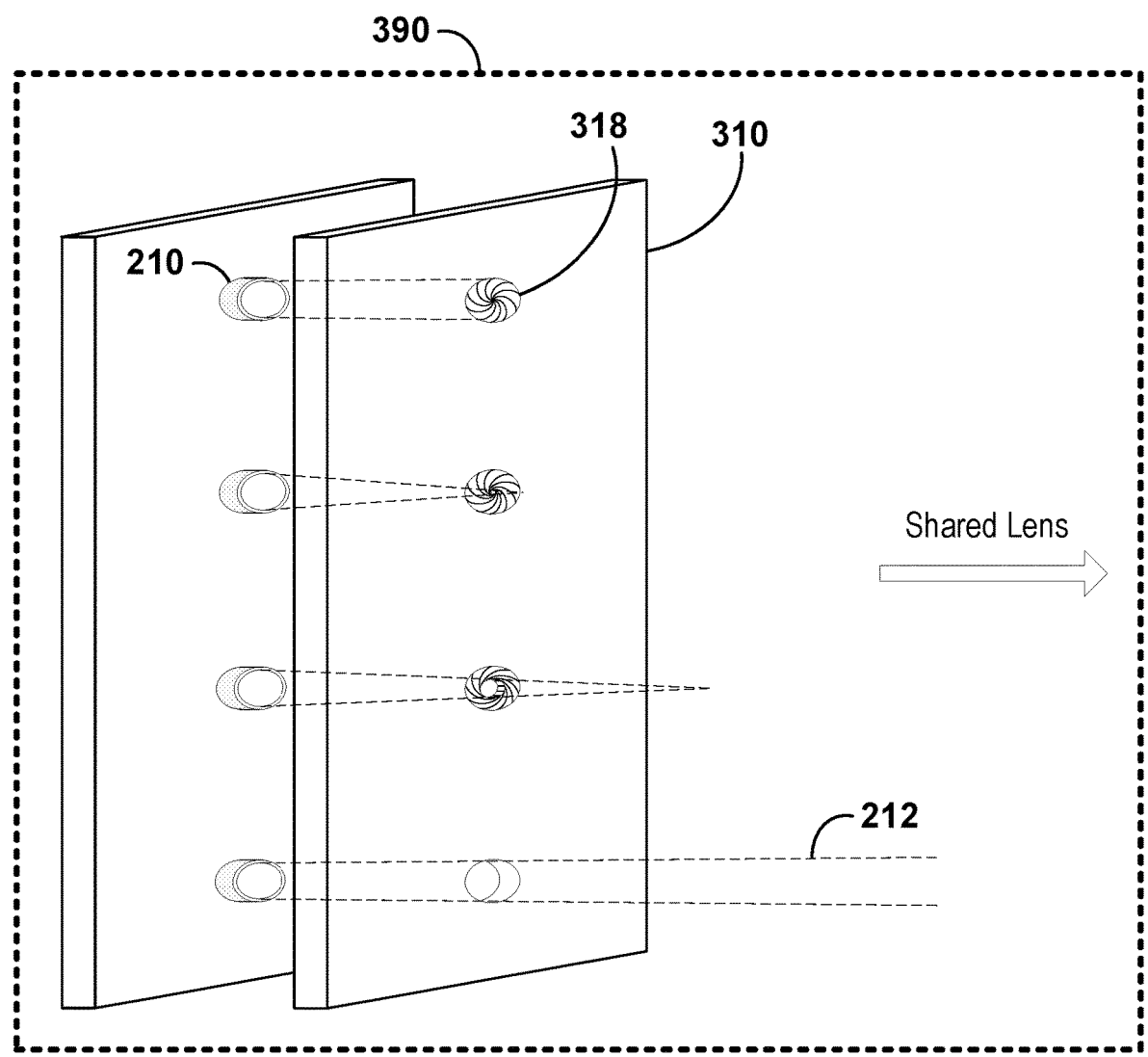
FIG. 4C is an illustration of a LIDAR system, according to example embodiments.

FIG. 4C illustrates a portion of a LIDAR system 390 (the shared lens 220 being omitted), according to example embodiments. The LIDAR system 390 illustrated in FIG. 4C may include an array of light detectors 210 and an array of optical elements 310. The optical elements in the array of optical elements 310 may be tunable apertures 318. For example, the tunable apertures 318 may include shutters and/or irises (as illustrated).

Each of the tunable apertures 318 may have an adjustable cross-sectional area. For example, each of the tunable apertures 318 may include an iris that can be continuously adjusted from fully open (to yield a maximum cross-sectional area for the respective tunable aperture 318) to fully closed (to yield no cross-sectional area for the respective tunable aperture 318). The tunable apertures 318 may be drivable by a servo or other motor, in various embodiments. As illustrated, in one conformation, an iris corresponding to the topmost tunable aperture 318 may be fully closed, an iris corresponding to the second highest tunable aperture 318 may be open 10% or less, an iris corresponding to the second lowest tunable aperture 318 may be approximately 50% open, and an iris corresponding to the bottommost tunable aperture 318 may be fully opened. The tunable apertures 318 may be independently tunable (e.g., one at a time) and/or jointly tunable (e.g., each simultaneously adjusted in the same way). Further, the tunable apertures 318 may be adjusted by a computing device (e.g., the computing device 106 illustrated in FIG. 1C).

In some embodiments, the tunable apertures 318 may be modified (e.g., opened or closed by some amount) in response to some aspect of a scene 230 (e.g., a change in some aspect of the scene 230). For example, if one of the light detectors 210 is receiving light from an object (e.g., a moving vehicle, such as the automobile 236 illustrated in FIG. 2B) in the scene 230 at a given distance, and the object moves relative to the LIDAR system 390 such that it is now farther from or closer to the LIDAR system 390, the cross-sectional area of the tunable aperture 318 corresponding to the respective light detector 210 may be adjusted to account for the change in location of the object. Additionally or alternatively, the cross-sectional area of the respective tunable aperture 318 may also be adjusted to a specific size while the object is in transit from the first location to the second location to account for the object being in motion. The size of the cross-sectional area may be at least partially based upon the velocity of the object with respect to the LIDAR system 390, for example. In embodiments where the tunable apertures 318 are independently adjustable, different tunable apertures 318 may be adjusted based on different distances to different objects within the scene 230.

Additionally or alternatively, the tunable apertures 318 may be adjusted in size based on map data (e.g., corresponding to present global positioning system (GPS) coordinates of the LIDAR system 390), based on terrain data, based on reflectivity of targeted objects in the scene 230, based on pose (e.g., determined based on accelerometer data) of the LIDAR system 390, and/or based on time of day (e.g., reducing the cross-sectional area of the tunable apertures 318 at night). Other factors upon which modifications to optical elements within the array of optical elements 310 can be based will be understood, some of which are described throughout this disclosure. In some embodiments, the tunable apertures 318 may be modulated quickly enough (e.g., opened and closed at a high enough rate) to act as shutters for the corresponding light detectors 210, in addition to being used as adjustable aperture stops for individual light detectors 210. For example, each of the tunable apertures 318 may include one or more liquid-crystal shutters.

In addition, in some embodiments, the cross-sectional area of one or more of the tunable apertures 318 may be modified to avoid optical defects of the shared lens 220 or regions of the shared lens 220 obscured by foreign substances (e.g., mud, snow, insects, etc.) present on the outside of the shared lens 220 (e.g., on the side of the shared lens 220 facing the scene 230). For example, the field of view corresponding to a respective light detector 210 could be modified (e.g., reduced) be adjusting the cross-sectional area of the corresponding tunable aperture 318 (e.g., by partially closing an iris of the tunable aperture 318), thereby changing (e.g., narrowing) the field of view associated with corresponding light signal 212. By changing the field of view, portions of the full field of view of the respective light detector 210 associated with the shared lens 220 may now be excluded, thereby reducing optical aberrations and, possibly, reducing unnecessary data analysis (i.e., data corresponding to the location of an optical defect of the shared lens 220 may not be useful for distance mapping, and, therefore, might be computationally wasteful to analyze).

It is understood that many types of tunable optical elements may be present in the array of optical elements 310. Some other types of tunable optical elements, besides apertures, are described throughout this disclosure. However, it is understood that many other types of tunable optical elements besides those explicitly recited are contemplated herein. Further, the array of optical elements 310 may include multiple instances of the same type of optical element (e.g., tunable apertures 318, as illustrated in FIG. 4C). Alternatively, the array of optical elements 310 may include different types of optical elements (e.g., an aperture to modify the light signal 212 intended for one light detector 210 and a filter to modify the light signal 212 intended for a second light detector 210). Still further, as described above, rather than a single array of optical elements 310, the LIDAR system 390 may include cascaded arrays of optical elements.

Similar tunable optical elements may additionally or alternatively be present on an array positioned near one or more light emitters. For example, tunable apertures that limit the amount of output power (e.g., by limiting beam size of a laser) could be used near one or more light emitters. Similar to above, such emitter-side apertures could also be adjusted by a computing device (e.g., the computing device 106 illustrated in FIG. 1C) and/or based on some aspect of a scene 230. Other tunable optical elements may also be used to modify aspects of light emitted by light emitters within the LIDAR system 390.

Figure 5A:
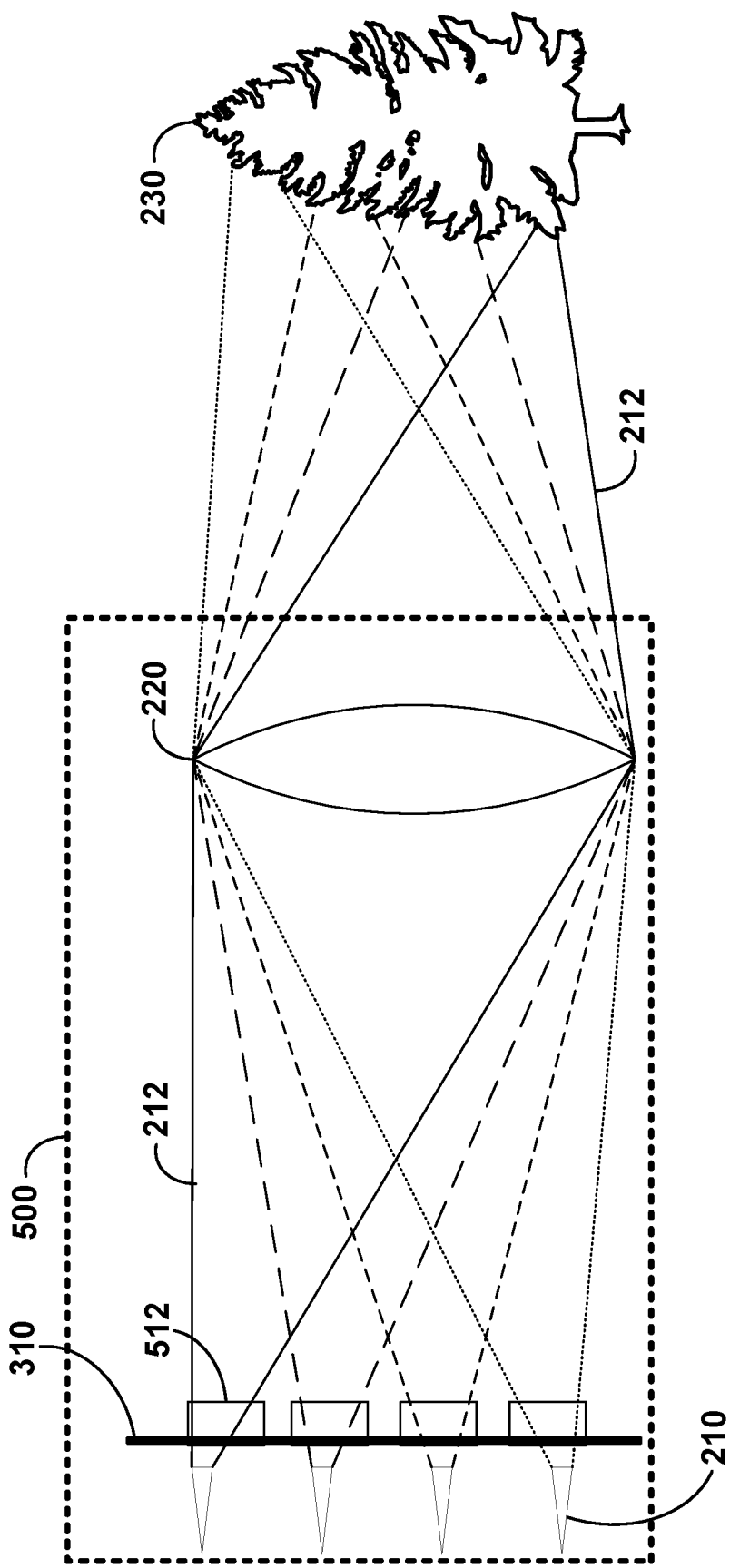
FIG. 5A is an illustration of a LIDAR system, according to example embodiments.

FIG. 5A illustrates a LIDAR system 500, according to example embodiments. Similar to FIGS. 3A and 3B, the LIDAR system 500 includes an array of optical elements 310 positioned between the light detectors 210 and the shared lens 220. However, unlike FIGS. 3A and 3B, the optical elements illustrated in FIG. 5A may be lenses 512 (e.g., a series of discrete lenses, with one lens corresponding to each light detector 210). The lenses 512 may alter one or more of the light signals 212 (e.g., to effectively modify the focal length corresponding to the respective light detector 210). As illustrated, the lenses 512 may be positioned in a location that is near enough to the light detectors 210 such that light signals 212 for respective light detectors 210 do not overlap with one another (i.e., the light signals 212 are discretized). Thus, the lenses 512 can individually modify one of the light signals 212 without simultaneously affecting the optical qualities of all of the light signals 212 of all of the light detectors 210.

Figure 5B:
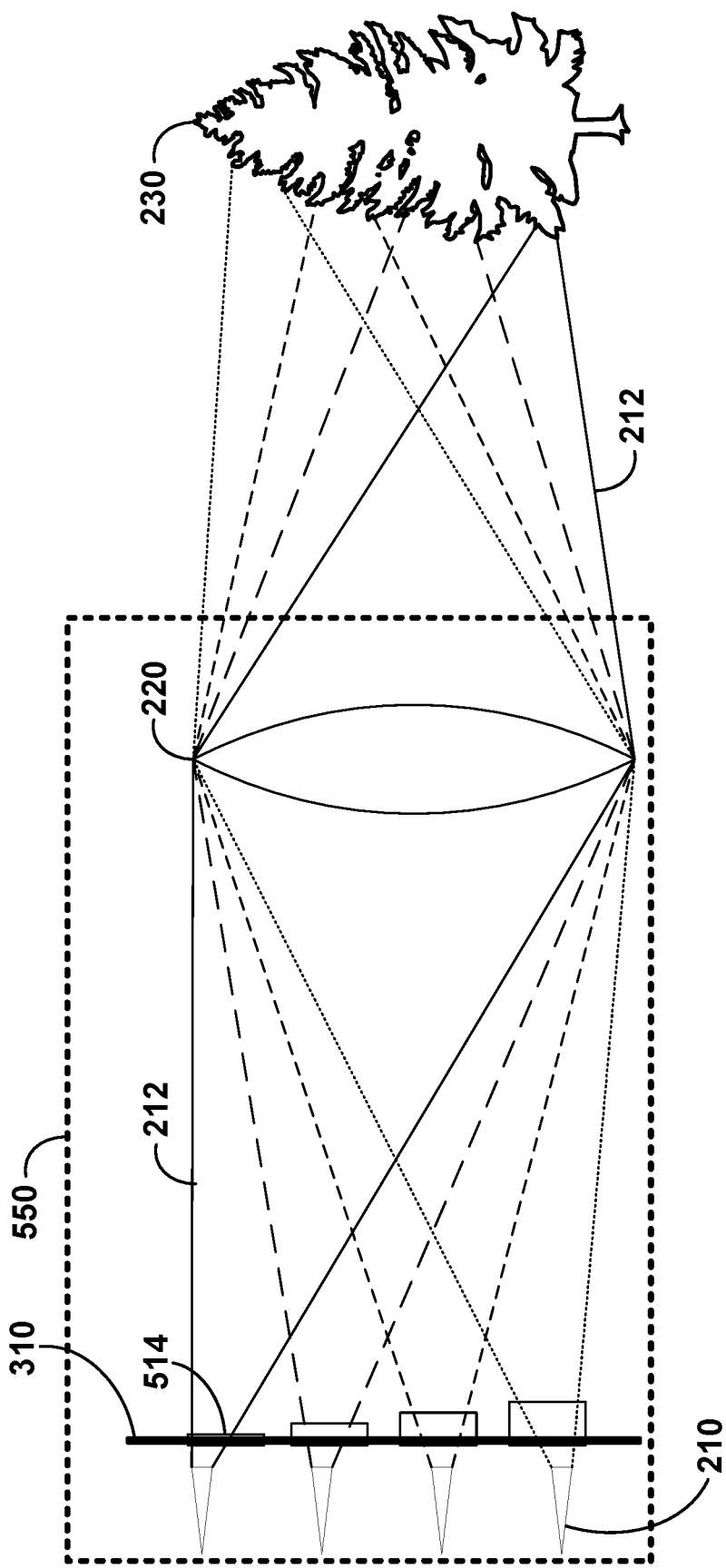
FIG. 5B is an illustration of a LIDAR system, according to example embodiments.

Each of the lenses 512 may have the same cross-sectional area and/or depth. Hence, in some embodiments, each of the lenses 512 may have the same focal length as one another. Thus, each of the lenses 512 may affect the respective light signals 212 in the same way. In alternate embodiments, one or more of the lenses 512 may be have a different shape, size, and/or focal length than the other lenses 512 (e.g., as illustrated in FIG. 5B). Focal lengths of the lenses 512, for example, may be set based on expected distances to objects within the scene 230 (e.g., distances predetermined and/or stored within a database, such as a hard drive or server). For example, if the topmost light detector 210 is oriented downward such that distances between the LIDAR system 500 and objects in the scene 230 that reflect light signals 212 directed to the light detector 210 are small, the focal length of the lens 512 corresponding to the light detector 210 may be correspondingly small (e.g., if the expected separation between the objects in the scene 230 and the LIDAR system 500 is 10 meters, the focal length of the corresponding lens 512 may be approximately 10 meters minus the focal length of the shared lens 220).

The lenses 512 may be fabricated using a variety of techniques. For example, the lenses 512 may be molded optical glass or molded optical plastic. As illustrated, each of the lenses 512 may be a slab of glass having a predetermined thickness to modify the light signals 212. In some embodiments, each of the lenses 512 may be a single lens in a microlens array or a portion of a liquid-crystal array.

In some embodiments, the lenses 512 may be tunable. For example, in some embodiments, the focal length of the lenses 512 or the 2D locations of the lenses 512 relative to the light detectors 210 may be modified. Similar to the apertures described above, the lenses 512 (e.g., a focal length of one or more lenses 512) may be adjusted based on map data, terrain data, time of day, reflectivity of objects in the scene 230, distance to objects in the scene 230 (or changes of distances to objects in the scene 230), etc. The lenses 512 may be tunable independently of one another or collectively, in various embodiments. Further, the lenses 512 may be modified by a computing device (e.g., the computing device 106 illustrated in FIG. 1C). In some embodiments, modifying the lenses 512 may include moving one or more lenses 512 relative to the light detectors 210 (e.g., translating the lenses 512 on a mechanical stage toward the light detectors 210 or away from the light detectors 210), deforming one or more lenses 512 (e.g., to adjust focal lengths), or even adding or removing the lenses 512 from the LIDAR system 500.

FIG. 5B illustrates a LIDAR system 550, according to example embodiments. The LIDAR system 550 of FIG. 5B is analogous to the LIDAR system 500 illustrated in FIG. 5A, with the exception that the LIDAR system 550 in FIG. 5B includes lenses 514 of different thicknesses, rather than the same thickness. As illustrated, in some embodiments, the lenses 514 associated with lower light detectors 210 in the array of light detectors 210 may be thicker than the lenses 514 associated with higher light detectors 210 in the array of light detectors 210. In other embodiments, the opposite may be true (e.g., the higher light detectors 210 are associated with thicker lenses 514). In still other embodiments, the thicknesses of the lenses 514 might not correlate to a location of a respective lens 514 with respect to the array of light detectors 210.

Similar to the lenses 512 described above with respect to FIG. 5A, the lenses 514 of FIG. 5B may be tunable (e.g., based on distances between the LIDAR system 550 and one or more objects/regions within the scene 230). In some embodiments, the lenses 514 may be arranged to correct for optical aberrations within the LIDAR system 550 (e.g., optical aberrations caused by the shared lens 220). For example, the lenses 514 may have optical characteristics such that, collectively, the arrangement of the lenses 514 is telecentric. In some embodiments, in addition to or instead of a telecentric arrangement of lenses 514, the LIDAR system 550 may include a telecentric arrangement of mirrors and/or prisms.

FIG. 5C illustrates a LIDAR system 580, according to example embodiments. The LIDAR system 580 of FIG. 5C is analogous to the LIDAR system 550 illustrated in FIG. 5B, with the exception that the LIDAR system 580 in FIG. 5C includes a single body of transparent material 516 rather than discrete lenses 514. As illustrated, the thickness of the body of transparent material 516 may vary across the body of transparent material 516 (e.g., the body of transparent material 516 may appear staircase-shaped from the side), and different regions of the body of transparent material 516 may correspond to different lensing sections (e.g., each lensing section associated with a respective light detector 210). Hence, optically, the body of transparent material 516 may perform the same function as the discrete array of lenses 514 in FIG. 5B. However, the body of transparent material 516 might be more practical to fabricate (e.g., because only a single mold may be needed for injection molding the optical plastic/optical glass) and/or assemble/position within the LIDAR system 580.

Similar to the lenses 514 described above with respect to FIG. 5B, the body of transparent material 516 of FIG. 5C may be tunable (e.g., based on distances between the LIDAR system 580 and one or more objects/regions within the scene 230). In some embodiments, the body of transparent material 516 may be modified by a computing device (e.g., the computing device 106 illustrated in FIG. 1C). Modifying the body of transparent material 516 may include moving or reorienting (e.g., rotating) the body of transparent material 516 relative to the light detectors 210 (e.g., translating the body of transparent material 516 on a mechanical stage toward the light detectors 210 or away from the light detectors 210), deforming the body of transparent material 516, or even adding or removing the body of transparent material 516 from the LIDAR system 580.

Figure 5D:
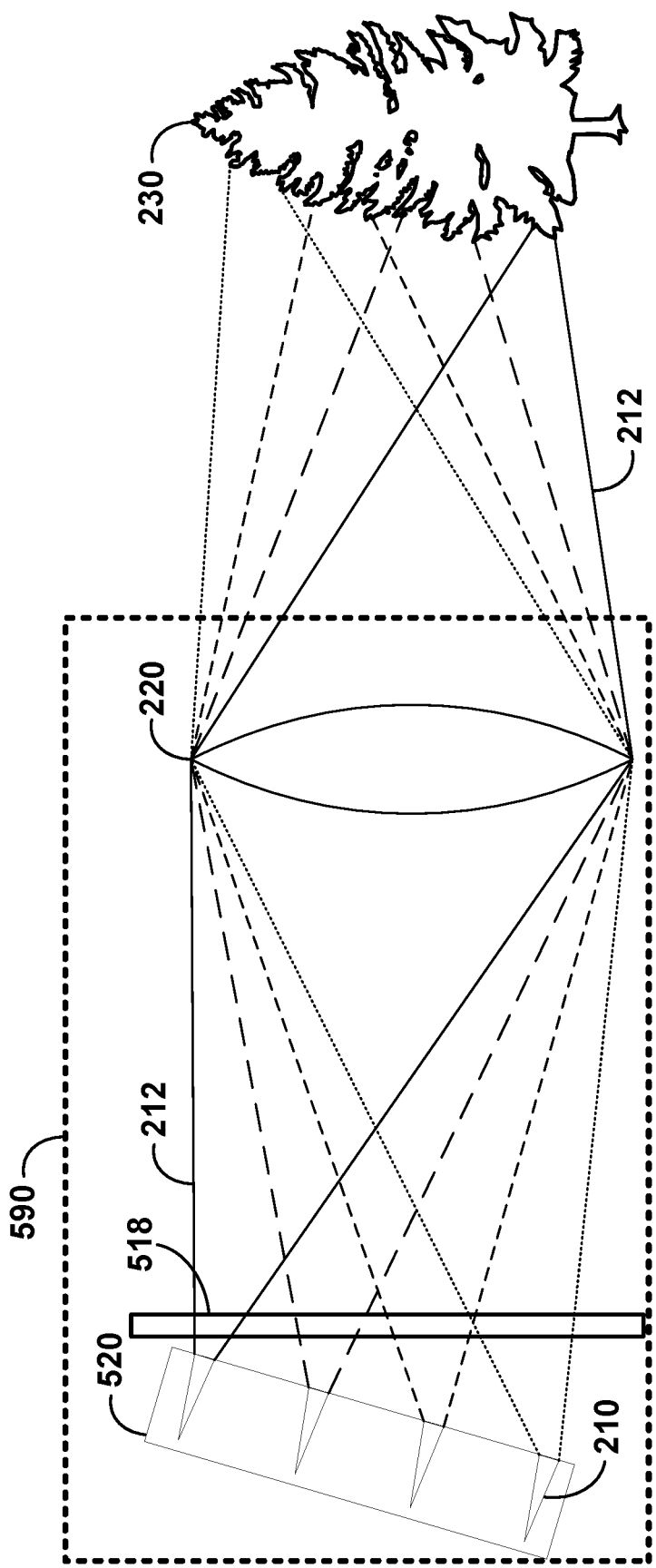
FIG. 5D is an illustration of a LIDAR system, according to example embodiments.

FIG. 5D illustrates a LIDAR system 590, according to example embodiments. The LIDAR system 590 of FIG. 5D is analogous to the LIDAR system 580 illustrated in FIG. 5C, with the exception that the LIDAR system 590 in FIG. 5D includes a body of transparent material 518 that has uniform thickness rather than non-uniform thickness like the body of transparent material 516 in FIG. 5C. Yet, similar to the body of transparent material 516 in FIG. 5C, different regions of the body of transparent material 518 may correspond to different lensing sections (e.g., each lensing section may be associated with a respective light detector 210). Unlike FIG. 5C, however, the different lensing sections of the body of transparent material 518 are based on differences in distance between the respective light detectors 210 and the corresponding lensing sections of the body of transparent material 518. As illustrated in FIG. 5D, for example, the light detectors 210 may be arranged on a support 520 and the support 520 may be angled relative to the body of transparent material 518 (e.g., such that the higher light detectors 210 are closer to the body of transparent material 518 than the lower light detectors 210). Hence, optically, the body of transparent material 518 may modify the light signals 212 in the same fashion relative to the light detectors 210 as the body of transparent material 516 in FIG. 5C. Such an angular relationship between the support 520 and the body of transparent material 518 may be achieved by shimming the support relative to the body of transparent material 518 (e.g., by placing a shim in between the support 520 and the body of transparent material 518 or by placing a shim behind or underneath the support 520).

Similar to the body of transparent material 516 described above with respect to FIG. 5C, the body of transparent material 518 of FIG. 5D may be tunable (e.g., based on distances between the LIDAR system 590 and one or more objects/regions within the scene 230). In some embodiments, the body of transparent material 518 may be modified by a computing device (e.g., the computing device 106 illustrated in FIG. 1C). Modifying the body of transparent material 518 may include moving or reorienting (e.g., rotating) the body of transparent material 518 relative to the light detectors 210 (e.g., translating the body of transparent material 518 on a mechanical stage toward the light detectors 210 or away from the light detectors 210), moving or reorienting (e.g., rotating) the support 520 relative to the body of transparent material 518, deforming the body of transparent material 518, deforming the support 520, or even adding or removing the body of transparent material 518 from the LIDAR system 590.

In addition to or instead of using the body of transparent material 518 to modify the light signals 212 received by the light detectors 210, the LIDAR system 590 may include a body of transparent material used to modify light transmitted by light emitters of the LIDAR system 590. Similar to the body of transparent material 518 and the corresponding light detectors 210, the body of transparent material used to modify light transmitted by light emitters of the LIDAR system 590 might be angled relative to an array of light emitters such that a first portion of the body of transparent material is nearer to a first light emitter than a second portion of the body of transparent material is to a second light emitter. As such, the beam divergences of respective light signals emitted by the two emitters (e.g., with emitters being lasers, such as laser diodes) may be different (e.g., the beam divergence of the light signal exiting the body of transparent material that corresponds to one of the emitters is bigger than the beam divergence of the light signal exiting the body of transparent material that corresponds to the other emitter). Such changes in beam divergences may be based on and/or altered based on distances between the LIDAR system 590 and object(s) within the scene 230. The beam divergences may additionally or alternatively be based on and/or altered based on a variety of other data (e.g., map data, terrain data, reflectivity of objects in the scene 230, pose of the LIDAR system 590, time of day, etc.).

Figure 6A:
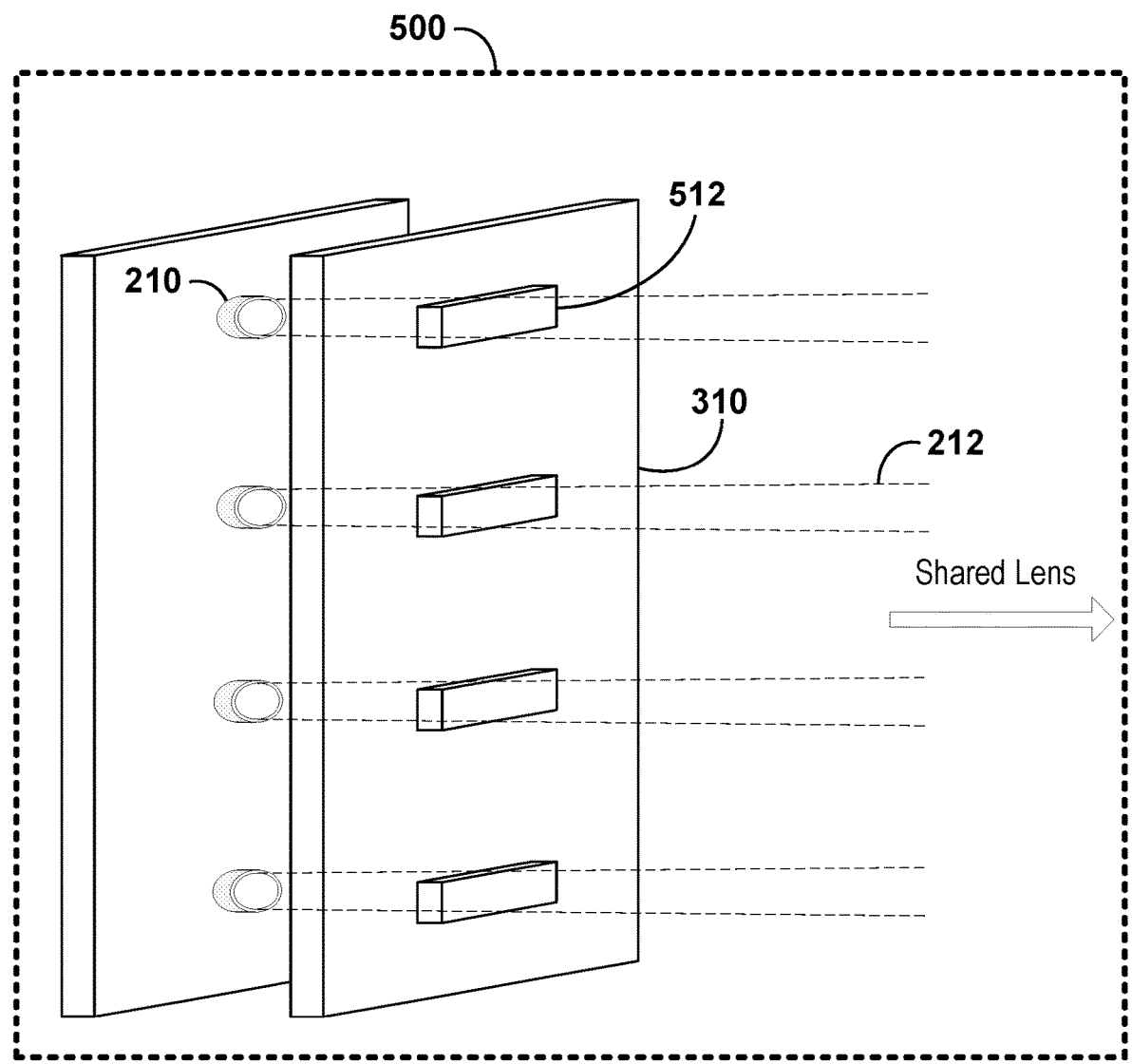
FIG. 6A is an illustration of a LIDAR system, according to example embodiments.

FIG. 6A illustrates a portion of the LIDAR system 500 (the shared lens 220 being omitted), according to example embodiments. The LIDAR system 500 illustrated in FIG. 6A may be a 3D view of the LIDAR system 500 illustrated in FIG. 5A. As illustrated, the LIDAR system 500 includes an array of light detectors 210 and an array of optical elements 310, the optical elements being lenses 512.

Figure 6B:
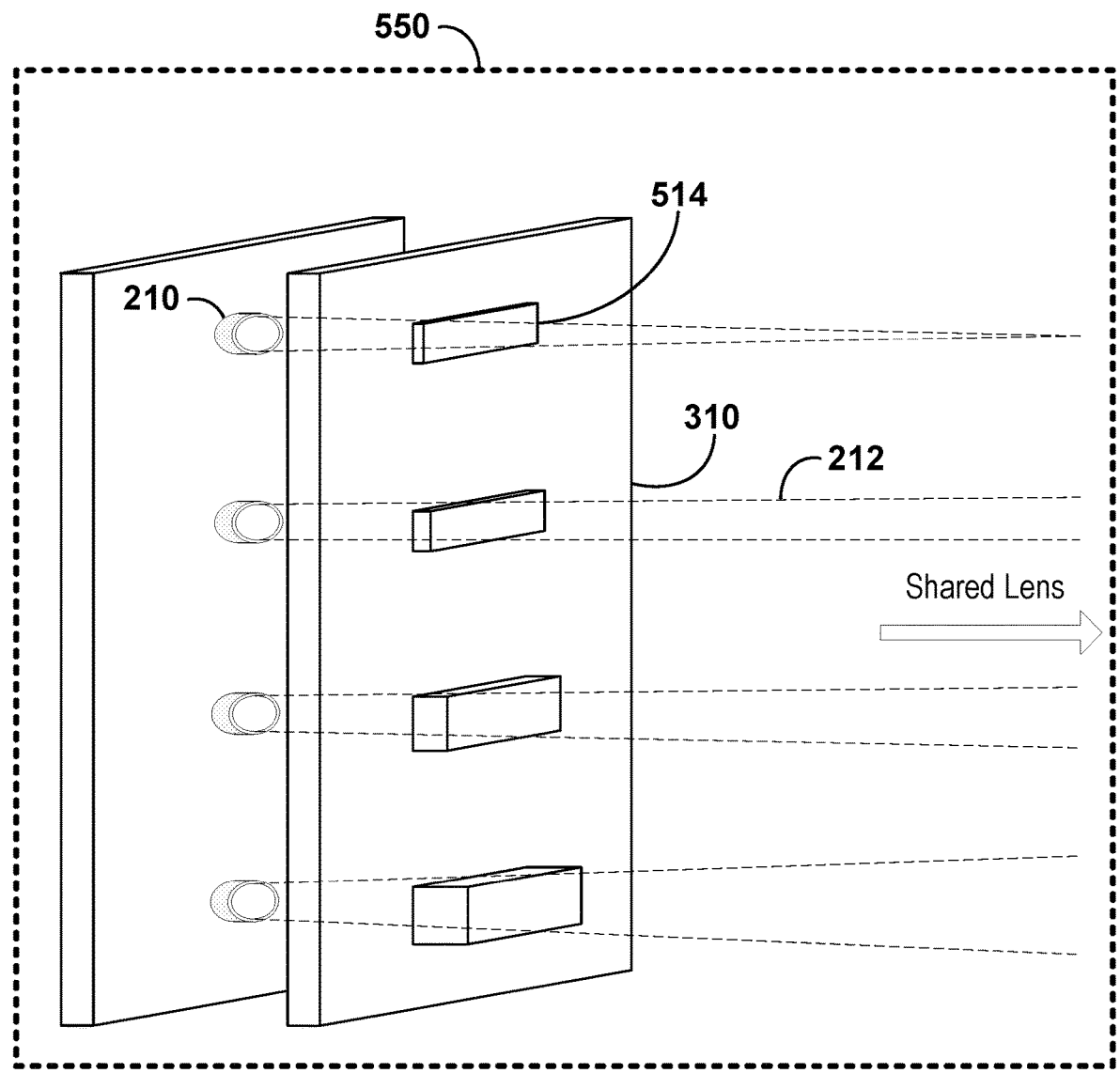
FIG. 6B is an illustration of a LIDAR system, according to example embodiments.

FIG. 6B illustrates a portion of the LIDAR system 550 (the shared lens 220 being omitted), according to example embodiments. The LIDAR system 550 illustrated in FIG. 6B may be a 3D view of the LIDAR system 550 illustrated in FIG. 5B. As illustrated, the LIDAR system 550 includes an array of light detectors 210 and an array of optical elements 310, the optical elements being lenses 514.

Figure 6C:
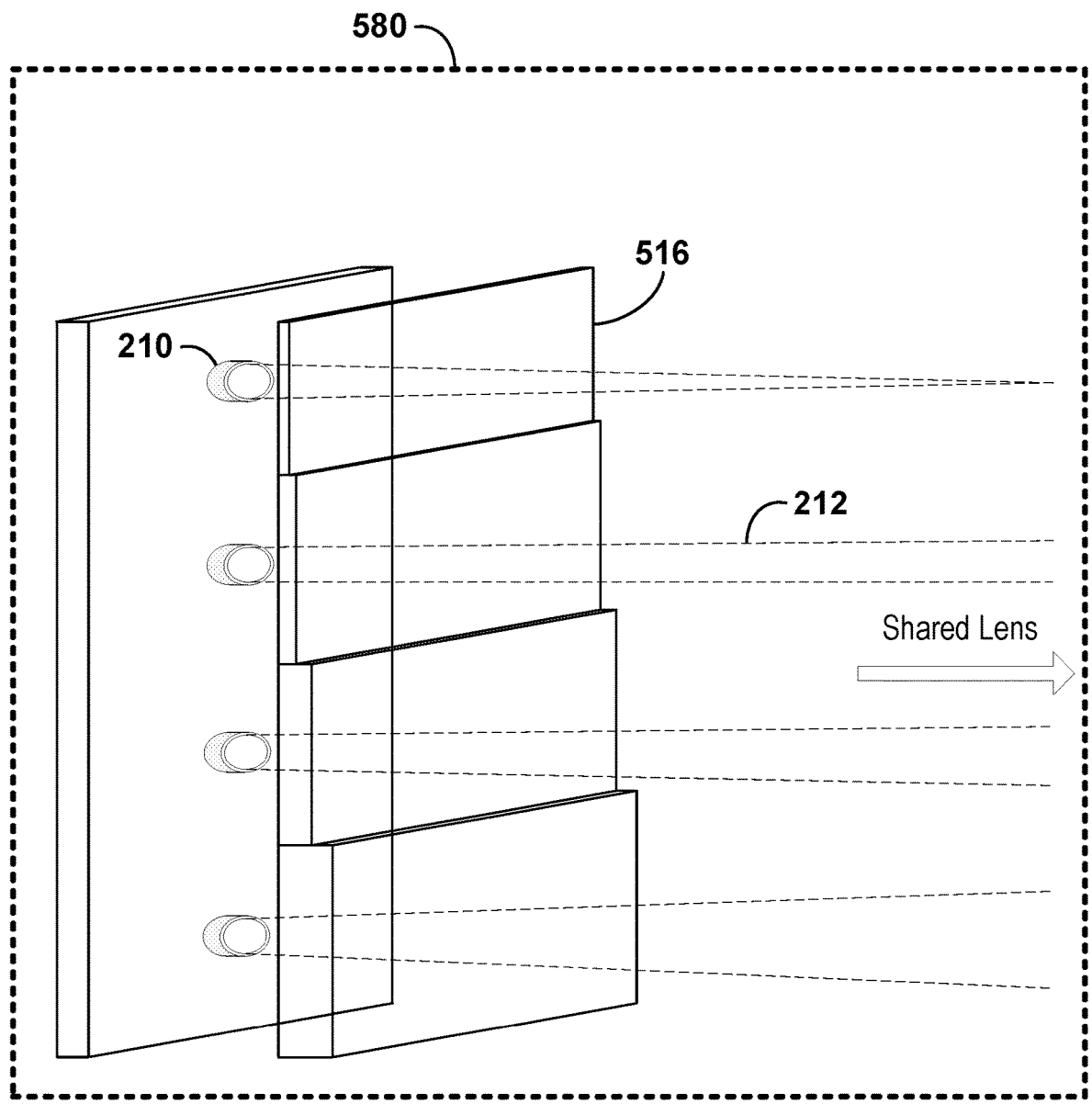
FIG. 6C is an illustration of a LIDAR system, according to example embodiments.

FIG. 6C illustrates a portion of the LIDAR system 580 (the shared lens 220 being omitted), according to example embodiments. The LIDAR system 580 illustrated in FIG. 6C may be a 3D view of the LIDAR system 580 illustrated in FIG. 5C. As illustrated, the LIDAR system 580 includes an array of light detectors 210 and an array of optical elements, the optical elements being a body of transparent material 516 with corresponding lensing sections.

Figure 6D:
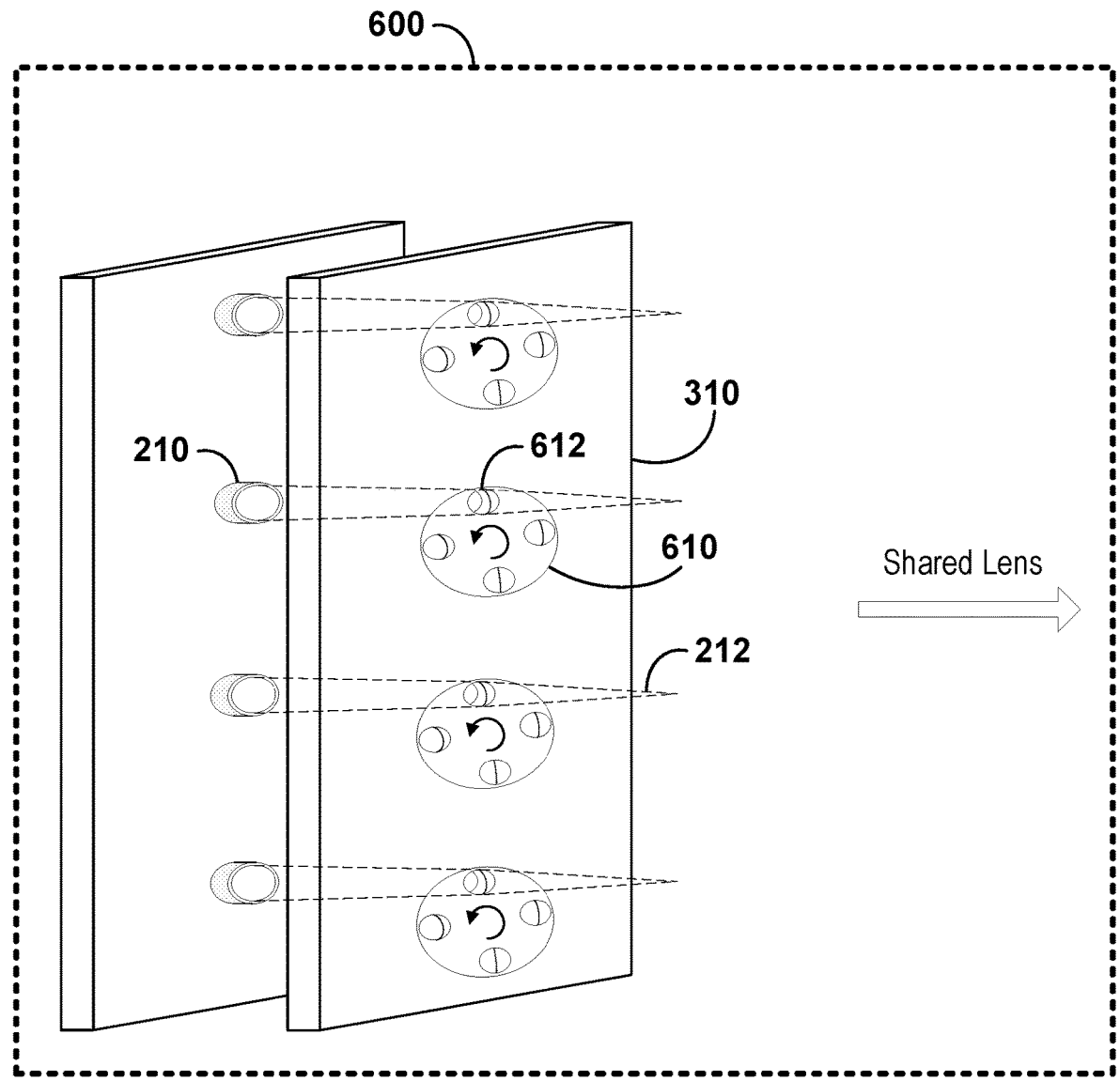
FIG. 6D is an illustration of a LIDAR system, according to example embodiments.

FIG. 6D illustrates a portion of the LIDAR system 600 (the shared lens 220 being omitted), according to example embodiments. The LIDAR system 600 illustrated in FIG. 6D may include an array of light detectors 210 and an array of optical elements 310. The optical elements in the array of optical elements 310 may be selectable arrays 610 (only one of which is labelled in FIG. 6D to avoid cluttering the figure). Each of the selectable arrays may include lenses 612 (only one of which is labelled in FIG. 6D to avoid cluttering the figure), and each of the lenses 612 in the selectable arrays 610 may have slightly different optical qualities (e.g., different focal lengths). For example, each of the selectable arrays 610 may include four lenses 612 (e.g., one lens 612 with a focal length between 5 meters and 10 meters, one lens 612 with a focal length between 10 meters and 20 meters, one lens 612 with a focal length between 20 meters and 50 meters, and one lens 612 with a focal length between 50 meters and 100 meters). One of the four lenses 612 in each selectable array 610 could be selected based on the distance from the LIDAR system to a target object within a scene 230 being captured by a corresponding light detector 210. It is understood that in other embodiments, the selectable arrays 610 may include greater than or less than four lenses 612 (e.g., two lenses, three lenses, five lenses, six lenses, eight lenses, ten lenses, sixteen lenses, twenty lenses, etc.). Further, in a single embodiment, different selectable arrays 610 within the array of optical elements 310 may include different numbers of lenses 612 (e.g., one selectable array 610 may include four lenses 612 while another selectable array 610 includes eight lenses 612).

As illustrated by the arrows in FIG. 6D, each of the selectable arrays 610 may be rotatable (e.g., in order to select a different lens 612). The selectable arrays 610 may be rotated by a servo or other motor, for example. The selectable arrays 610 may be independently tunable (e.g., one at a time) and/or jointly tunable (e.g., each adjusted in the same way simultaneously). Further, the selectable arrays 610 may be adjusted by a computing device (e.g., the computing device 106 illustrated in FIG. 1C).

In some embodiments, the selectable arrays 610 may be modified (e.g., rotated by some amount such that a respective lens 612 is selected for a corresponding light detector 210) based on some aspect of a scene 230 (e.g., in response to a change in some aspect of the scene 230). For example, if one of the light detectors 210 is receiving light from an object (e.g., a moving vehicle, such as the automobile 236 illustrated in FIG. 2B) in the scene 230 at a given distance, and the object moves relative to the LIDAR system 600 such that it is now farther from or closer to the LIDAR system 600, the corresponding selectable array 610 may be rotated such that a different lens 612 (e.g., a lens 612 with a different focal length) corresponding to the respective light detector 210 is selected to account for the change in location of the object. Additionally or alternatively, one or more selectable arrays 610 may also be adjusted to select specific lenses 612 while the object is in transit from the first location to the second location to account for the object being in motion. The lenses 612 selected may be based upon the velocity of the object with respect to the LIDAR system 600, for example. In embodiments where the selectable arrays 610 are independently adjustable, different selectable arrays 610 may be adjusted differently based on different distances to different objects within the scene 230.

Additionally or alternatively, the selectable arrays 610 may be adjusted based on map data (e.g., based on global positioning system (GPS) coordinates), based on terrain data, based on reflectivity of targeted objects in the scene 230, based on pose (e.g., based on accelerometer data) of the LIDAR system 600, and/or based on time of day (e.g., modify the cross-sectional area of the tunable apertures 318 at night). Other factors upon which modifications to the selectable arrays 610 within the array of optical elements 310 can be based will be understood, some of which are described throughout this disclosure.

In addition, in some embodiments, the selectable arrays 610 may be modified to avoid optical defects of the shared lens 220 or regions of the shared lens 220 obscured by foreign substances (e.g., mud, snow, insects, etc.) present on the outside of the shared lens 220 (e.g., on the side of the shared lens 220 facing the scene 230). For example, the focal point corresponding to a respective light detector 210 could be modified (e.g., reduced, extended, or diverted) by selecting a lens 612 of the corresponding selectable array 610. By changing the focal point, effects of optical aberrations and/or foreign substances on the shared lens 220 on resulting LIDAR data may be mitigated. In such a way, possibly unnecessary data analysis may be avoided (i.e., data corresponding to the location of an optical defect of the shared lens 220 may not be useful for distance mapping, and therefore be computationally wasteful to analyze).

FIG. 7A illustrates a LIDAR system 700, according to example embodiments. Similar to FIGS. 3A and 3B, the LIDAR system 700 includes an array of optical elements 310 positioned between the light detectors 210 and the shared lens 220. However, unlike FIGS. 3A and 3B, the optical elements illustrated in FIG. 7A may be filters 702 (e.g., a series of discrete filters, with at least one filter corresponding to each light detector 210). The filters 702 may alter one or more of the light signals 212 (e.g., to modify the intensity, polarization, chromaticity, etc. of a corresponding light signal 212). For example, the filters 702 may include neutral-density filters, chromatic bandpass filters, chromatic band-reject filters, chromatic highpass filters, chromatic lowpass filters, polarization filters, etc. As illustrated, the filters 702 may be positioned in a location that is near enough to the light detectors 210 such that light signals 212 for respective light detectors 210 do not overlap with one another (i.e., the light signals 212 are discretized). Thus, the filters 702 can individually modify one of the light signals 212 without simultaneously affecting the optical qualities of all of the light signals 212/resulting images of all of the light detectors 210.

Figure 7B:
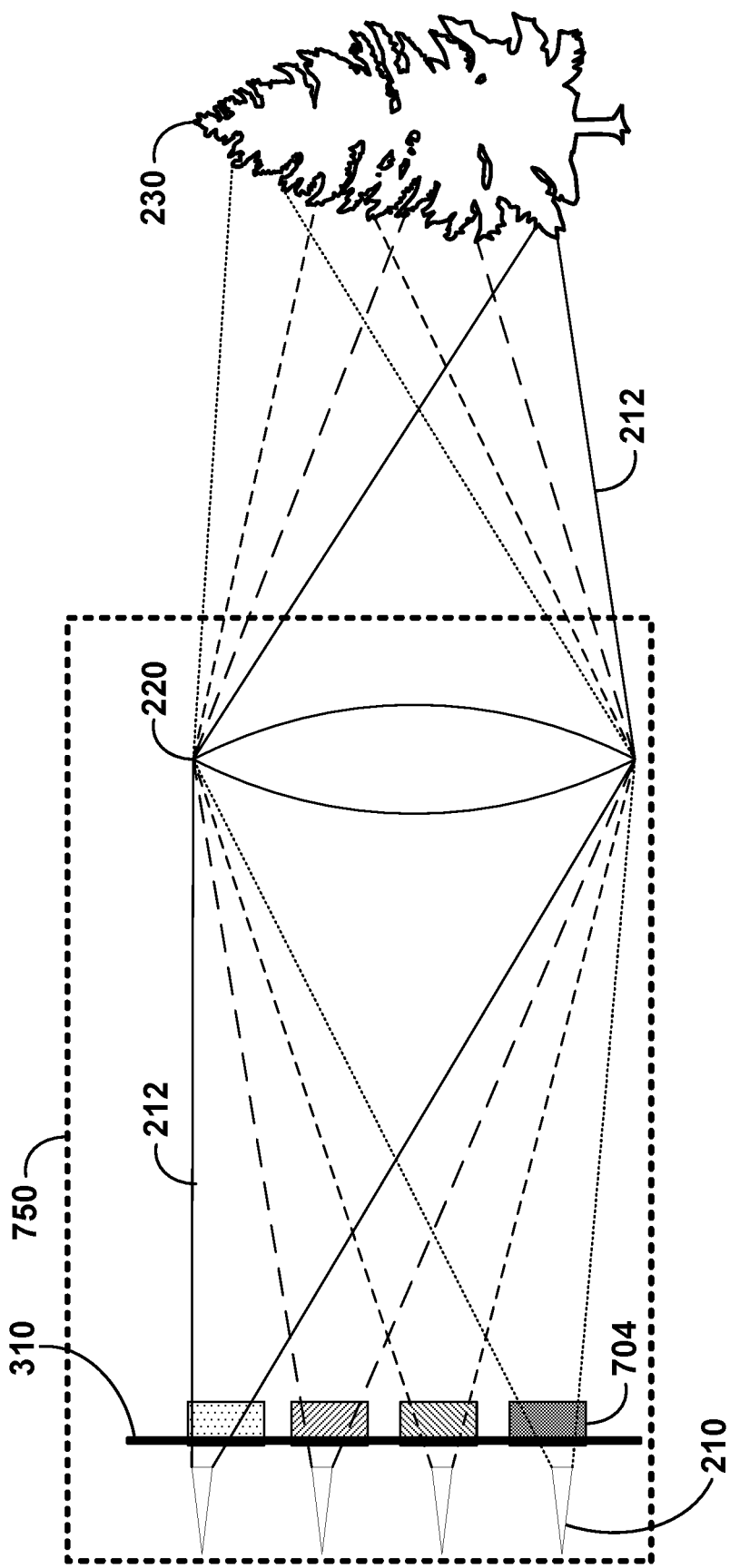
FIG. 7B is an illustration of a LIDAR system, according to example embodiments.

The filters 702 may affect a variety of optical qualities (e.g., polarization, intensity, wavelength, etc.) of the light signals 212. For example, the filters 702 may include bandpass filters to select for a specific range of wavelengths corresponding to the wavelengths of light emitted by an emitter of the LIDAR system 700 (e.g., in order to eliminate noise from other light sources) or polarization filters to select for a specific type of polarization (e.g., vertical, horizontal, circular, etc.) corresponding to the type of polarization of light emitted by an emitter of the LIDAR system 700 (e.g., in order to eliminate noise from other light sources). Each of the filters 702 may affect the respective light signals 212 in the same way (e.g., if each filter 702 is a neutral-density filter, each filter 702 may reduce the intensity of a corresponding light signal 212 by the same amount). In alternate embodiments, one or more of the filters 702 may modify its corresponding light signal 212 in a different way than the other filters 702 modify their corresponding light signals 212 (e.g., as illustrated in FIG. 7B). Intensity reduction by a respective neutral-density filter, for example, may be based on expected reflectivity of objects within the scene 230 (e.g., reflectivities predetermined and/or stored within a database, such as a hard drive or server). For example, if the topmost light detector 210 is oriented toward an object in a scene that is highly reflective (e.g., a retroreflective object), the transmittance of the corresponding neutral-density filter may be relatively low (e.g., to strongly reduce the intensity of the light signal 212 incident on the corresponding light detector 210).

In some embodiments, the filters 702 may be tunable. For example, in some embodiments, the transmittance of a neutral-density filter, the wavelength range of a bandpass filter or a band-reject filter, the cutoff wavelength of a highpass filter or a lowpass filter, or the polarization(s) passed by a polarization filter may be modified. Similar to the apertures described above, the filters 702 (e.g., neutral-density filters) may be adjusted based on map data, terrain data, time of day, reflectivity of objects in the scene 230, distance to objects in the scene 230 (or changes to distances to objects in the scene 230), etc. In one embodiment, for example, the filters 702 may include neutral-density filters that are tunable based on a reflectivity of a target object and/or target region within the scene 230. For example, one or more neutral-density filters may be tuned to have a predetermined transmittance (e.g., less than 50%, less than 25%, less than 10%, less than 5%, less than 1%, less than 0.1%, less than 0.01%, less than 0.001%, etc.) in response to a determination that the target object is, or that the target region contains, a retroreflective object.

The filters 702 may be tunable independently of one another or collectively, in various embodiments. Further, the filters 702 may be modified by a computing device (e.g., the computing device 106 illustrated in FIG. 1C). In some embodiments, modifying the filters 702 may include moving one or more filters 702 relative to the light detectors 210 (e.g., translating the filters 702 on a mechanical stage toward the light detectors 210 or away from the light detectors 210), electrically altering one or more optical qualities of the filters 702 (e.g., transmittance of the filters 702 or chromaticity of the filters 702, e.g., in embodiments where the filters 702 include liquid-crystal arrays), or even adding or removing the filters 702 from the LIDAR system 700.

FIG. 7B illustrates a LIDAR system 750, according to example embodiments. The LIDAR system 750 of FIG. 7B is analogous to the LIDAR system 700 illustrated in FIG. 7A, with the exception that the LIDAR system 750 in FIG. 7B includes filters 704 used to modify the respective light signals 212 in different ways. For example, one of the filters 704 may be a neutral-density filter, one of the filters 704 may be a bandpass chromatic filter, one of the filters 704 may be a polarization filter, and one of the filters 704 may be a highpass chromatic filter. It is understood that, in other embodiments, other possible combinations of filters in the LIDAR system 750 are also possible.

Further, in some embodiments, one or more of the light detectors 210/light signals 212 may correspond to a cascaded series of filters (as opposed to a single filter 704). For example, the topmost light detector 210 may receive a light signal 212 that has passed through both a polarization filter and a neutral-density filter. In addition to eliminating noise from unwanted sources (e.g., within the scene 230), filters 704 can be used to eliminate unwanted noise arising from within the LIDAR system 750 itself. For example, filters 704 (e.g., polarization filters) may be used to prevent light emitted by emitters of the LIDAR system 750 from being reflected internally into a light detector 210 before the light exits the LIDAR system 750 through the shared lens 220 and is reflected from the scene 230. Additionally or alternatively, emitters that emit light signals 212 intended for adjacent light detectors 210 may emit light signals 212 at different wavelengths or having different polarizations. Then, filters 704 could be used to eliminate the adjacent wavelengths and/or polarizations from a light signal 212 intended for a given light detector 210. Such a technique could eliminate cross-talk between light detectors 210, thereby reducing noise arising from the LIDAR system 750 itself.

Similar to the filters 702 described above with respect to FIG. 7A, the filters 704 of FIG. 7B may be tunable (e.g., based on distances between the LIDAR system 750 and one or more objects/regions within the scene 230). In some embodiments, the filters 704 may be tuned based on time of day (e.g., by reducing the transmittance through neutral-density filters at night). An another example, polarization filters may be tuned based on an expected polarization of light (e.g., polarizations predetermined and/or stored within a database, such as a hard drive or server) reflected from a target region of the scene 230 (e.g., light reflected from a road surface may have a different expected polarization than light reflected from a water surface or light reflected from a vehicle). It is understood that other types of filters may be tuned based on other features of the scene 230. In some embodiments, the filters 704 may be arranged/tuned to correct for optical aberrations within the LIDAR system 750 (e.g., chromatic aberrations caused by the shared lens 220).

Figure 8A:
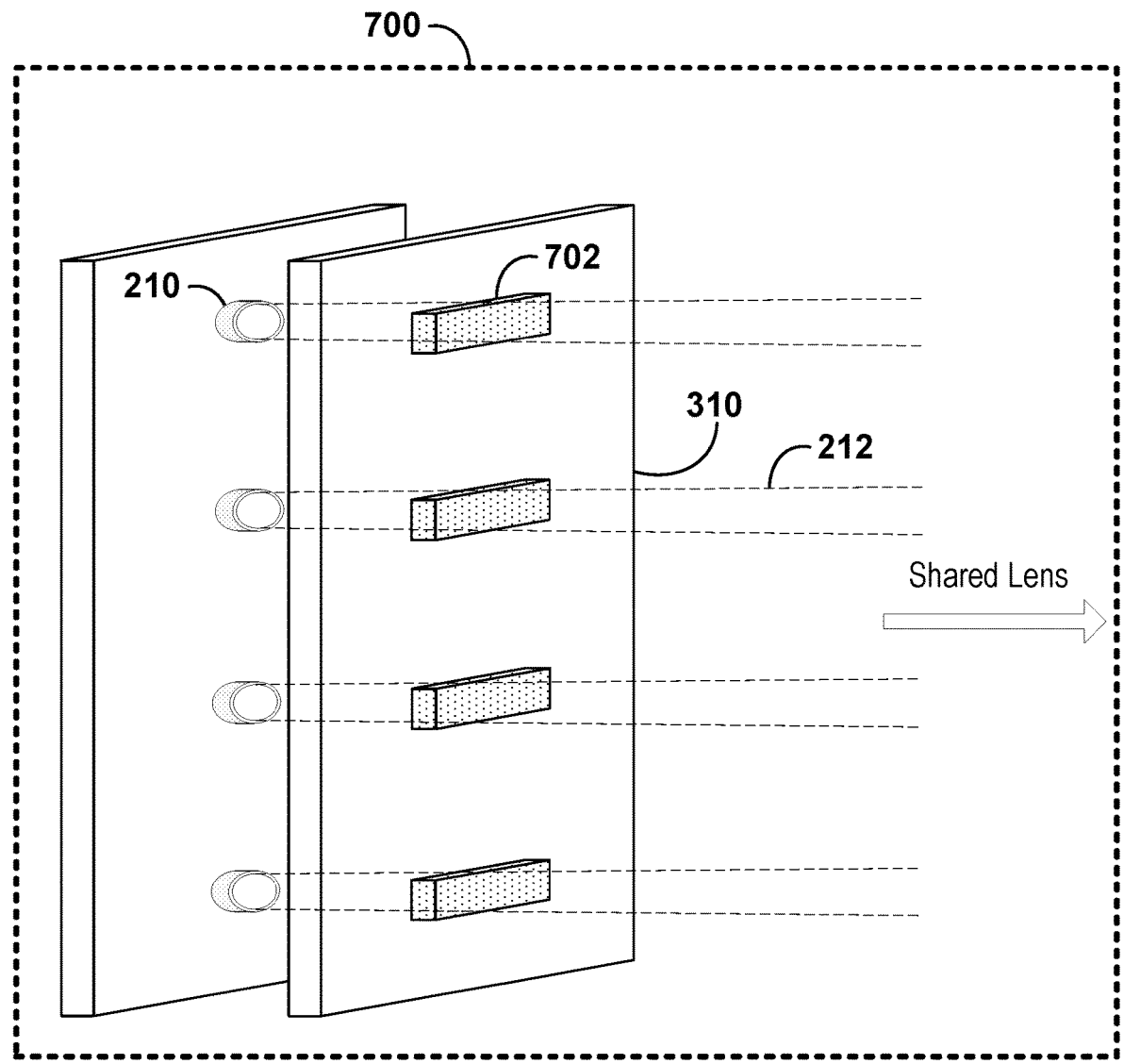
FIG. 8A is an illustration of a LIDAR system, according to example embodiments.

FIG. 8A illustrates a portion of the LIDAR system 700 (the shared lens 220 being omitted), according to example embodiments. The LIDAR system 700 illustrated in FIG. 8A may be a 3D view of the LIDAR system 700 illustrated in FIG. 7A. As illustrated, the LIDAR system 700 includes an array of light detectors 210 and an array of optical elements 310, the optical elements being filters 702.

Figure 8B:
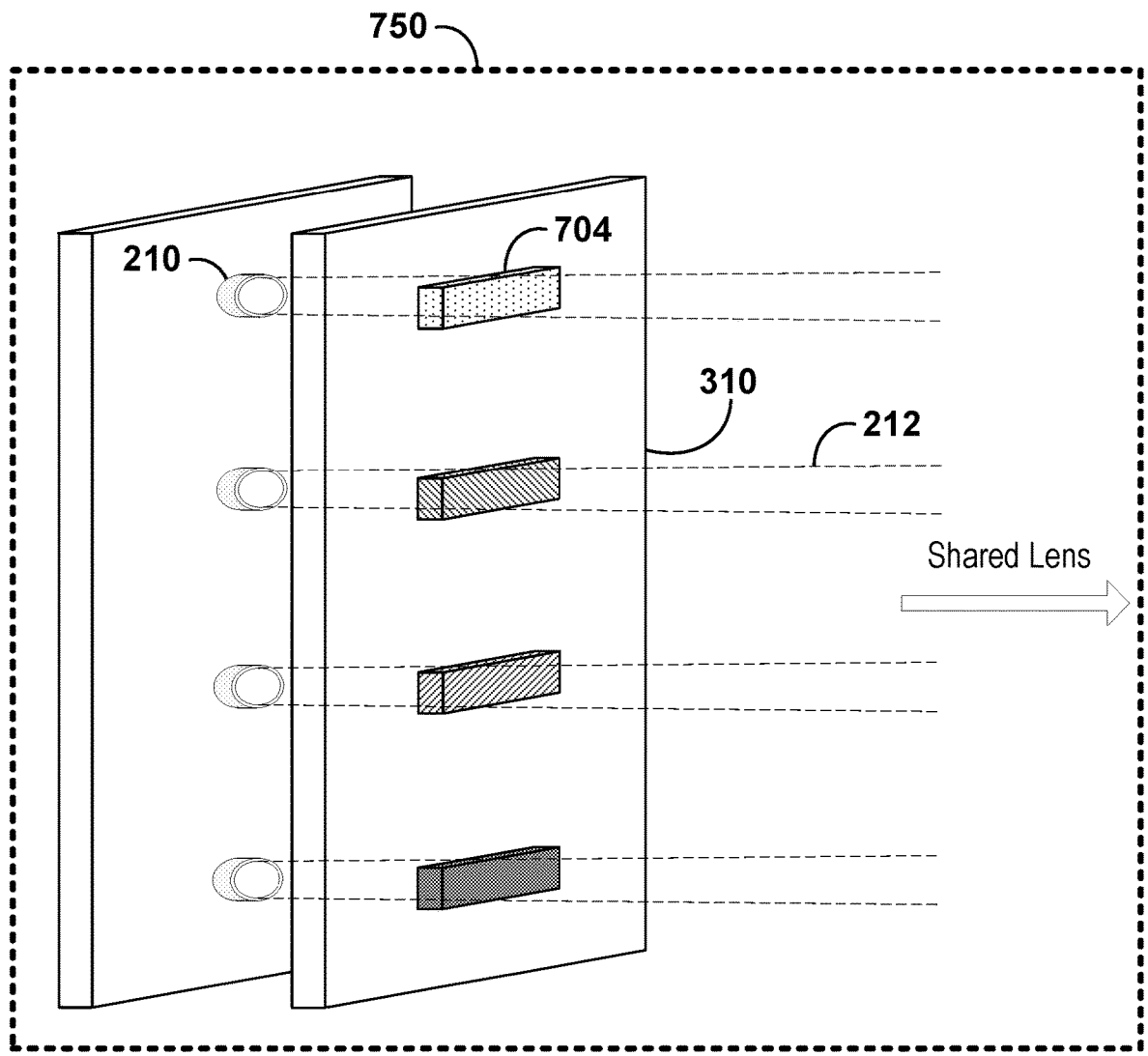
FIG. 8B is an illustration of a LIDAR system, according to example embodiments.

FIG. 8B illustrates a portion of the LIDAR system 750 (the shared lens 220 being omitted), according to example embodiments. The LIDAR system 750 illustrated in FIG. 8B may be a 3D view of the LIDAR system 750 illustrated in FIG. 7B. As illustrated, the LIDAR system 750 includes an array of light detectors 210 and an array of optical elements 310, the optical elements being filters 704.

Figure 9A:
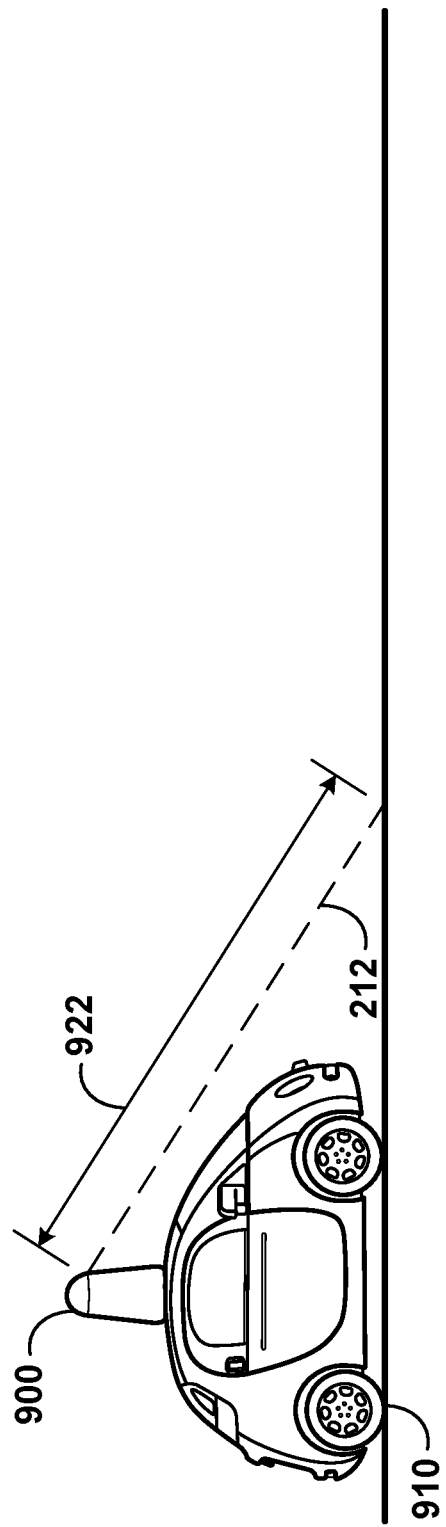
FIG. 9A is an illustration of a vehicle equipped with a LIDAR system, according to example embodiments.

FIG. 9A illustrates a LIDAR-equipped vehicle 910, according to example embodiments. As illustrated, the LIDAR-equipped vehicle 910 may include a LIDAR system 900 (e.g., a LIDAR system as illustrated and described with reference to any of FIGS. 2A-8B). The LIDAR system 900 may be used by the LIDAR-equipped vehicle 910 for computer vision (e.g., navigation and/or object recognition/avoidance). As described above, the LIDAR system 900 may include an array of light detectors 210 used to detect light signals 212 to determine information about the scene 230 near the LIDAR-equipped vehicle 910. As also described above, the LIDAR system 900 may include an array of optical elements 310 used to individually modify the light signals 212 received by the light detectors 210.

Optical elements (e.g., filters, lenses, apertures, etc.) within the array of optical elements 310 may be tuned based on a desired optical characteristic (e.g., desired intensity, polarization, wavelength range, etc.) for the respective light detector 210/light signal 212 combination. Such optical characteristics may be based on, for example, characteristics of the scene 230 near the LIDAR-equipped vehicle 910. In some embodiments, for example, the desired optical characteristic may be based on a pose of the LIDAR-equipped vehicle 910 and/or terrain data.

As illustrated in FIG. 9A, a light detector within the LIDAR system 900 may be oriented downward and, thus, may receive light from a first distance 922 relative to the LIDAR system 900. The first distance 922 may correspond to the distance from the LIDAR system 900 from which the light detector receives a light signal when the LIDAR-equipped vehicle 910 has a horizontal pose on a level terrain, as illustrated. However, as illustrated in FIG. 9B, when the LIDAR-equipped vehicle 910 is cresting over a hill (e.g., on top of a hilly terrain), the light detector that is oriented downward may receive light from a second distance 924 relative to the LIDAR system 900.

Figure 9B:
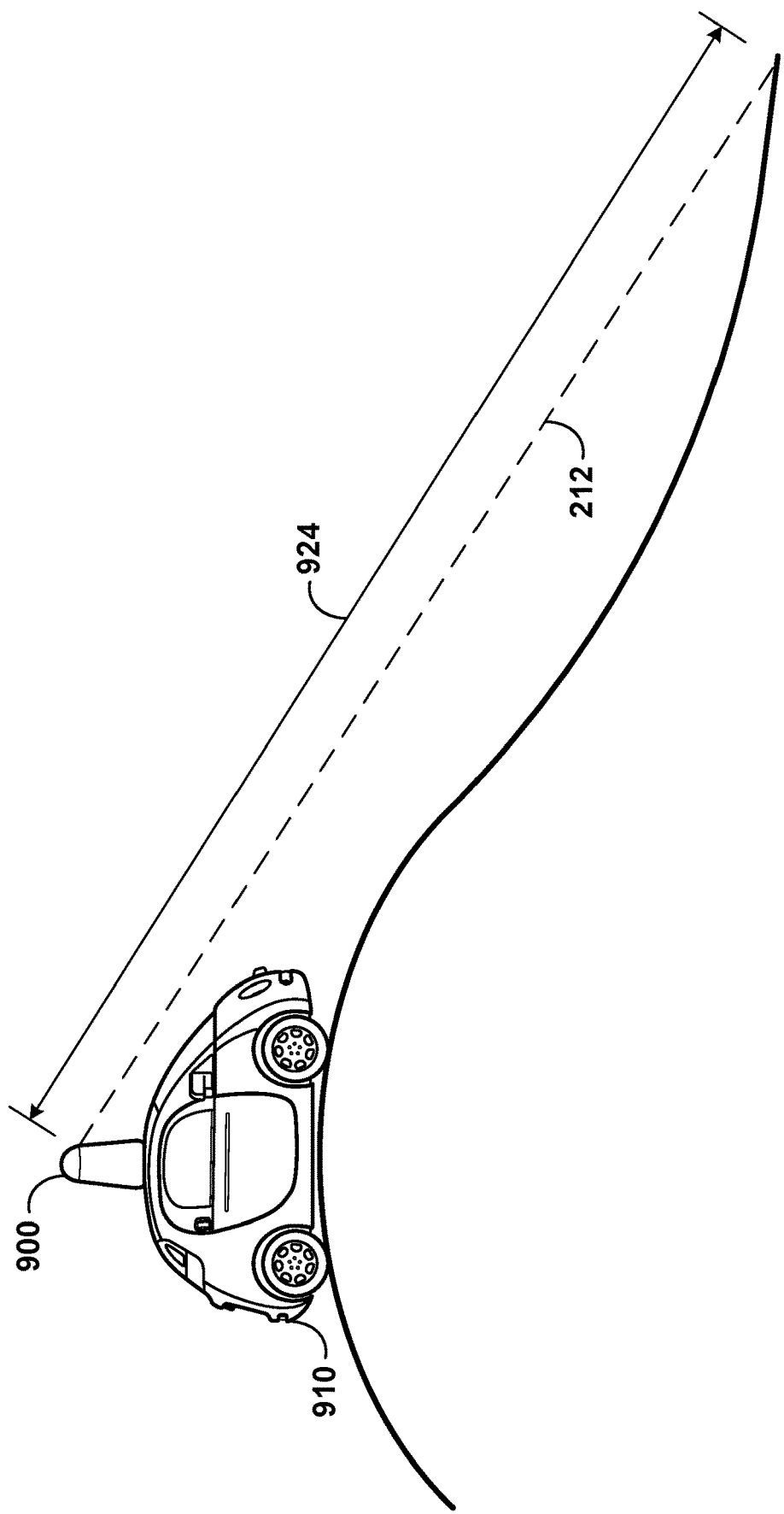
FIG. 9B is an illustration of a vehicle equipped with a LIDAR system, according to example embodiments.

As illustrated in FIG. 9B, the second distance 924 may be longer than the first distance 922, even though the orientation of the light detector remains the same. In still other embodiments, rather than simply being affected by terrain, the distance between a light detector and a given target within the scene may additionally or alternatively be affected by vehicle pose/orientation relative to objects in a scene 230 (e.g., oriented upward while traveling uphill or oriented downward while traveling downhill). As described above, an array of optical elements 310 can be tuned to modify the corresponding light signals 212 in order to account for such changes in target distances (e.g., a focal length may be selected for a given light signal 212 based on such target distances). Additionally or alternatively, arrays of optical elements that modify light signals transmitted by emitters of the LIDAR system 900 may also be tuned to account for such changes in target distances (e.g., the divergence of emitted beams may be increased or decreased based on changes in target distance). A change in target distances can be accounted for, for example, in embodiments where the difference in target distance between a first distance and a second distance corresponds to a modification within the optical elements that is larger than a maximum resolvable change in distance for the optical elements and/or that corresponds to a difference in distances that is detectable using an additional detector (e.g., distance sensor, intensity sensor, power sensor, clock that indicates time of day, camera, accelerometer, wavelength sensor, polarization sensor, etc.). For example, if the difference in distance is 1.0 nm, such a difference may be irresolvable by modifying optical elements (e.g., a lens stage being used is not refined enough to modify a focal length on the nm scale), and therefore may be ignored.

Figure 10:
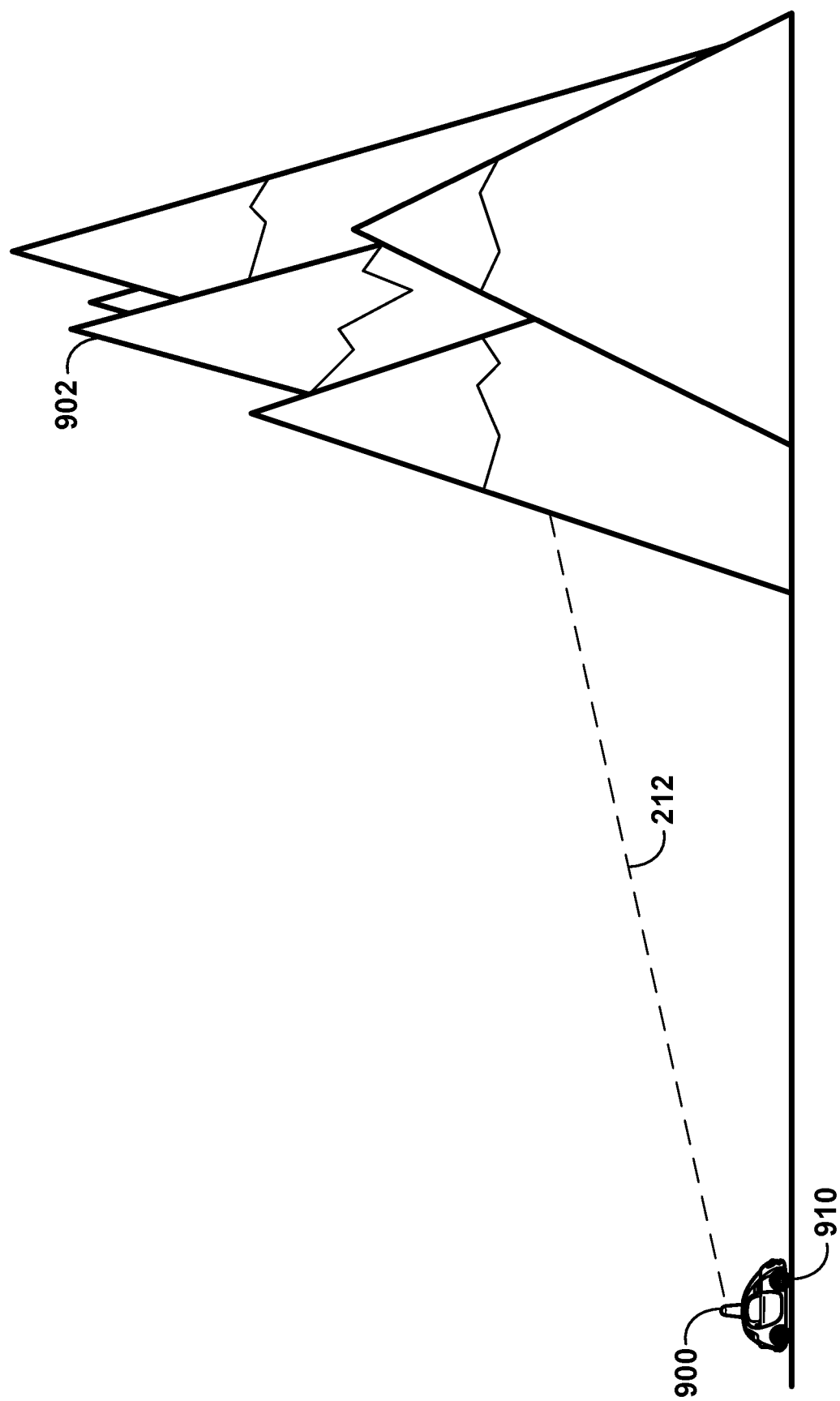
FIG. 10 is an illustration of a vehicle equipped with a LIDAR system, according to example embodiments.

In other embodiments, the array of optical elements 310 or arrays of optical elements that modify light signals transmitted by emitters of the LIDAR system 900 may be modified based on map data (e.g., combined with terrain data). For example, if a computing device (e.g., the computing device 106 illustrated in FIG. 1C) determines (e.g., based on geographical location, e.g., determined using GPS data) that the LIDAR-equipped vehicle 910 is sufficiently close to non-uniform terrain 902 (e.g., mountains, valleys, etc.), one or more optical elements in the array of optical elements 310 may be tuned to account for such topographical features. In some embodiments, as illustrated in FIG. 10, if the non-uniform terrain 902 includes mountains, optical elements in the array of optical elements 310 may be tuned to account for a given distance to target objects (e.g., mountains) in the scene 230 (e.g., for those light detectors that are oriented to receive light signals 212 from regions of the scene 230 near the horizon). For example, lenses may be tuned to increase their focal length and/or the transmittance of neutral-density filters may be decreased (e.g., to account for a high reflectivity of snow possibly present on the mountain).

FIGS. 11A-12B illustrates a LIDAR-equipped vehicle 910, according to example embodiments. As in FIGS. 9A-10, the LIDAR-equipped vehicle 910 may include a LIDAR system 900. As described herein, one or more optical elements arranged in arrays of optical elements (e.g., in a transmit path of the LIDAR system 900, a receive path of the LIDAR system 900, or both the transmit path and the receive path of the LIDAR system 900) may have optical characteristics based on predicted aspects of the scene (e.g., predicted distances relative to the LIDAR system 900 for a target object in a scene 230 based on the orientation of a corresponding light detector). As also described herein, one or more optical elements arranged in arrays of optical elements (e.g., in a transmit path of the LIDAR system 900, a receive path of the LIDAR system 900, or both the transmit path and the receive path of the LIDAR system 900) may be modified in such a way as to change one or more optical characteristics of the respective optical elements based on an aspect of a target region of a scene 230.

Figure 11A:
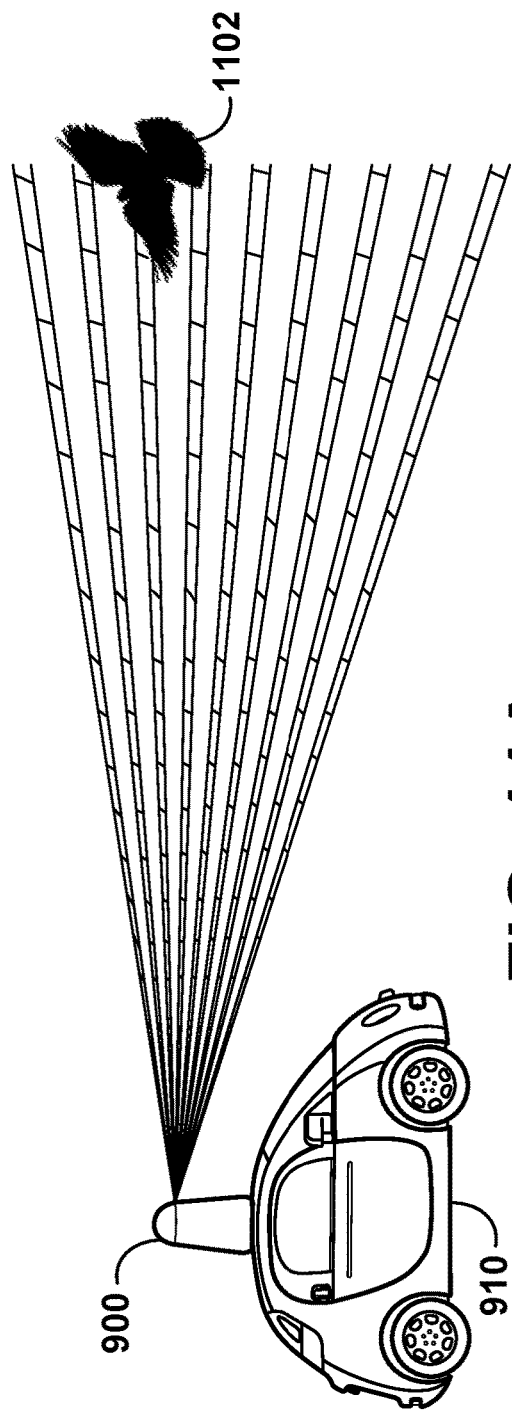
FIG. 11A is an illustration of a vehicle equipped with a LIDAR system, according to example embodiments.

Even further, in some embodiments, the aspect of the target region of the scene 230 may be determined based on data gathered by a previous scan using the LIDAR system 900 (e.g., based on a previous light detection by one or more light detectors in a LIDAR system 900). For example, as illustrated in FIGS. 11A and 12A, a first scan may be performed with the optical characteristics of each optical element in an array of optical elements (e.g., a transmit array of optical elements or a receive array of optical elements) having the same optical characteristics (e.g., a beam divergence of transmitted light signals may be the same for each light signal, as illustrated). Based on such a first scan, an aspect of the scene 230 may be determined. For example, it may be determined that the target region of the scene 230 contains a moving object 1102 (e.g., a bird, as illustrated, or a vehicle), which is moving relative to a background of the scene 230, as in FIG. 11A. Additionally or alternatively, it may be determined that the target region of the scene 230 has high reflectivity and/or contains an object with high reflectivity (e.g., a retroreflective object 1202), as in FIG. 12A. Still further, the determined aspect of the scene 230 based on the first scan may be a distance to the target region of the scene 230. Other determined aspects of the scene 230 (e.g., type of polarization of light reflected from a portion of the scene) are also possible. Based on one or more determined aspects of the scene 230, one or more of the optical characteristics of one or more optical elements may be modified within the LIDAR system 900 in preparation for an additional scan.

Figure 11B:
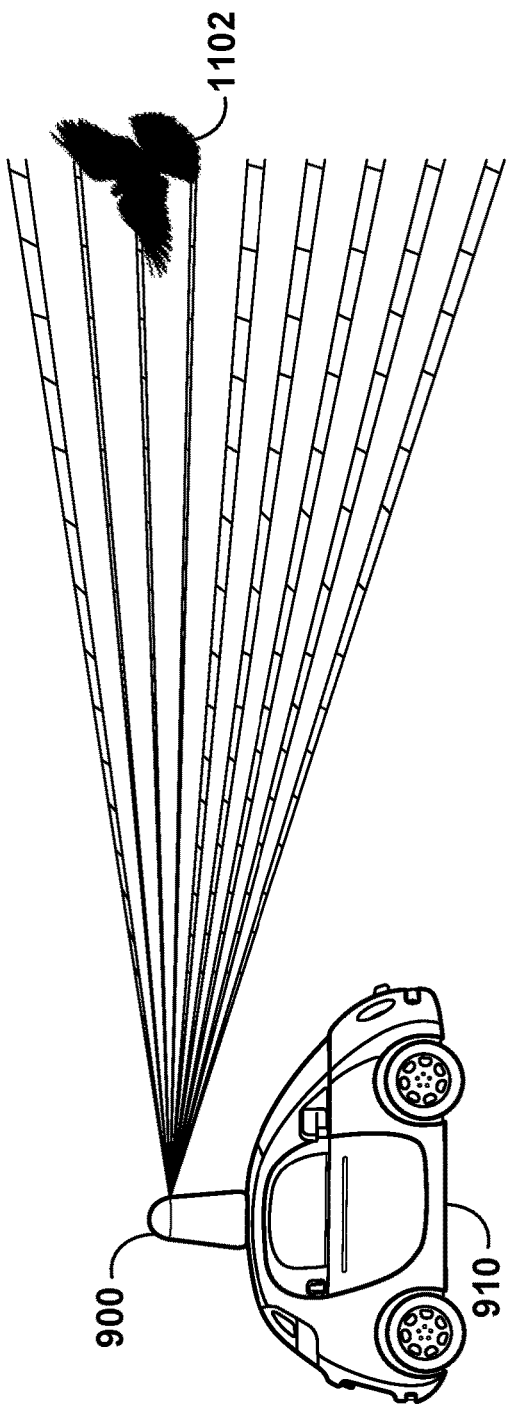
FIG. 11B is an illustration of a vehicle equipped with a LIDAR system, according to example embodiments.

For example, as illustrated in FIGS. 11B and 12B, a beam divergence of those transmitted light signals directed to the region of the scene where the determined aspect is present (e.g., where the moving object 1102 or the retroreflective object 1202 is present) may be narrowed (as illustrated in FIG. 11B) or expanded (as illustrated in FIG. 12B). Narrowing the beam divergence may increase the resolution used to observe moving objects 1102 within the scene. Likewise, expanding the beam divergence may prevent oversaturation of corresponding light detectors due to regions of a scene 230 with high reflectivity and/or containing retroreflective objects 1202. Modifying beam divergence may be performed using deformable mirrors (e.g., MEMS mirrors that can transform at rates between 100 Hz and 1000 Hz), lenses, spatial light modulators (SLMs), liquid-crystal arrays, a stage for moving a body of transparent material (e.g., the body of transparent material 516 illustrated in FIG. 5C) relative to light emitters, etc. It is understood that other methods of modifying beam divergence are also possible.

Additionally or alternatively, optical elements on a receive side of the LIDAR system 900 may be modified based on determined aspects of a scene 230. For example, transmittance of a neutral-density filter, polarizations passed by a polarization filter, wavelength ranges passed by a chromatic filter, focal length of a lens, size of an aperture, etc. could be modified based on a determined aspect of a scene 230. Other modifications to optical elements on the receive side of the LIDAR system 900 based on determined aspect(s) of the scene 230 are also possible.

Unlike in FIGS. 11A and 12A, in some embodiments, rather than the LIDAR system 900 performing a first scan to determine aspects of a scene 230, a separate system (e.g., a separate system of the LIDAR-equipped vehicle 910) may perform a scan to determine aspects of a scene 230. For example, as illustrated in FIG. 13A, a radar system 1302 may instead perform an initial scan to determine one or more aspects of a scene 230. Similar to the first scan illustrated in FIGS. 11A and 12A, the initial scan by the radar system 1302 may identify an aspect of the scene 230 (e.g., a location of a moving object 1102 in the scene 230) upon which an adjustment to the LIDAR system 900 (e.g., one or more optical elements of the LIDAR system 900) can be made. For example, similar to the illustrations of FIGS. 11B and 12B, as illustrated in FIG. 13B, the divergence of light signals transmitted by the LIDAR system 900 (e.g., light signals transmitted toward locations of the identified moving object 1102 in the scene 230) may be modified during a LIDAR scan subsequent to the radar scan. Other modifications to light signals based on modifications to optical elements on the transmit side or the receive side are also possible, as described herein.

Because the radar system 1302 may perform a scan using a different wavelength range than the LIDAR system 900, the radar system 1302 may be able to determine aspects of the scene 230 that a preliminary scan by the LIDAR system 900 could not. For example, the radar system 1302 may emit light signals that are capable of penetrating weather conditions (e.g., fog, rain, sleet, or snow) to identify portions of the scene 230 that light signals emitted by the LIDAR system 900 could not penetrate.

FIG. 14 illustrates a LIDAR system 1400, according to example embodiments. The LIDAR system 1400 may have multiple light emitters 1402 corresponding to a single light detector 210. In some embodiments, the LIDAR system 1400 may include multiple light detectors 210, each with multiple corresponding light emitters 1402. Each of the multiple light emitters 1402 may transmit a corresponding light signal 1412 toward a scene 230 (e.g., through the shared lens 220). Each of the corresponding light signals 1412 may be reflected from the scene 230 and then transmitted to the light detector 210 (e.g., via the shared lens 220). In alternate embodiments, the transmit and receive paths for the light signals 1412 within the LIDAR system 1400 may be coaxial (e.g., the light emitters 1402 and the light detector 210 may each optically couple to a shared optical fiber that is optically coupled to the shared lens 220).

Each of the light emitters 1402 may exhibit different sets of optical characteristics. For example, each of the light emitters 1402 may emit light signals 1412 with different divergences, different wavelengths, different polarizations, etc. In some embodiments, as illustrated, each of the light emitters 1402 may be configured to transmit a respective light signal 1412 to the same region of a scene 230, however, each of the light signals 1412 may have a different beam divergence than the other light signals 1412.

Further, each of the light emitters 1402 may selectively emit light signals 1412 based on an aspect of the scene 230. For example, an aspect of a scene 230 (e.g., a distance to a region of the scene 230) may be determined (e.g., by a computing device). Then, all but one of the light emitters 1402 may be prevented from emitting light toward the scene 230 (e.g., by being powered down or having the output of the respective light emitter 1402 blocked by an opaque object). The light emitter 1402 permitted to emit light toward the scene 230 may emit a light signal 1412 having desirable optical characteristic(s) based on the determined aspect of the scene 230. For example, if a target region of a scene 230 contains a retroreflective object, the light emitter 1402 permitted to emit light toward that region of the scene 230 may be configured to emit the light signal 1412 having the lowest intensity of all possible light signals 1412 from all light emitters 1402, thereby ameliorating potential saturation of the corresponding light detector 210.

In some embodiments, rather than multiple light emitters 1402, a single light emitter 1402 with multiple light paths may be used. For example, a beam splitter could be used to generate multiple light signals 1412 from a single light emitter 1402. Once separated, each of the multiple light signals 1412 could be passed through different optical components (e.g., different neutral-density filters each having a different transmittance, different polarization filters each having a different polarization, different lenses each having a different focal length, etc.), thereby generating a set of light signals 1412 with different optical characteristics. Then, using controllable mirrors, beam splitters, lenses, or other optical elements (e.g., free-space optical elements), one of the generated light signals 1412 may be selected to transmit to the scene 230. The controllable mirrors, beam splitters, lenses, or other optical elements may be on mechanical stages driven by servos or other motors and controlled by a computing device, for example. In still other embodiments, multiple light emitters 1402 corresponding to a single light detector 210 may be permitted to emit light signals 1412 at the same time.

FIG. 15A illustrates a LIDAR system 1500, according to example embodiments. The LIDAR system 1500 illustrated in FIG. 15A includes a light emitter 1502 (e.g., with an associated light receiver), an optical element 1504, and a mirror 1506 (e.g., a deformable or reorientable mirror) configured to reflect a light signal 212, emitted from the light emitter 1502, toward the scene. Unlike the LIDAR systems illustrated in other figures, however, the LIDAR system 1500 illustrated in FIG. 15A does not include a shared lens. Further, the LIDAR system 1500 may include a light detector corresponding to the light emitter 1502. Additionally or alternatively, in some embodiments, there may be multiple light emitters each corresponding to a single light detector (e.g., analogous to the LIDAR system 1400 illustrated in FIG. 14).

As indicated in FIG. 15A by the arrows, in some embodiments, the light emitter 1502 may be rotatable (e.g., on a rotatable, mechanical stage) relative to the mirror 1506. For example, the light emitter 1502 may be configured to rotate along three independent axes. Rotating the light emitter 1502 may alter the region of the scene toward which the light signal 212 is directed. In some embodiments, a light detector corresponding to the light emitter 1502 may be similarly rotated such that the light detector is in a proper alignment to receive light emitted by the light emitter 1502 after a rotation of the light emitter 1502. Further, rotation(s) of the light emitter 1502 and/or a corresponding light detector may be controlled by a computing device (e.g., the computing device 106 illustrated in FIG. 1C). Such rotation(s) of the light emitter 1502 and/or a corresponding light detector may occur based on an aspect of the corresponding scene (e.g., reflectivity of a target region of the scene, distance to the target region of a scene, terrain data, map data, pose of the LIDAR system 1500, expected polarization type reflected from a given region of the scene, wavelength range reflected by the target region of the scene, etc.) and/or a change in the aspect of the corresponding scene. For example, if an object is detected to be moving relative to the background in the scene, the light emitter 1502 may be rotated such that a light signal emitted by the light emitter 1502, and consequently received by a corresponding light detector, is directed toward the moving object in the scene.

In addition to or instead of rotating the light emitter 1502 to modify the target region of the scene, in some embodiments, the mirror 1506 may have an adjustable orientation (e.g., relative to the light emitter 1502 and/or the corresponding scene). As such, the mirror 1506 may be configured to direct the emitted light signal 212 toward the corresponding scene in a direction that is dependent upon an orientation of the mirror. Adjusting the orientation of the mirror 1506 (e.g., in an oscillating fashion using a spring-loaded mechanism or in an electrically controllable fashion using a mechanical stage controlled by a computing device) may scan the emitted light signal 212 across regions of the scene. For example, the mirror 1506 may be rotated (e.g., by a rotated, mechanical stage) and/or deformed to modify the target of the light signal 212 emitted by the light emitter 1502. Such rotations and/or deformations of the mirror 1506 may be controlled by a computing device (e.g., the computing device 106 illustrated in FIG. 1C). Similar to a rotation of the light emitter 1502, a deformation and/or rotation of the mirror 1506 may occur based on an aspect of the corresponding scene and/or a change in the aspect of the corresponding scene. In some embodiments, as illustrated in FIG. 15B, in addition to or instead of a single mirror 1506, a LIDAR system 1550 may include a set of mirrors 1516 organized in a prism shape (e.g., rotated mechanically about a central axis 1552 by a motor), as illustrated in FIG. 15B.

As illustrated, the LIDAR systems 1500/1550 of FIGS. 15A and 15B may also include an optical element 1504. The optical element 1504 may be configured to modify the light signal 212 emitted by the light emitter 1502. For example, the optical element 1504 may include a polarizer, chromatic filter (e.g., bandpass filter, band-reject filter, highpass filter, or lowpass filter), neutral-density filter, aperture, lens, prism, beam-splitter, etc. The way in which the optical element 1504 modifies the emitted light signal 212 and/or the degree to which the emitted light signal 212 is modified (e.g., the percentage transmittance of a neutral-density filter or the wavelength range of a bandpass chromatic filter) may be based on an aspect of the scene and/or a change in an aspect of the scene. Further, the optical element 1504 may be tunable, in some embodiments. For example, in response to a change in distance to an object of a target region of a scene, the beam divergence of the emitted light signal 212 may be changed by the optical element 1504 (e.g., the beam divergence may be narrowed as the object of the target region of the scene moves farther from the LIDAR system 1500/1550). Other changes in optical properties of the emitted light signal 212 are also possible (as described throughout this disclosure). In some embodiments, the optical element 1504 may be tuned by a computing device (e.g., the computing device 106 illustrated in FIG. 1C).

Analogous to other LIDAR systems described herein, in some embodiments, the LIDAR systems 1500/1550 of FIGS. 15A and 15B may include multiple optical elements (e.g., cascaded optical elements) affecting the light signal 212 emitted by the light emitter 1502. Additionally or alternatively, the LIDAR system 1500/1550 may include one or more optical elements configured to alter the light signal 212 received by the LIDAR system 1500/1550 after being reflected by the target region of the scene, before the light signal 212 is detected by a corresponding light detector.

Any of the other techniques described herein could be applied to the LIDAR systems 1500/1550 illustrated in FIGS. 15A and 15B with appropriate modifications. For example, an array of optical elements (or a single optical element, as illustrated) on the transmitter and/or receiver could modify transmitted and/or received light signal(s) based on an aspect of the scene (e.g., distance to an object in the scene or reflectivity of an object within the scene) or based on a change of an aspect of the scene (e.g., based on a moving object in the scene) as determined by a prior scan using a LIDAR system or a radar system.

It is understood throughout the specification and claims that whenever a system or device is described as transmitting or having transmitted light signals, the system may merely be configured such that light signals are transmitted in a particular fashion rather than that the light signals are continually emitted in such a fashion. For example, if a claim describes a system having each respective light signal is transmitted via the shared imaging optic and modified by a respective optical element in the array of optical elements based on at least one aspect of the scene, it is understood that the system may be configured using an arrangement of components that permits such light signals to be transmitted via the shared imaging optic and modified by a respective optical element in the array of optical elements in cases where such a light signal is actually emitted.

III. EXAMPLE PROCESSES

Figure 16:
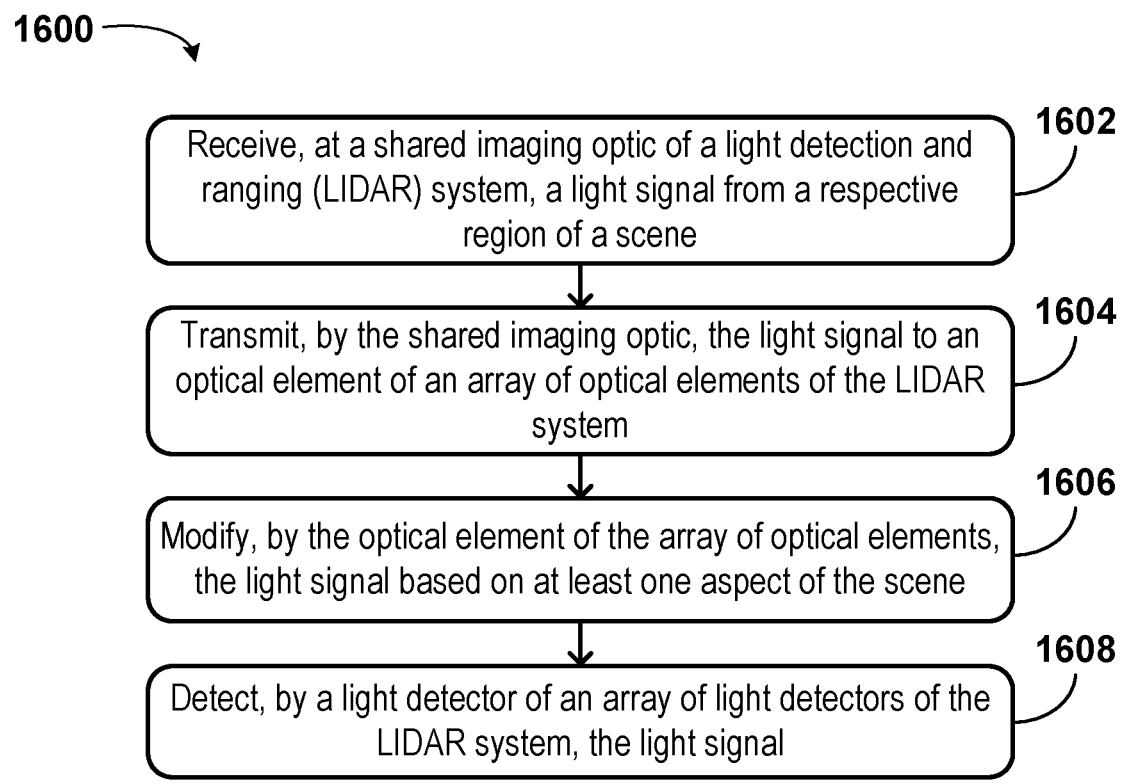
FIG. 16 is an illustration of a method, according to example embodiments.

FIG. 16 is a flowchart diagram of a method 1600, according to example embodiments. One or more blocks of the method 1600 may be performed by a LIDAR system (e.g., by the LIDAR system 350 illustrated in FIGS. 3B and 4B, the LIDAR system 550 illustrated in FIGS. 5B and 6B, or any other LIDAR system described or contemplated herein), in various embodiments. In some embodiments, one or more of the blocks of the method 1600 may be performed by a computing device (e.g., the computing device 106 illustrated in FIG. 1C). The computing device may include computing components such as a non-volatile memory (e.g., a hard drive or a ROM), a volatile memory (e.g., a random-access memory (RAM), such as dynamic random-access memory (DRAM) or static random-access memory (SRAM)), a user-input device (e.g., a mouse or a keyboard), a display (e.g., an LED display or an LCD), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 1602, the method 1600 may include receiving, at a shared imaging optic of a light detection and ranging (LIDAR) system, a light signal from a respective region of a scene.

At block 1604, the method 1600 may include transmitting, by the shared imaging optic, the light signal to an optical element of an array of optical elements of the LIDAR system.

At block 1606, the method 1600 may include modifying, by the optical element of the array of optical elements, the light signal based on at least one aspect of the scene.

At block 1608, the method 1600 may include detecting, by a light detector of an array of light detectors of the LIDAR system, the modified light signal.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A light detection and ranging (LIDAR) system comprising:
an array of light detectors;
a shared imaging optic; and
an array of optical elements positioned between the shared imaging optic and the array of light detectors,
wherein each light detector in the array of light detectors is configured to detect a respective light signal from a respective region of a scene,
wherein each respective light signal is transmitted via the shared imaging optic and modified by a respective optical element in the array of optical elements based on at least one aspect of the scene,
wherein a first region of the respective regions of the scene is separated from the array of light detectors by a first distance,
wherein a second region of the respective regions of the scene is separated from the array of light detectors by a second distance,
wherein the first distance is different than the second distance,
wherein a first light detector in the array of light detectors is configured to detect a first respective light signal from the first region,
wherein a second light detector in the array of light detectors is configured to detect a second respective light signal from the second region,
wherein a first optical element in the array of optical elements is configured to modify the first respective light signal based on the first distance, and
wherein a second optical element in the array of optical elements is configured to modify the second respective light signal based on the second distance.

2. The LIDAR system of claim 1, further comprising an additional array of optical elements positioned between the shared imaging optic and the array of light detectors, wherein the additional array of optical elements in configured to modify each of the respective light signals in a different way than the array of optical elements.

3. The LIDAR system of claim 1,
wherein the first distance is greater than the second distance,
wherein the first optical element comprises a first aperture,
wherein the second optical element comprises a second aperture, and
wherein the first aperture has a larger area than the second aperture.

4. The LIDAR system of claim 1,
wherein the first optical element comprises a first aperture,
wherein the second optical element comprises a second aperture,
wherein the first aperture is tunable in response to a change in the first distance, and
wherein the second aperture is tunable in response to a change in the second distance.

5. The LIDAR system of claim 1,
wherein the first optical element comprises a first lens having a first focal length,
wherein the second optical element comprises a second lens having a second focal length, and
wherein the first focal length is based on the first distance and the second focal length is based on the second distance.

6. The LIDAR system of claim 5,
wherein the first focal length is tunable in response to a change in the first distance, and
wherein the second focal length is tunable in response to a change in the second distance.

7. The LIDAR system of claim 5,
wherein the array of optical elements comprises a microlens array, and
wherein the first lens is a first microlens of the microlens array and the second lens is a second microlens of the microlens array.

8. The LIDAR system of claim 5,
wherein the array of optical elements comprises a body of transparent material,
wherein the first lens comprises a first portion of the body of transparent material,
wherein the second lens comprises a second portion of the body of transparent material, and
wherein the first portion of the body of transparent material has a different thickness than the second portion of the body of transparent material.

9. The LIDAR system of claim 1, wherein the array of optical elements comprises a liquid-crystal array.

10. The LIDAR system of claim 1, wherein the array of optical elements is telecentric.

11. The LIDAR system of claim 1, wherein the array of optical elements comprises one or more filters.

12. The LIDAR system of claim 11, wherein the one or more filters are polarization filters.

13. The LIDAR system of claim 12, wherein at least one of the polarization filters is tunable based on an expected polarization of light reflected from a target region of the scene.

14. The LIDAR system of claim 11, wherein the one or more filters are chromatic filters.

15. The LIDAR system of claim 14, wherein at least one of the chromatic filters is tunable based on a wavelength of light of a transmitter of the LIDAR system.

16. The LIDAR system of claim 11, wherein the one or more filters are neutral-density filters.

17. The LIDAR system of claim 16, wherein at least one of the neutral-density filters is tunable based on a reflectivity of a target region of the scene.

18. The LIDAR system of claim 17, wherein at least one of the neutral-density filters is tuned to have a predetermined transmittance in response to a determination that the target region of the scene contains a retroreflective object, wherein the predetermined transmittance is less than 50.0%.

19. The LIDAR system of claim 1, wherein the array of optical elements is tunable based on a desired optical characteristic.

20. The LIDAR system of claim 19, wherein the desired optical characteristic is based on a geographical location of the LIDAR system or an orientation of a LIDAR system relative to one or more objects in the scene.

21. The LIDAR system of claim 19, wherein the desired optical characteristic is based on a previous light detection by one or more of the light detectors.

22. The LIDAR system of claim 21, wherein the previous light detection indicates that the scene contains a retroreflective object.

23. The LIDAR system of claim 21, wherein the previous light detection indicates that the scene contains an object in motion relative to a background of the scene.

24. The LIDAR system of claim 21, wherein the previous light detection indicates a relative distance between the array of light detectors and one or more portions of the scene.

25. The LIDAR system of claim 1, further comprising:
an array of light emitters,
wherein the array of optical elements is positioned between the shared imaging optic and the array of light emitters,
wherein each light emitter in the array of light emitters is configured to emit a respective incident light signal that is modified by a respective optical element in the array of optical elements and then transmitted to the scene via the shared imaging optic, and
wherein a corresponding light detector in the array of light detectors is configured to detect a reflected portion of the respective incident light signal.

26. The LIDAR system of claim 25,
wherein the array of optical elements comprises a first optical element configured to modify a first beam divergence of a first incident light signal emitted from a first light emitter of the array of light emitters, and
wherein the array of optical elements comprises a second optical element configured to modify a second beam divergence of a second incident light signal emitted from a second light emitter of the array of light emitters.

27. The LIDAR system of claim 26,
wherein the array of optical elements comprises a body of transparent material, and
wherein the body of transparent material is angled relative to the array of light emitters such that a first portion of the body of transparent material is nearer to the first light emitter than a second portion of the body of transparent material is to the second light emitter.

28. The LIDAR system of claim 26,
wherein the first beam divergence is selected based on a first predicted distance of a first object within the scene toward which the first incident light signal is being transmitted, and
wherein the second beam divergence is selected based on a second predicted distance of a second object within the scene toward which the second incident light signal is being transmitted.

29. The LIDAR system of claim 26, wherein the first beam divergence or the second beam divergence is based on a time of day.

30. The LIDAR system of claim 1, further comprising an array of additional optical elements positioned between the array of optical elements and the shared imaging optic, wherein each additional optical element in the array of additional optical elements is configured to modify one of the respective light signals based on at least one aspect of the scene.

31. A method comprising:
receiving, at a shared imaging optic of a light detection and ranging (LIDAR) system, a first light signal from a first region of a scene, wherein the first region is separated from an array of light detectors of the LIDAR system by a first distance;
receiving, at the shared imaging optic of the LIDAR system, a second light signal from a second region of the scene, wherein the second region is separated from the array of light detectors of the LIDAR system by a second distance, and wherein the first distance is different than the second distance;
transmitting, by the shared imaging optic, the first light signal to a first optical element of an array of optical elements of the LIDAR system;
transmitting, by the shared imaging optic, the second light signal to a second optical element of the array of optical elements of the LIDAR system;
modifying, by the first optical element of the array of optical elements, the first light signal based on the first distance;
modifying, by the second optical element of the array of optical elements, the second light signal based on the second distance;
detecting, by a first light detector of the array of light detectors of the LIDAR system, the modified first light signal; and
detecting, by a second light detector of the array of light detectors of the LIDAR system, the modified second light signal.

* * * * *